(12) United States Patent
Huckvale

(10) Patent No.: US 10,426,236 B1
(45) Date of Patent: Oct. 1, 2019

(54) MULTI-FUNCTION DOUBLE-CANOPY UMBRELLA

(71) Applicant: Derrick Huckvale, Camas, WA (US)

(72) Inventor: Derrick Huckvale, Camas, WA (US)

(*) Notice: Subject to any disclaimer, the term of this patent is extended or adjusted under 35 U.S.C. 154(b) by 0 days.

(21) Appl. No.: 16/112,243

(22) Filed: Aug. 24, 2018

(51) Int. Cl.
| | |
|---|---|
| *A45B 25/18* | (2006.01) |
| *A45B 25/22* | (2006.01) |
| *A45B 25/26* | (2006.01) |
| *A45B 23/00* | (2006.01) |
| *E03B 3/03* | (2006.01) |
| *A45B 11/00* | (2006.01) |
| *E04H 12/22* | (2006.01) |
| *E04H 15/06* | (2006.01) |
| *A45B 25/14* | (2006.01) |

(52) U.S. Cl.
CPC ............... *A45B 25/26* (2013.01); *A45B 11/00* (2013.01); *A45B 23/00* (2013.01); *A45B 25/18* (2013.01); *A45B 25/22* (2013.01); *E03B 3/03* (2013.01); *E04H 12/2238* (2013.01); *E04H 12/2261* (2013.01); *A45B 2023/0012* (2013.01); *A45B 2023/0018* (2013.01); *A45B 2023/0025* (2013.01); *A45B 2023/0031* (2013.01); *A45B 2023/0037* (2013.01); *A45B 2023/0043* (2013.01); *A45B 2025/146* (2013.01); *A45B 2025/186* (2013.01); *A45B 2200/1036* (2013.01); *E04H 15/06* (2013.01)

(58) Field of Classification Search
USPC ......... 135/90, 93, 94, 97, 98, 16, 20.1, 20.3, 135/116; 248/514, 519, 523, 346.01, 910
See application file for complete search history.

(56) References Cited

U.S. PATENT DOCUMENTS

| | | | | |
|---|---|---|---|---|
| 323,123 | A | * 7/1885 | Dexter | ................ A47L 11/4038 15/246 |
| 5,078,166 | A | * 1/1992 | Lee | ........................ A45B 25/02 135/33.7 |
| D341,831 | S | 11/1993 | Mozdzanowski | |

(Continued)

FOREIGN PATENT DOCUMENTS

| | | |
|---|---|---|
| DE | 20 2015 227 U1 * 12/2015 | |
| DE | 202018000481 U1 * 3/2018 | ............. A45B 23/00 |

(Continued)

*Primary Examiner* — Robert Canfield

(57) ABSTRACT

A multi-function double-canopy umbrella comprises: a first foot, a second foot, a mounting plate bolted to the first and second feet, a lower post attached to the mounting plate, an upper post, an inner core inserted into the lower and upper posts, a central tube, a spool, a crank rotatably attached to the spool, a rope threaded through the central tube, central ribs, central arms pivotably attached to the central ribs, an adjustable central canopy attached to the central ribs to adjust to different heights, an intersector slidably attached to the central tube, first ribs pivotably connected to the intersector and central arms, second ribs, multi-rib-connecting cores slidably connected to the first and second ribs to adjust the multi-function double-canopy umbrella to multiple different sizes, raising arms foldably attached to the intersector, an adjustable ring canopy attached to the first and second ribs, and adjusting flaps sewn to the adjustable ring canopy to adjust it to multiple different sizes.

15 Claims, 50 Drawing Sheets

(56) References Cited

U.S. PATENT DOCUMENTS

| | | | |
|---|---|---|---|
| 5,482,069 A * | 1/1996 | Lee .................. A45B 23/00 135/31 |
| 5,499,644 A * | 3/1996 | Geniele ............. A45B 17/00 135/20.1 |
| D394,544 S | 3/1998 | Tropiano |
| 6,443,172 B2 | 9/2002 | Brumfield |
| 6,588,037 B1 | 7/2003 | Eno |
| 6,732,985 B1 | 5/2004 | Cantrell |
| 6,755,005 B2 | 6/2004 | Czachor |
| 6,986,322 B2 | 1/2006 | Lumpkin |
| 7,191,996 B2 | 3/2007 | Patsalaridis |
| 7,302,745 B2 | 12/2007 | Stahle |
| 7,562,667 B2 * | 7/2009 | Li ..................... A45B 3/04 135/21 |
| 7,810,514 B2 | 10/2010 | Lah |
| 8,075,217 B2 | 12/2011 | Eason |
| 8,123,190 B2 * | 2/2012 | Kost ................. A45B 11/00 135/88.08 |
| 8,191,561 B2 | 6/2012 | Brooks, III |
| 8,807,513 B2 | 8/2014 | Volin |
| 8,875,350 B2 | 11/2014 | Bukovitz |
| 8,960,210 B2 | 2/2015 | Bacik |
| 9,163,823 B2 | 10/2015 | Choksi |
| 9,359,785 B2 | 6/2016 | Catt |
| 9,380,844 B1 * | 7/2016 | Luo ................... A45B 25/08 |
| 9,493,962 B2 | 11/2016 | Eddy |
| 9,540,840 B2 * | 1/2017 | Ma .................... F16M 13/00 |
| 9,616,317 B2 | 4/2017 | Neubauer |
| 9,624,685 B1 | 4/2017 | Cordle |
| 9,764,458 B1 | 9/2017 | Resh |
| 9,771,734 B2 | 9/2017 | Odegard |
| 9,844,288 B2 | 12/2017 | Fu |
| 9,924,768 B1 | 3/2018 | Rosenberger |
| 9,957,728 B2 * | 5/2018 | Ma .................... A45B 23/00 |
| 9,974,366 B2 | 5/2018 | Heim |
| 9,976,319 B2 | 5/2018 | Lamke |
| 10,017,955 B2 * | 7/2018 | Ye .................... A45B 11/00 |
| 2002/0053631 A1 * | 5/2002 | Li ..................... A45B 17/00 248/521 |
| 2002/0129847 A1 * | 9/2002 | Ma .................... A45B 23/00 135/98 |
| 2002/0174887 A1 * | 11/2002 | Reese ................ A45B 11/00 135/20.1 |
| 2003/0098050 A1 * | 5/2003 | Lee .................. A45B 25/02 135/33.7 |
| 2003/0140955 A1 * | 7/2003 | Chou ................. A45B 23/00 135/98 |
| 2004/0056169 A1 * | 3/2004 | Harbaugh .......... E04H 12/2246 248/519 |
| 2004/0177871 A1 * | 9/2004 | Harbaugh .......... A45B 19/10 135/20.1 |
| 2005/0028852 A1 * | 2/2005 | Reese ................ A45B 23/00 135/20.1 |
| 2006/0081277 A1 * | 4/2006 | Liu .................... A45B 23/00 135/20.1 |
| 2007/0074751 A1 * | 4/2007 | Fraser ................ A45B 3/04 135/98 |
| 2010/0051074 A1 * | 3/2010 | Dan ................... A45B 23/00 135/20.3 |
| 2010/0212705 A1 * | 8/2010 | Tung ................. A45B 23/00 135/20.1 |
| 2011/0260029 A1 * | 10/2011 | Kost ................. A45B 11/00 248/514 |
| 2013/0146739 A1 * | 6/2013 | Zhao ................. E04H 12/2246 248/519 |
| 2014/0158173 A1 * | 6/2014 | Li ..................... A45B 17/00 135/20.1 |
| 2015/0060631 A1 | 3/2015 | Pan |
| 2015/0330099 A1 | 11/2015 | Zhou |
| 2018/0334828 A1 * | 11/2018 | Pan ................... E04H 12/2246 |

FOREIGN PATENT DOCUMENTS

| | | | |
|---|---|---|---|
| EP | 334821 A2 * | 9/1989 | |
| EP | 2556767 A1 * | 2/2013 | ............ A45B 23/00 |

\* cited by examiner

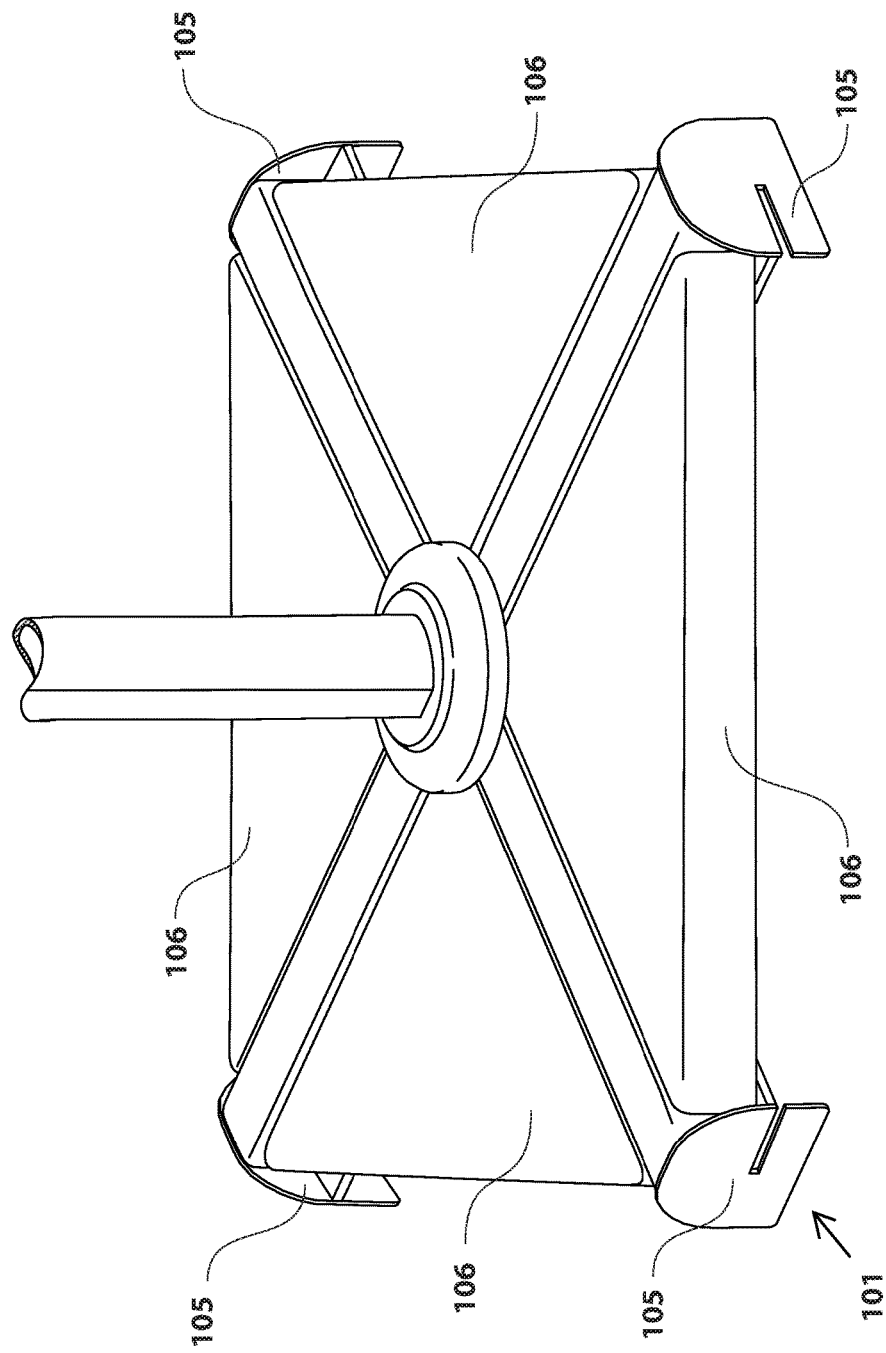

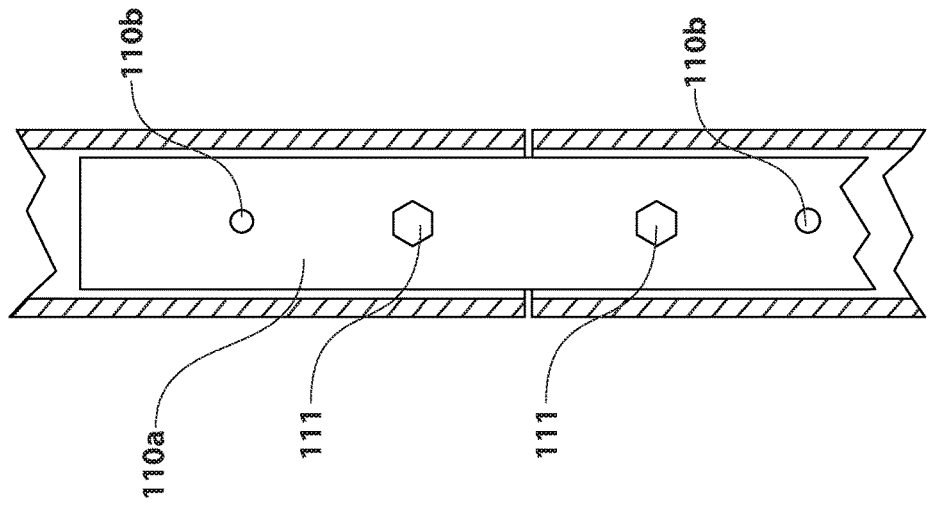

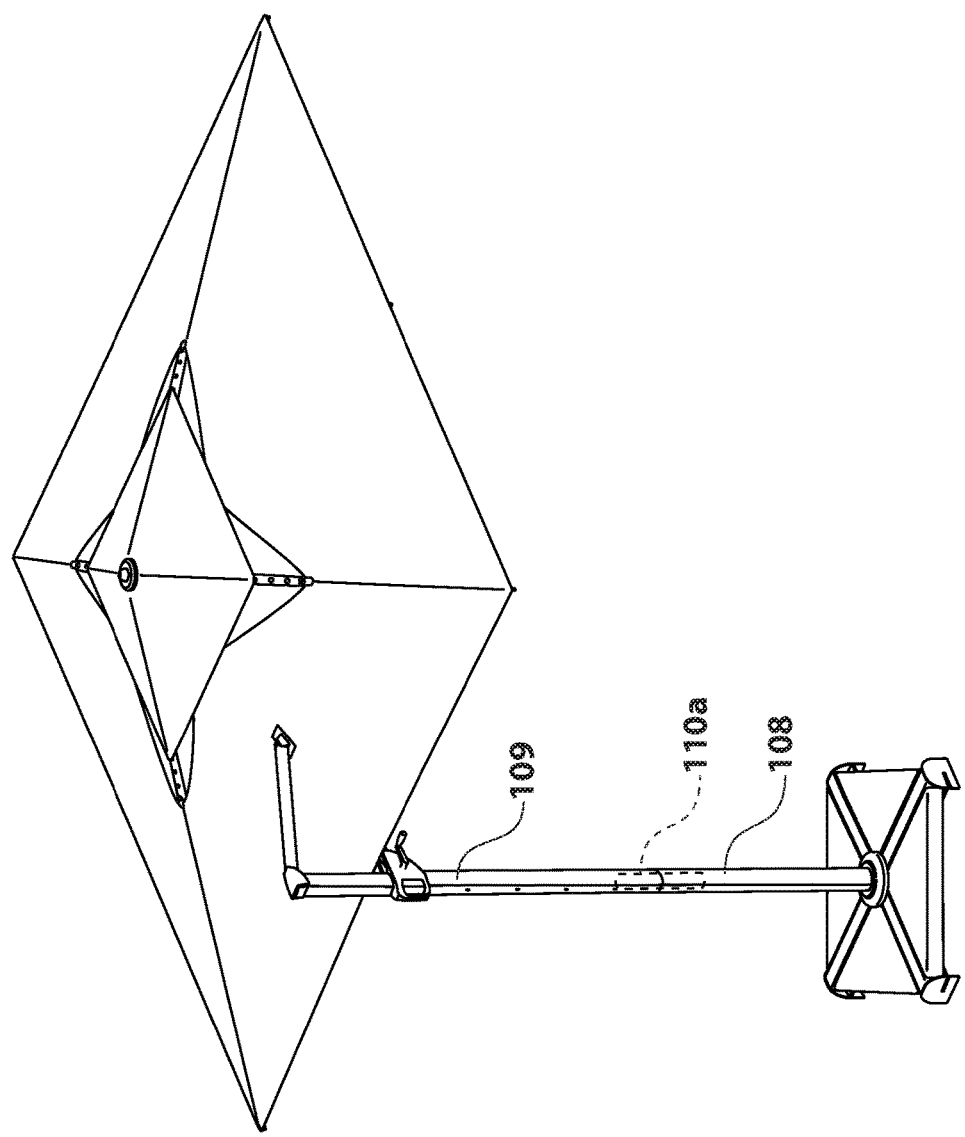

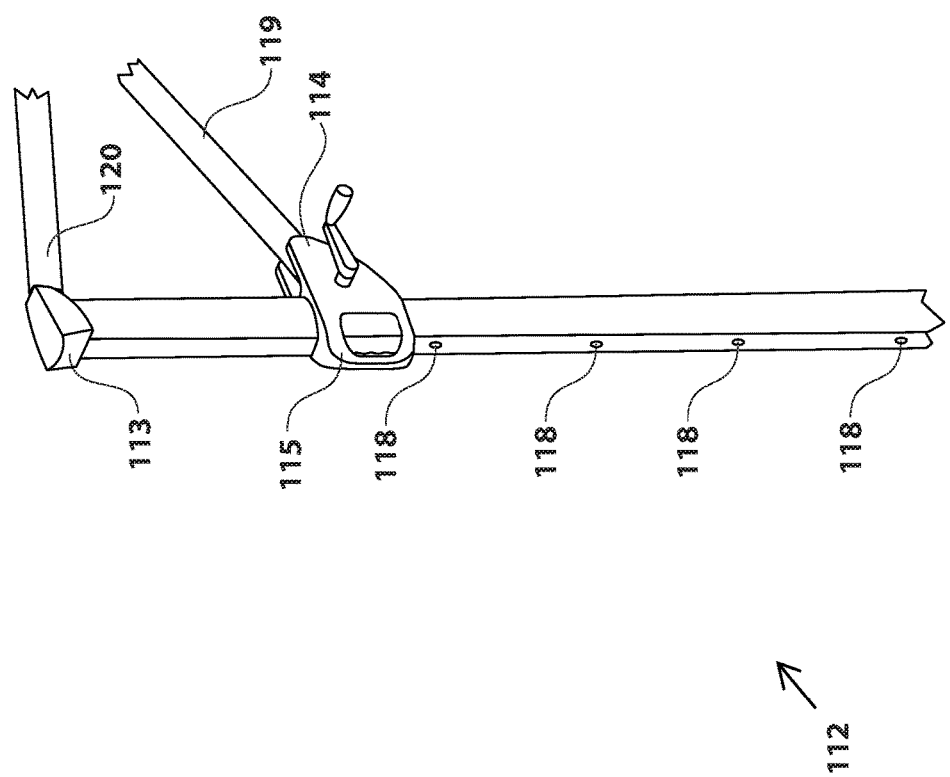

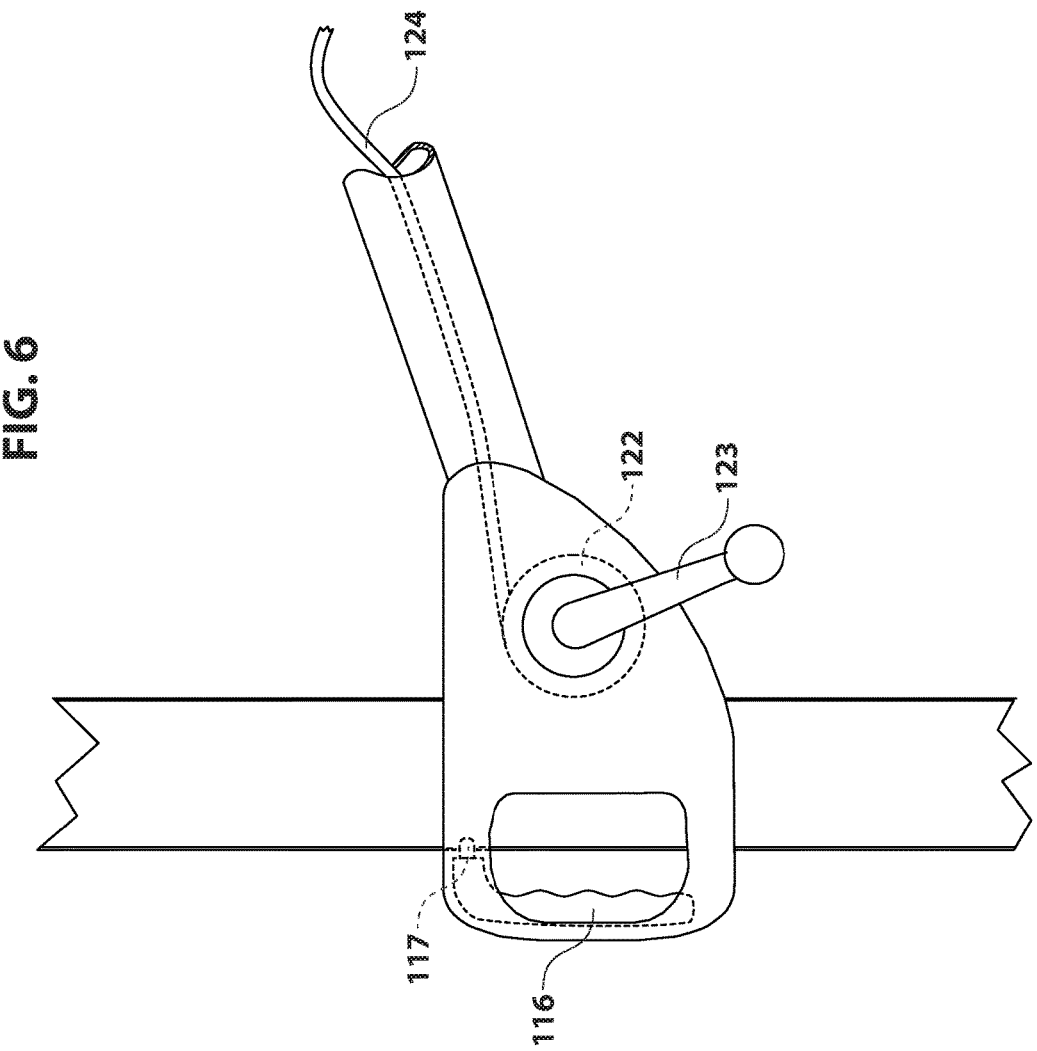

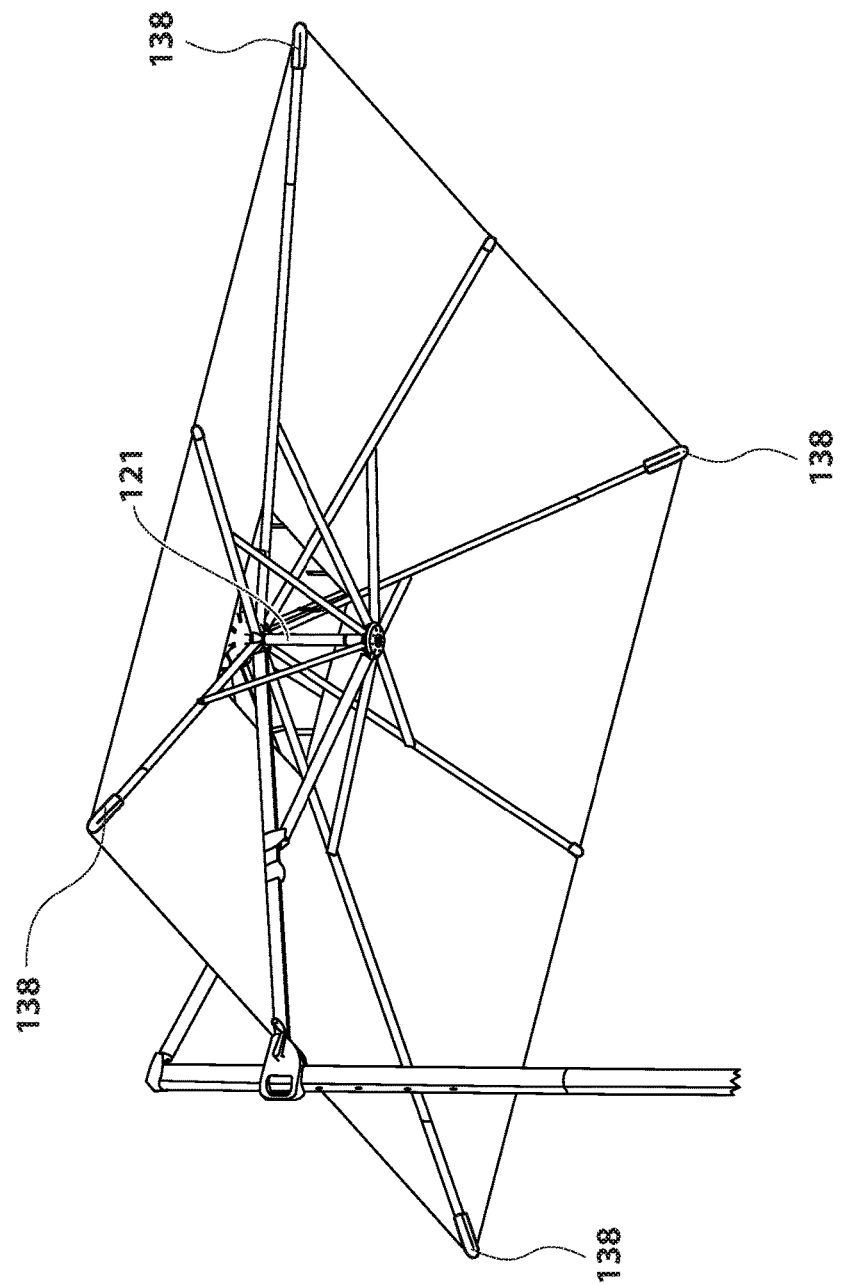

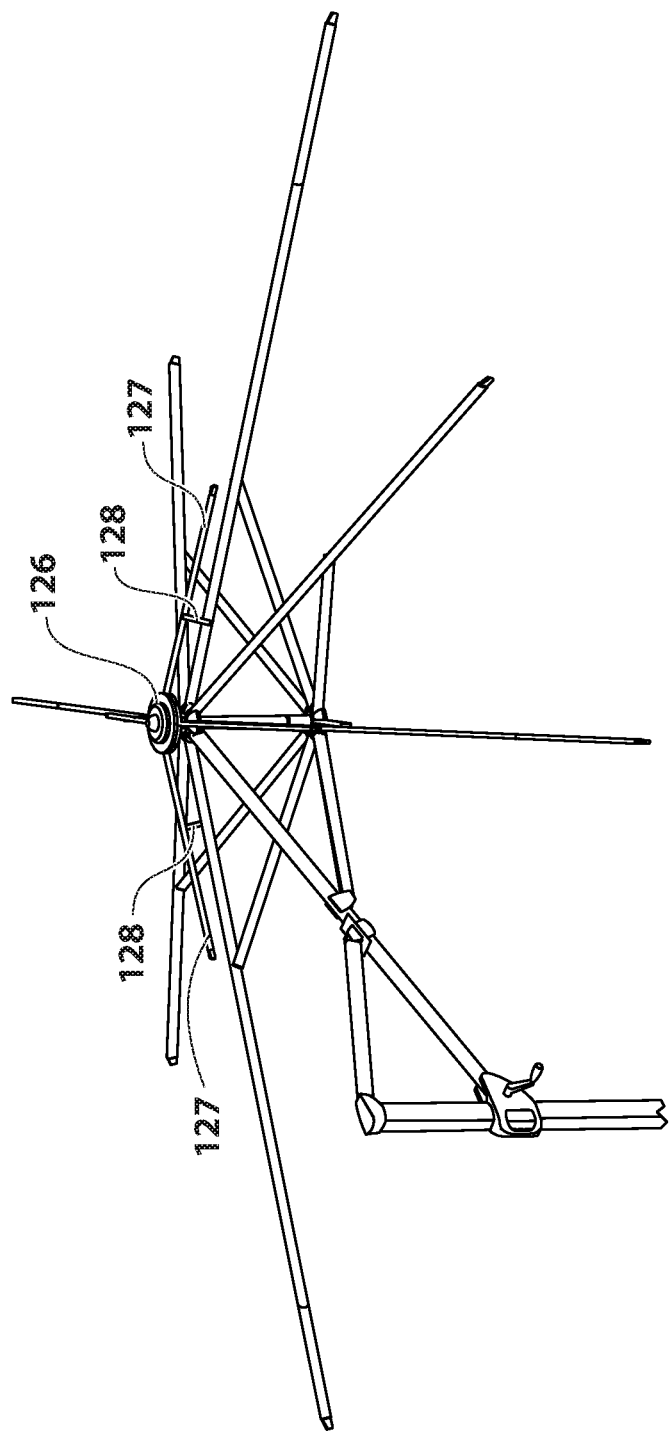

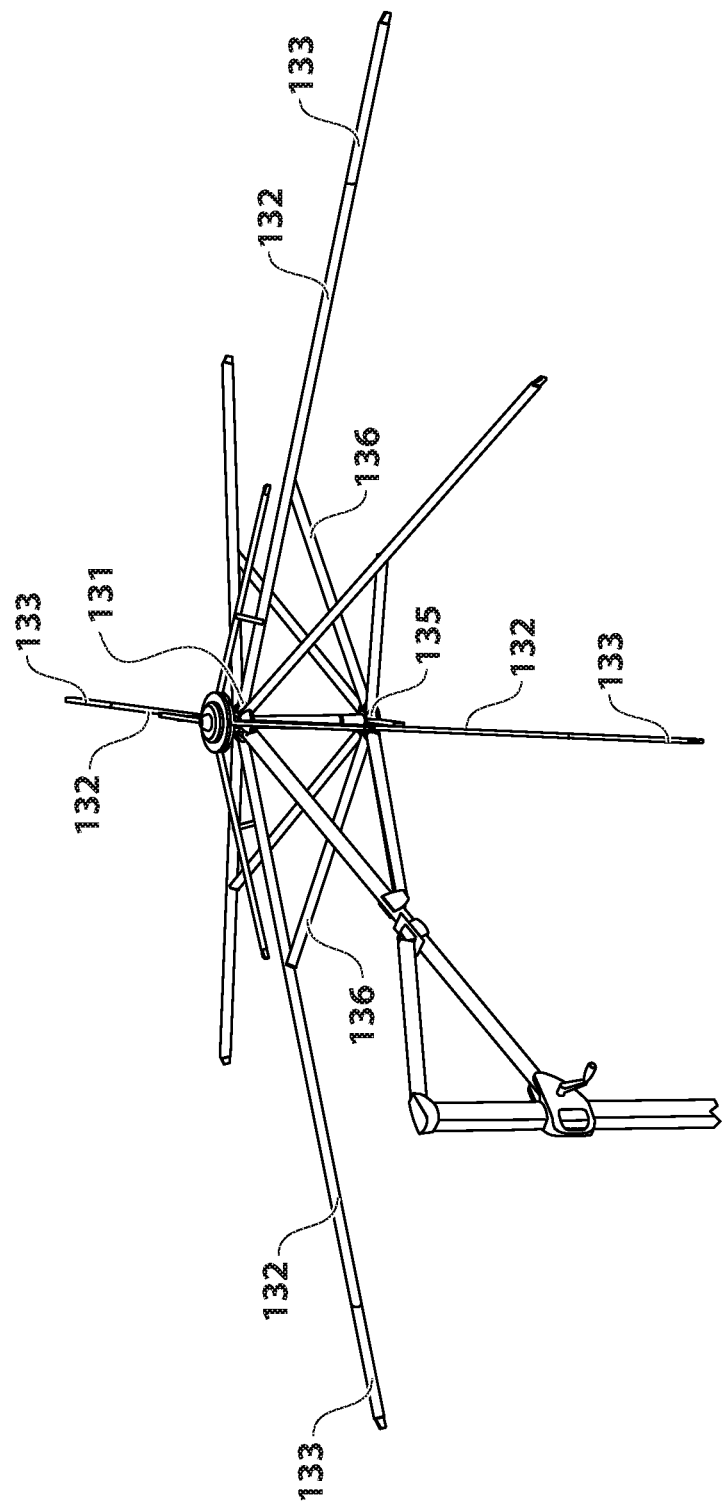

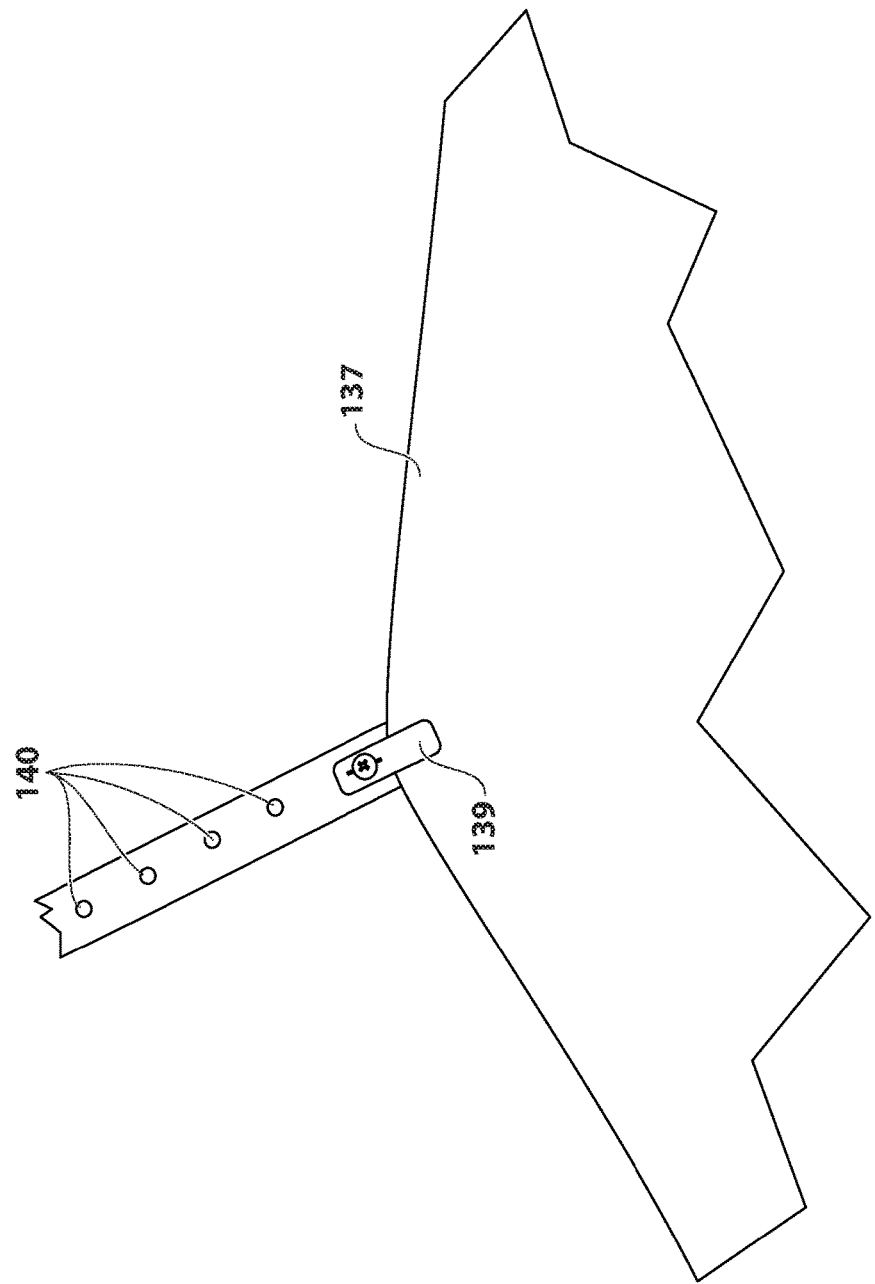

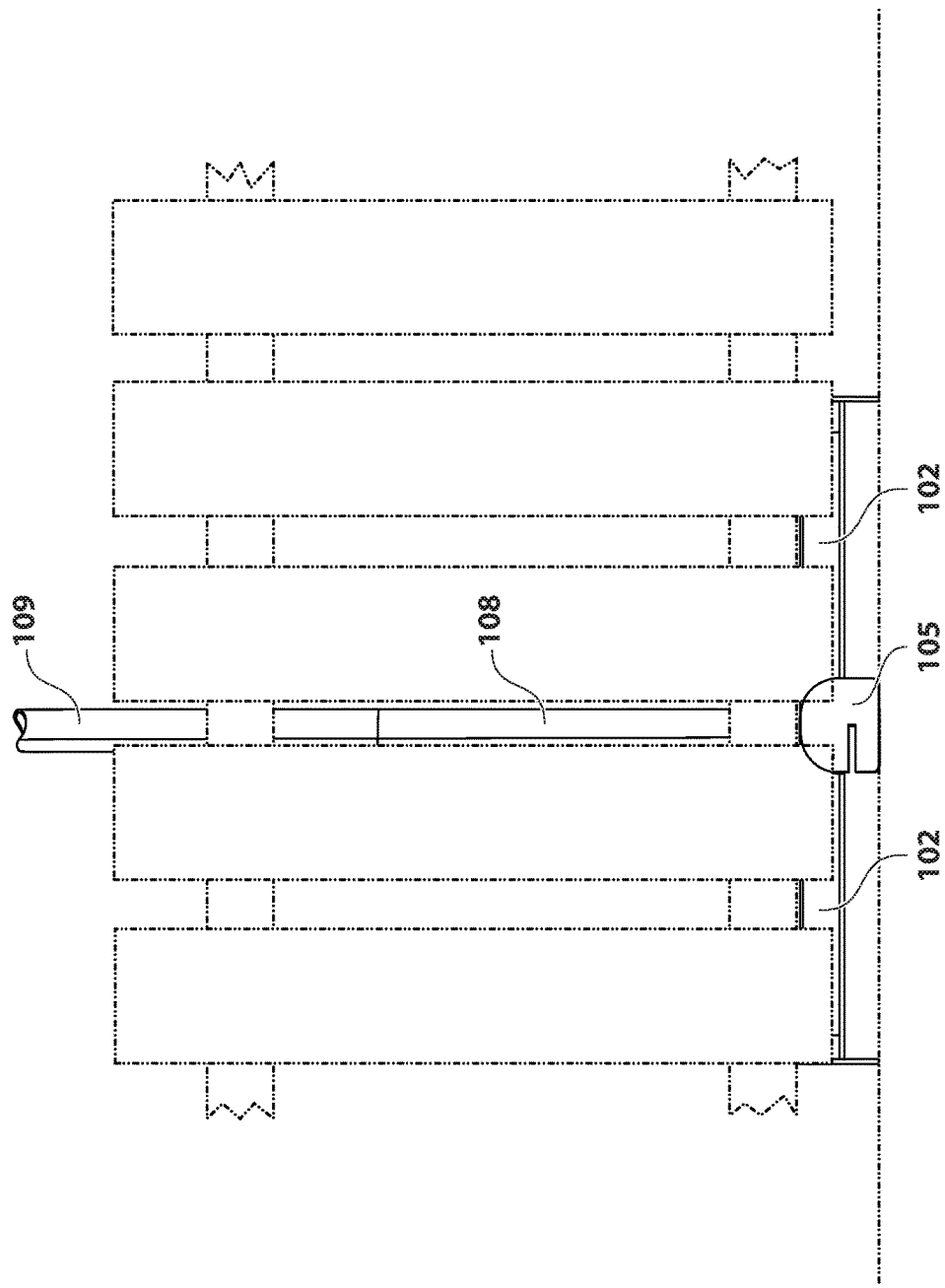

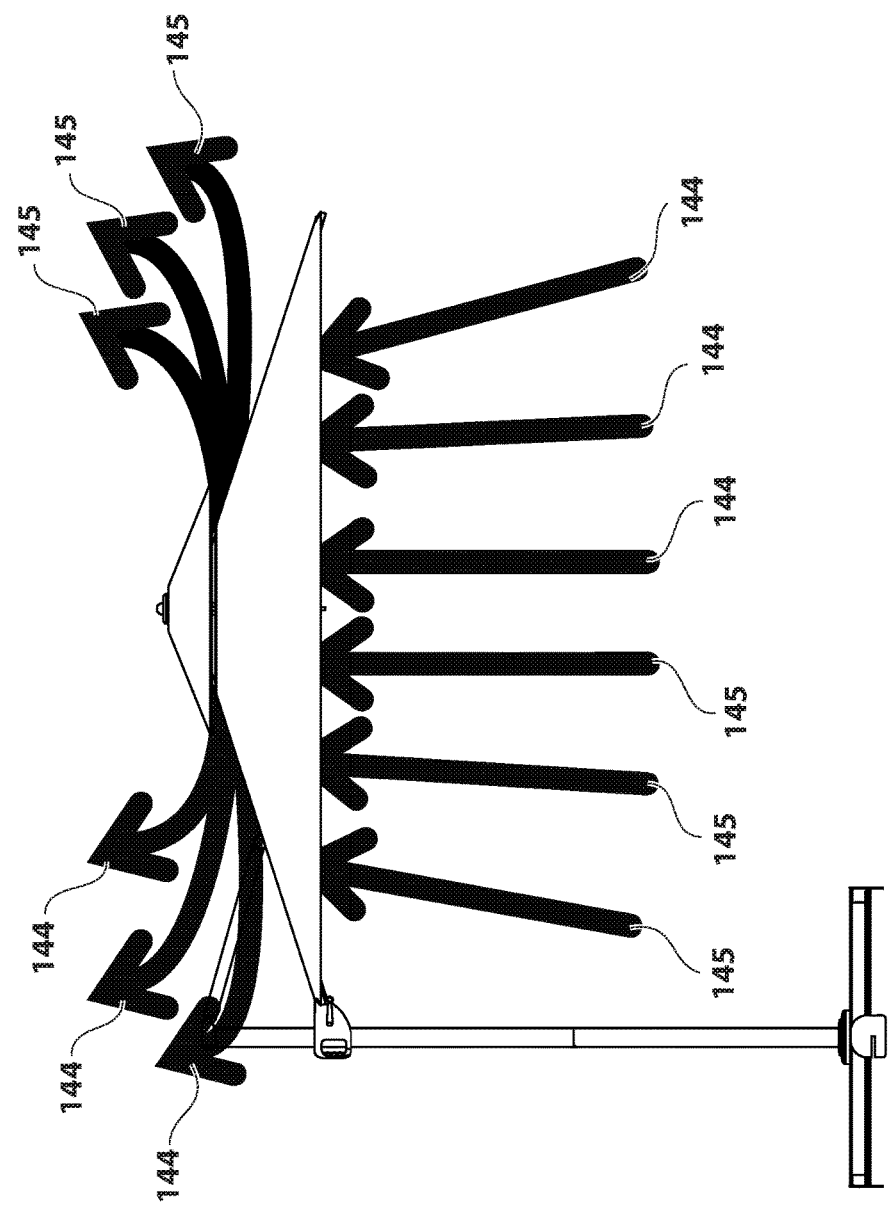

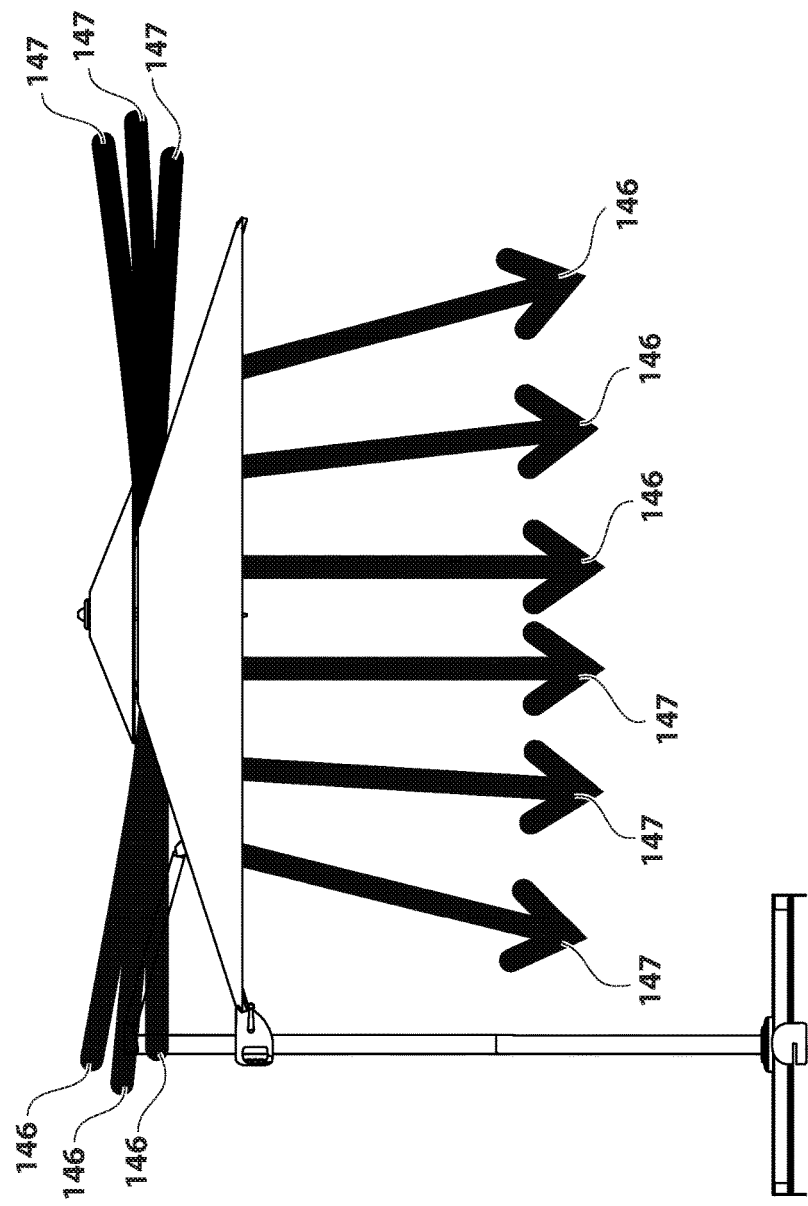

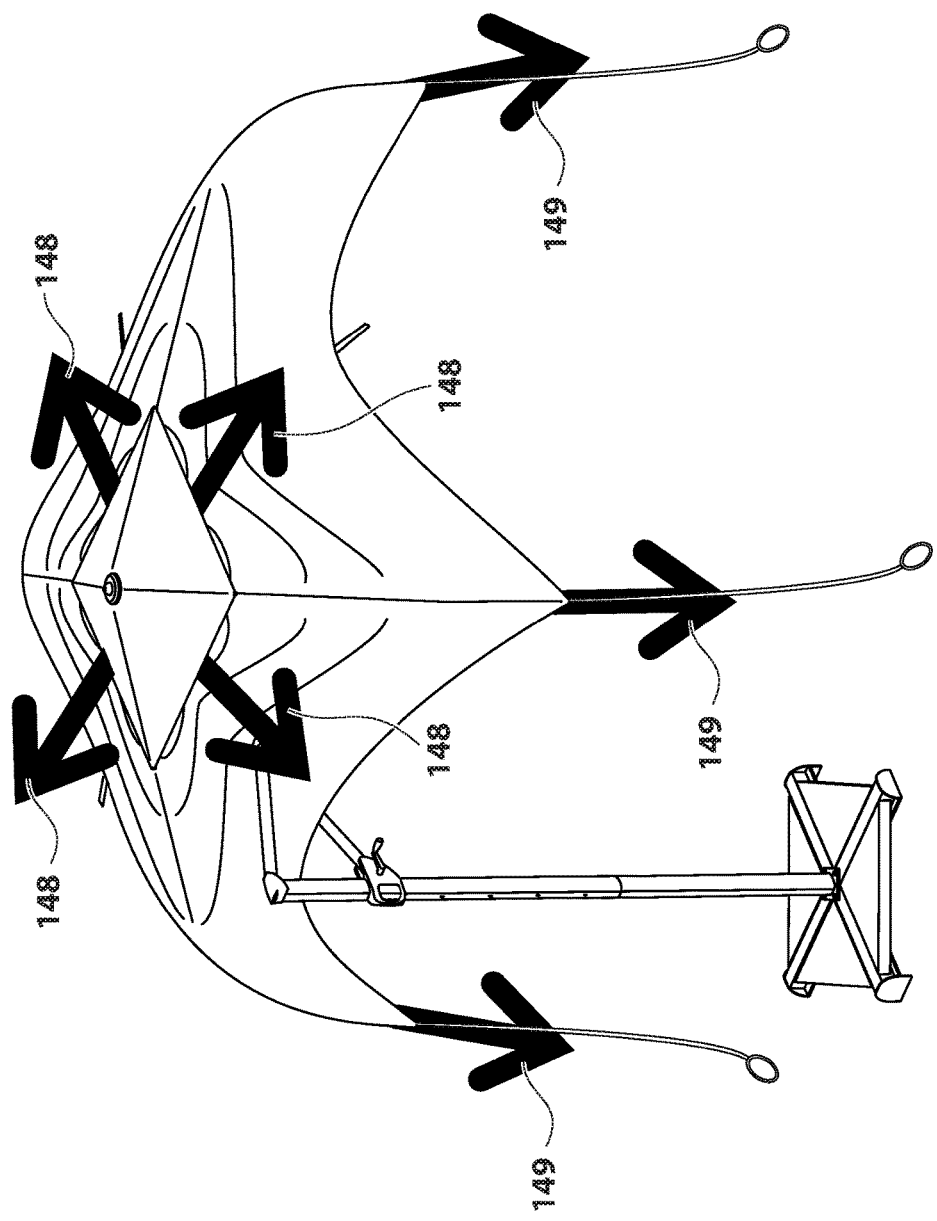

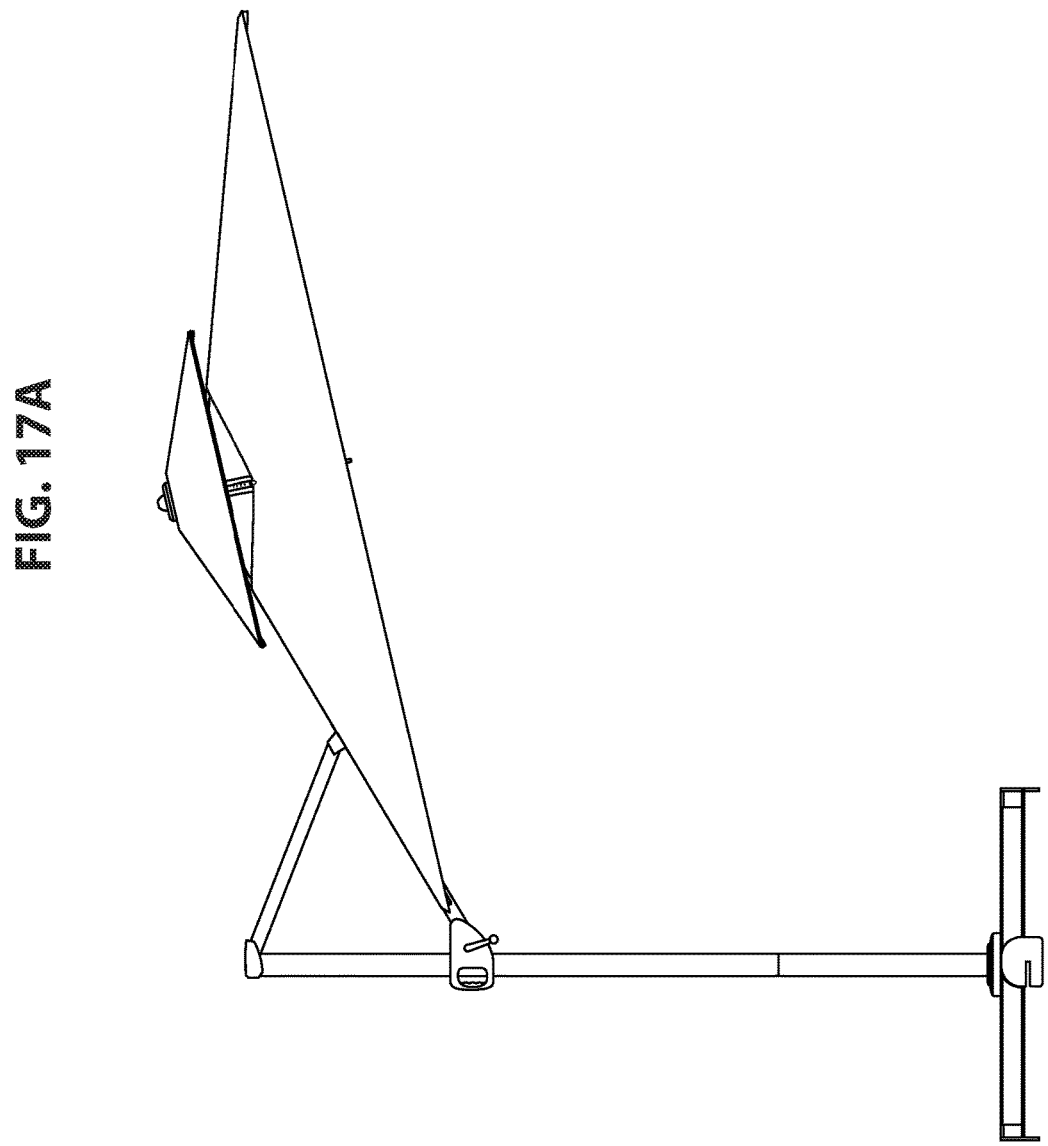

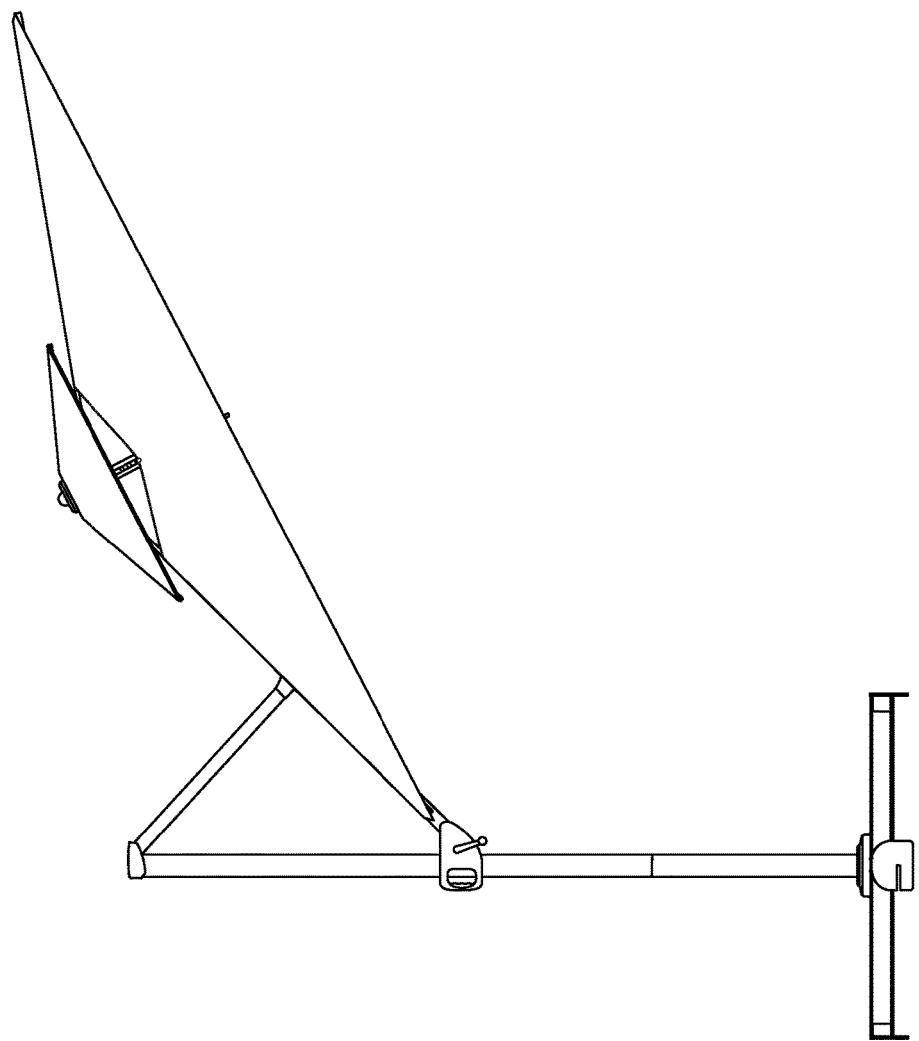

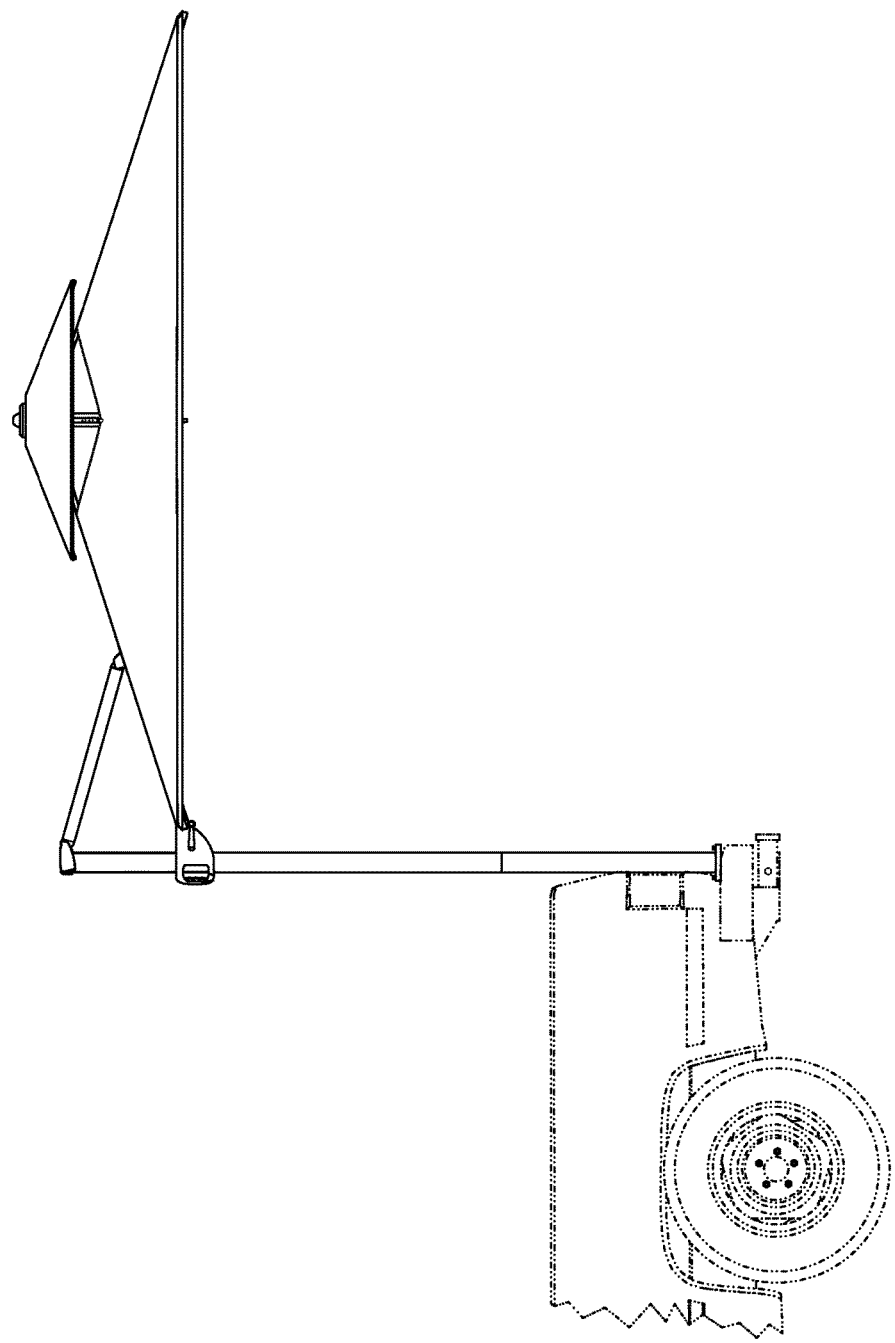

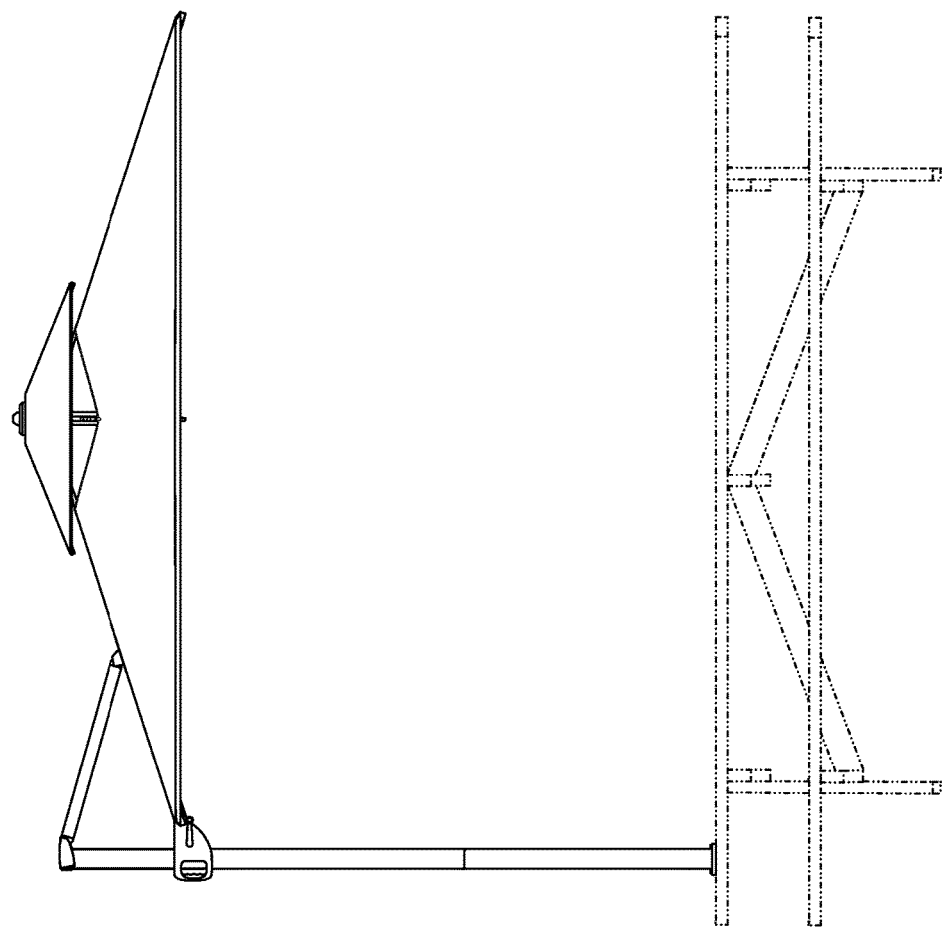

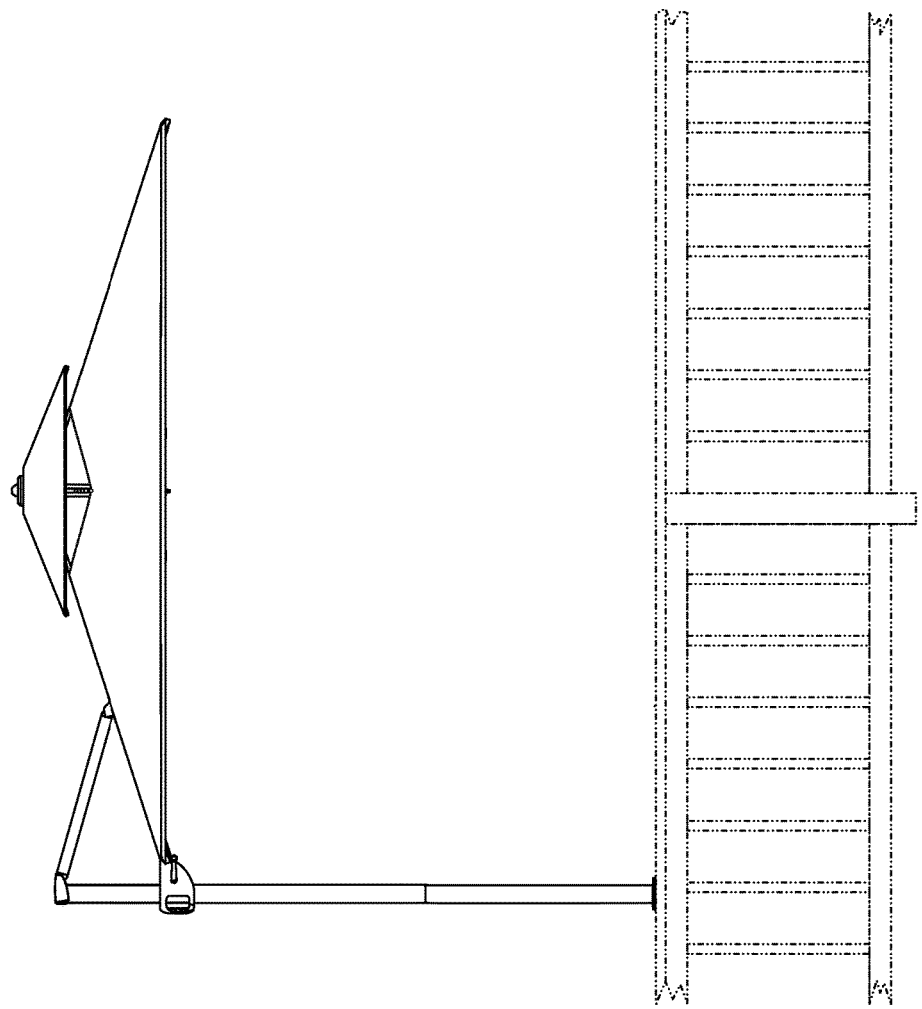

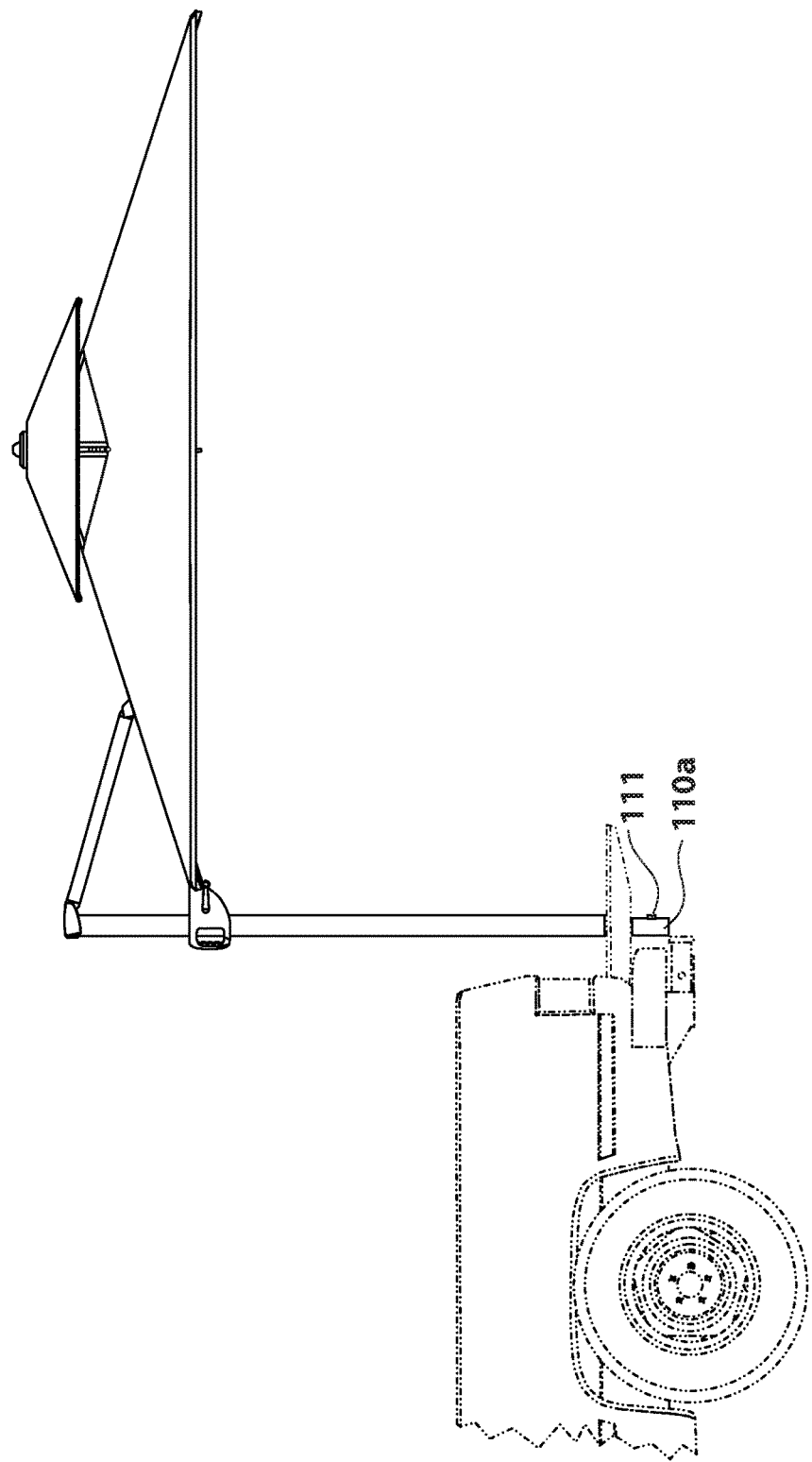

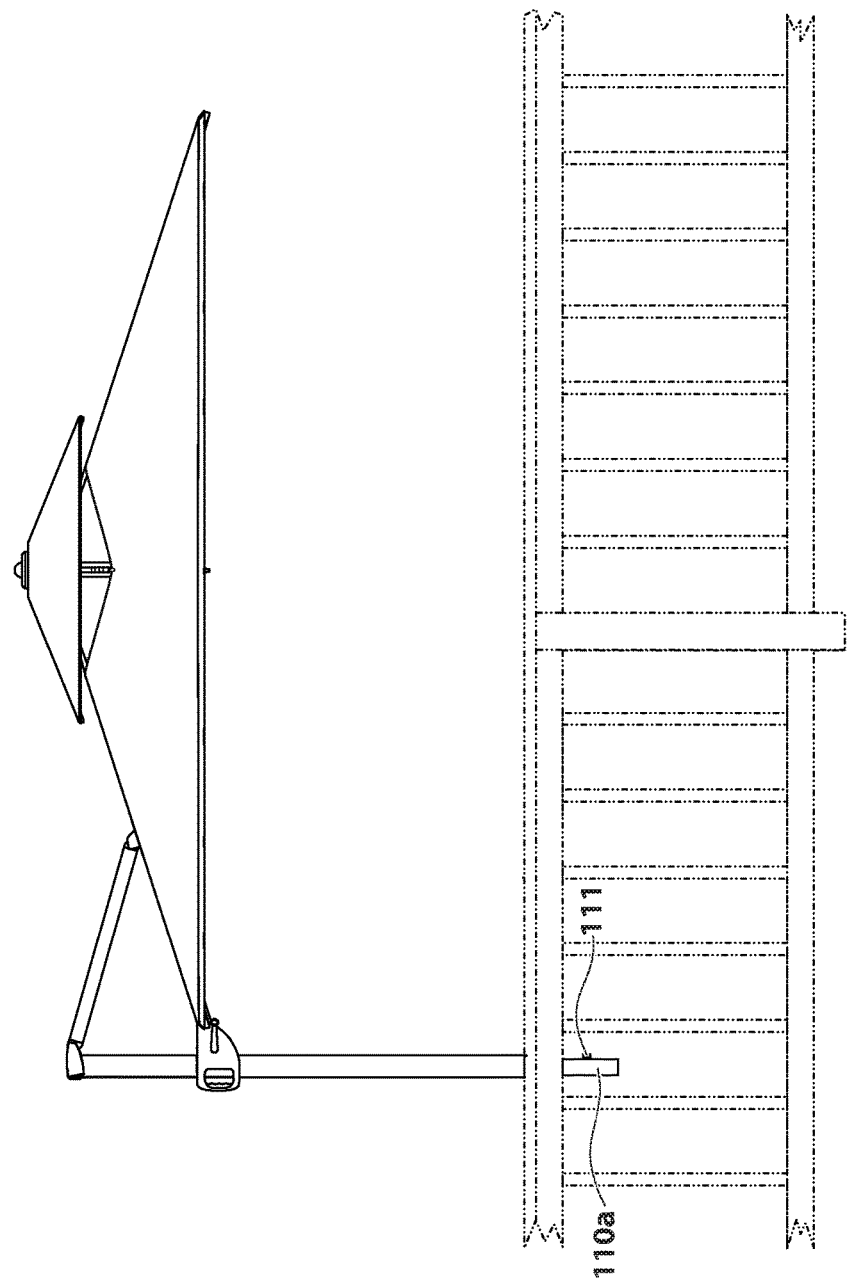

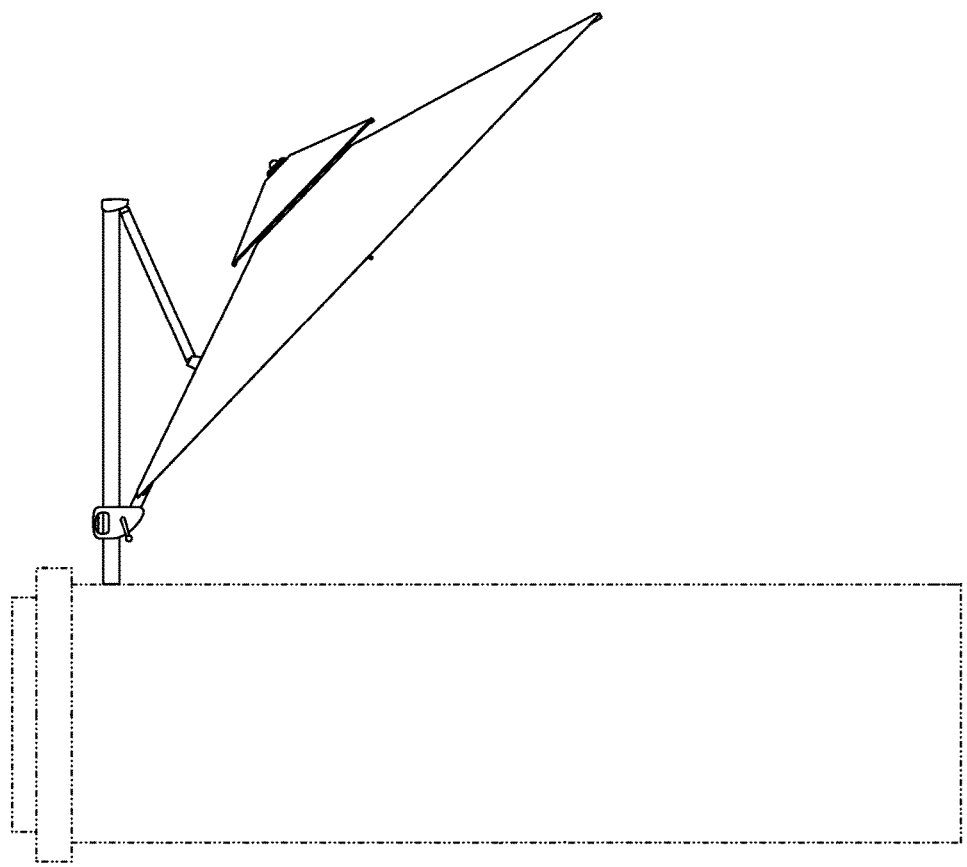

MULTI-FUNCTION DOUBLE-CANOPY UMBRELLA

1. FIELD OF THE INVENTION

The present invention relates to a canopy umbrella, which is cheap to produce, is easy to ship as one unit, requires little assembly, and can be quickly and easily be unfolded. Particularly, the present invention relates to a multi-function double-canopy umbrella, having:
1) Multi-function fence-mountable balcony-mountable bumper-mountable hitch-mountable base system,
2) Multi-function fence-mountable balcony-mountable bumper-mountable hitch-mountable post system,
3) Height-adjusting angle-adjusting multi-canopy-deploying system,
4) Adjustable water-collector wind-blocker privacy-screen double-awning central canopy system, and
5) Adjustable water-collector wind-blocker privacy-screen double-awning ring canopy system.

2. DESCRIPTION OF THE PRIOR ART

A number of canopy umbrellas have been introduced.

U.S. Pat. No. 6,443,172, issued 2002 Sep. 3, to Donald U. Brumfield, relates to a beach umbrella which is supported with a stand having a lower shaft and an upper shaft, with the upper shaft supporting a beach umbrella mast. Before attaching the umbrella mast, the tubular upper shaft serves as an impact tool against a protuberance on the lower shaft, allowing hammering of the lower shaft into composite earth. The upper shaft telescopes onto the lower shaft securing a tray in place against the protuberance after hammering is completed.

U.S. Pat. No. 6,588,037, issued 2003 Jul. 8, to David Eno, relates to a portable support device adapted for being disassembled into segments for packing and being readily assembled. The support device in a first embodiment has a base block to which a pair of arms is assembled and to which a segmented pole is mounted in vertical orientation to support a mosquito net. In a second embodiment, an arm is assembled to a beam to define a horizontal plane and a segmented pole is assembled to the beam in a vertical orientation without use of a connecting block. In third and fourth embodiments, a pair of horizontal members are connected to each other and to a vertical support pole by a rigid connector.

U.S. Pat. No. 6,732,985, issued 2004 May 11, to Douglas Chet Cantrell, describes a multi-segmented central post member with upper, middle, and lower sections having a cup-holding element, a utility member and a clothes-hanging element having a plurality of hook members extending therefrom. The post segments have compatible male and female threads on their respective ends for establishing a rectilinear connection to the mating post segment. The bottom segment has a first end which is tapered for easy insertion in sand or turf. The threaded male portions of the post segments are radially offset from the outer circumference to form retaining flanges for the accessory units. The ends of the post segments with the threaded female recesses have a similar retaining flange.

U.S. Pat. No. 6,755,005, issued 2004 Jun. 29, to Robert Paul Czachor, describes a stiffener system which includes a stiffener and a fastener means. The stiffener includes an extruded body that includes a plurality of projections. The stiffener couples to the apparatus to facilitate increasing a structural integrity of the apparatus. The fastener means secures the stiffener to the apparatus.

U.S. Pat. No. 6,986,322, issued 2006 Jan. 17, to Emily Lumpkin, discloses a bird feeder for preventing squirrels and other type rodent animals from consuming the bird food includes a top convex surface, a bottom convex surface and a concave middle surface. The top and bottom convex surfaces are inverted bowls having equal diameters and depths. The concave middle surface is a non-inverted bowl having a diameter less than the top and bottom inverted bowls, and has a greater depth. The middle bowl holds the bird food for birds to consume. The rim of the middle bowl may serve as a perch for the feeding birds to light upon.

U.S. Pat. No. 7,191,996, issued 2007 Mar. 20, to Dimitrios Patsalaridis, describes a device, destined to be anchored in the ground of granular composition, comprises a rod with a hollow tubular section, the latter having an open upper end wherein can be fixed an object and an intermediate orifice on its flank. The orifice enables evacuation of the granular matter constituting the ground and penetrating into the rod through its open lower end when the device is being anchored in the ground.

U.S. Pat. No. 7,302,745, issued 2007 Dec. 4, to Ragnar Stahle, relates to a locking arrangement which includes an inner element and an outer element, where the inner element is axially shiftable relative to the outer element, such as a shaft of a tool, one end of the outer element, has a locking member for locking the inner element and the outer element, relative to one another, the locking member is maneuverable by a maneuvering member that is remote from the locking member in a direction toward another end of the outer element, via an affecting member that is shiftable along or rotatable about an axis that is parallel to a lengthwise axis of the outer element so that the affecting member has a tube that completely or partially encloses the outer element.

U.S. Pat. No. 7,810,514, issued 2010 Oct. 12, to Jeh-kun Lah, relates to a connector for tent poles which has a body consisting of a single piece on the whole, an approximate half part of the body constituting a first connection part which a single pole assembly passes through and is connected to, the other approximate half part of the body constituting a second connection part to which another pole assembly or a clip is connected, a pivot hole consisting of a base hole formed through the first connection part in a direction traversing a longitudinal axis of the body and having a size corresponding to an outer diameter of the pole assembly at a central point of a cross section of the first connection part and an expansion hole widely expanded in a radially outward direction of the body from both front and rear sides of the base hole so as to correspond to a swiveling trajectory of the pole assembly so that the pole assembly is able to swivel by a predetermined angle on any plane intersecting the longitudinal axis of the body, around the base hole of a swivel center, and pivot protrusions that are fitted into a gap between an end face of a male pole and an end face of a female pole of the pole assembly so as to serve as a pivot point combining the swiveling and position-fixing functions of the pole assembly, have respectively a cam surface following a swiveling trajectory delineated by the two end faces and are formed at two points opposite to each other in the base hole of each pivot hole.

U.S. Pat. No. 8,075,217, issued 2011 Dec. 13, to Donald H. Eason, relates to an apparatus that comprises a compression sleeve element established at least partially around portions of a first elongated member that telescopes from a larger elongated member in which it may nest. A relative motion obstruction element may disallow only certain types of motion, e.g., rotational and axial, of the compression sleeve element relative to the elongated members around which it may be at least partially established. As it may be the compression enhancement element—which may be used to generate a retaining compression force element—that prevents perpendicular displacement of the compression sleeve element, deactivation and effective disengagement of the compression enhancement element may allow for a quick removal of the compression sleeve element without requiring that it be slid off an end of either elongated member.

U.S. Pat. No. 8,191,561, issued 2012 Jun. 5, to Edward J. Brooks, III, relates to an umbrella with an integral anchoring structure which is provided. The umbrella includes a post having a lower end for insertion into the ground, and an upper end for supporting an umbrella top. The umbrella includes an integral spiral shaped anchoring structure formed on the lower end of the post. The anchoring structure is formed with a width, W, greater than a diameter of the post and a length, L, which is adapted to stabilize a weight of the umbrella and secure the umbrella and the post in a variety of earthen conditions such as sand, lawn, and soil even in a prevailing breeze or stormier conditions. The umbrella further includes one or more retractable levers integrally attached along the post.

U.S. Pat. No. 8,807,513, issued 2014 Aug. 19, to Dee Volin, outlines a multi-adjustable, rotating, and opposite-double-locking umbrella-stanchion system which is operated with one finger for oppositely double-locking and -unlocking the umbrella-supporting post of a crank-arm-operated umbrella to secure it in different positions. The system comprises a canopy system, a supporting post, a stanchion base, a U-shaped rotational lever, an actuator arm, a push rod, two opposite L-shaped locking arms, two opposite locking cleats, radial teeth, and two opposite tension springs for pushing the opposite locking cleats downward to oppositely double-lock the post and the canopy system, in place. The radial teeth are molded to the stanchion base. To operate the system, lift the U-shaped rotational lever with one finger to lift the opposite locking cleats to oppositely double-unlock them. Next, rotate the supporting post to a desired position. Then, release the U-shaped rotational lever to oppositely double-lock the opposite locking cleats between the radial teeth.

U.S. Pat. No. 8,875,350, issued 2014 Nov. 4, to Richard K. Bukovitz, outlines a reversible tip assembly for selectively connecting an extension pole/handle extension to tool handles having either compatible quick release lock mechanisms or conventional internally threaded sockets. The tip assembly comprises a body having oppositely extending rod-like tips at opposite ends of the body. One of the tips has a plurality of circumferentially spaced axially extending external thread segments. The other tip has an end portion that is compatible with quick release lock mechanisms.

U.S. Pat. No. 8,960,210, issued 2015 Feb. 24, to John Andrew Bacik, refers to an umbrella system relating to the general protection of fixed outdoor umbrellas, especially during windy conditions. The umbrella system uses a supportive shaft equipped with a resiliently deformable region allowing omni-directional bending under wind loading. A preferred embodiment of the deformable region comprises a helical spring.

U.S. Pat. No. 9,163,823, issued 2015 Oct. 20, to Snehal S. Choksi, refers to a light stand assembly with a base having pivoting legs and a power supply circuit. An adjustable post detachably connects to the base. The adjustable post is configured for telescoping movement between a lower position and a raised position, and secures at a selected position with latches. An adjustable post connector moveably connects to the adjustable post. A pair of light modules detachably connect to the adjustable post connector and operatively connects to the power supply circuit.

U.S. Pat. No. 9,359,785, issued 2016 Jun. 7, to Nigel M. Catt, refers to a metal post reinforcement arrangement adapted to be clamped about a broken section of a metal post, including two opposing brackets wherein when a bolt fixes one bracket to the other about the metal post the bolt divides the broken section into upper and lower portions so as to provide support and/or structural integrity when the reinforcement arrangement is clamped about the broken section and wherein each bracket has a substantially semi circular cross-sectional configuration along said bracket length that includes a longitudinal central segment terminating on opposed sides with internally directed curved edges with corresponding upwardly extended rounded shoulders that provide substantially triangular dimples on the internal side of the bracket, and wherein a peripheral flange stems out from a rounded dip from each substantially triangular dimple such that said brackets are adapted to be fixed around metal posts having different shapes.

U.S. Pat. No. 9,493,962, issued 2016 Nov. 15, to Darrel W. Eddy, demonstrates an umbrella stand is used to mount umbrellas or flags to tables, vehicles, structures, and various structures. The umbrella stand includes a mounting assembly and a rod holder. The rod holder is used to attach an umbrella or flag to the umbrella stand. The mounting assembly is used to secure the umbrella or flag to a surface. The mounting assembly includes a support plate, a first mounting plate and a first mounting fastener. The support plate is used as a base. The first mounting plate and the first mounting fastener connect to the support plate and help secure the support plate to a surface.

U.S. Pat. No. 9,616,317, issued 2017 Apr. 11, to Jason Neubauer, demonstrates a releasable lock assembly for use with a collapsible pole assembly having a first shaft section slidably secured to a second shaft section includes a locking mechanism configured to selectively lock the first and second shaft sections in an extended position. The releasable lock assembly further includes a stop assembly having an elongated member having first and second ends, wherein the first end is secured to one of the first and second shaft sections and the second end secured to the other of the first and second shaft sections.

U.S. Pat. No. 9,624,685, issued 2017 Apr. 18, to Ian Blake Cordle, demonstrates a mount system for an umbrella which includes a base configured to be adhered to a ground surface. An attachment assembly is connected to the base. A main tube assembly is connected to the attachment assembly with a key such that the key can hold the main tube assembly to the base at any angle. An umbrella is connected to the main tube assembly.

U.S. Pat. No. 9,764,458, issued 2017 Sep. 19, to Eric Resh, demonstrates a telepole for swimming pool cleaning which is disclosed as including an inner tube and a locking device to temporarily secure the inner tube in a desired position within an outer tube. A preferred lightweight design may be at least partially hollow, and durability may be provided by inner/reinforcement wall(s) in one or both of the tubes. A collar element is disclosed as "locking" the inner tube in place within the outer tube. The collar's opening and the profile of the inner tube are disclosed in a relationship that prevents the inner tube from rotating within the collar.

U.S. Pat. No. 9,771,734, issued 2017 Sep. 26, to Bradley A. Odegard, defines a pole reinforcement system for improving the stability of a pole with both an above-grade and below-grade installation. The pole reinforcement system generally includes a sleeve assembly which is secured around a pole via one or more retainers which may comprise brackets, securing bands, or other structures. One or more insertion attachments are utilized so that the sleeve assembly may be secured to the pole at a position below-grade. The sleeve assembly may comprise one or more sleeves which are secured around the pole. By utilizing the present invention to reinforce the pole both above- and below-grade, the stability of the pole may be greatly improved over prior reinforcement methods.

U.S. Pat. No. 9,844,288, issued 2017 Dec. 19, to Yong Fu, defines a connector system which facilitates the connection of a first tree trunk to a second tree trunk of an artificial tree system. The connector system can prohibit rotation of the first tree trunk relative to the second tree trunk.

U.S. Pat. No. 9,924,768, issued 2018 Mar. 27, to Yoel Rosenberger, defines an umbrella which has a vertical pole extending downward from the fabric region, but it also has horizontal poles extending outwards from this vertical pole. In addition, it has a plurality of further vertical poles extending downward from the horizontal poles. In this manner, the umbrella is supported by four, six, or more vertical poles. Any or all of the poles can be telescoping poles, such that they can be increased or decreased in length. The connection of the horizontal poles to a vertical pole above and/or below can also be rotatable connections which lock into place at 90 degrees, but through human force, can unlock to place the horizontal poles in parallel with a vertical pole above or below itself. In this manner, one can fold the umbrella over the poles and shorten the length and/or width of the device.

U.S. Pat. No. 9,974,366, issued 2018 May 22, to Eberhard Heim, defines a pole comprising a pole handle and a pole tip, with at least two tube portions located therebetween, which in an assembled state of the pole are connected to one another by means of insertion connections aligned along a longitudinal pole axis A. At least one of the plug connections is realized on a second tube portion by way of a form-fit and/or force-fit locking device, wherein the second tube portion has a smaller the same outer diameter than the inner diameter of a first tube portion, and which can be inserted into the first tube portion, and which can be fixed in the relative axial position by means of the form-fit locking device. On at least one of the plug connections, a tubular sleeve having a clamping element in a receiving groove is arranged between the tubular sleeve and the lower end of the first tubular portion.

U.S. Pat. No. 9,976,319, issued 2018 May 22, to Samuel F. Lamke, defines a frame for a portable structure preferably in the form of a tent includes a hub having a plurality of tent pole frame members attached to it. The each tent pole is formed from a plurality of pole sections interconnected to one another along a structure permitting the pole sections to fold and/or compact upon one another. The poles define a proximate end attached to the hub and a distal end having a locking structure associated with it. The locking structure attaches each pole to the material defining the portable structure. The structure provides a reduced size package in the compacted position of the structure.

U.S. Pat. No. D341,831, issued 1993 Nov. 30, to Peter Mozdzanowski, depicts an ornamental design for a radio-equipped telescoping umbrella with solar collectors.

U.S. Pat. No. D394,544, issued 1998 Mar. 26, to Robert K. Tropiano, depicts an ornamental design for a beach umbrella anchor.

U.S. Publication No. 20150060631, published 2015 Mar. 5, by Lianzhang Pan, reveals a pole securement sleeve which includes a tubular housing member having a sidewall defining an internal passageway configured to receive a pole therein; a clamping member, a portion of the clamping member disposed in the internal passageway of the tubular housing member, the clamping member configured to apply a compressive force about a portion of an outer periphery of the pole; and a clamping member adjustment means operatively coupled to the clamping member, the clamping member adjustment means together with the clamping member circumscribing an area configured to be intersected by the pole. When a moment or torque is applied to the clamping member adjustment means, a size of the area circumscribed by the clamping member adjustment means and the clamping member is adjusted.

U.S. Publication No. 20150330099, published 2015 Nov. 19, by Nanqing Zhou, reveals a tent which includes a tent frame and a tent cloth. The tent frame is composed of a plurality of support pole assemblies. One end of each support pole assembly is pivotally connected to a top module seat. Each support pole assembly includes a top support pole, a bottom support pole, and a joint connected between the top support pole and the bottom support pole. The joint includes a joint head and a pivot seat at the outer side of the joint head. The bottom end of the top support pole is pivotally connected to the pivot seat. The bottom support pole is composed of an inner pipe and an outer pipe. The inner pipe and the outer pipe are retractable each other and connected through a positioning configuration.

DISADVANTAGES OF THE PRIOR ART

The prior art have failed to solve many problems associated with such canopy umbrellas, as follows:

1) No prior art mention or disclose any canopy umbrella, having mounting plate 104.

Therefore, the prior art of canopy umbrella:

a) Can not mount the multi-function double-canopy umbrella to first post-stabilizing foot 102 and second post-stabilizing foot 103, to stabilize the multi-function double-canopy umbrella from tipping over (see FIG. 2A);

b) Can not mount the multi-function double-canopy umbrella to a fence, to provide shade and protection when a fence is accessible (see FIG. 18D);

c) Can not mount the multi-function double-canopy umbrella to a balcony, to provide shade and protection when a balcony is accessible (see FIG. 20F);

d) Can not mount the multi-function double-canopy umbrella to a bumper, to provide shade and protection when a bumper is accessible (see FIG. 18A);

e) Can not mount the multi-function double-canopy umbrella to a hitch, to provide shade and protection when a hitch is accessible (see FIG. 19C);

f) Can not mount the multi-function double-canopy umbrella to a tailgate, to provide shade and protection when a tailgate is accessible
(see FIG. 18B); and
g) Can not mount the multi-function double-canopy umbrella to a table, to provide shade and protection when a table is accessible
(see FIG. 18C).

2) No prior art mention or disclose any canopy umbrella, having
four wedging plates 105.
Therefore, the prior art of canopy umbrella:
a) Can not slidably hook multiple wedging plates of other multi-function double-canopy umbrellas together
in the directions of arrows 141*a* and 141*b*, to provide various configuration options for additional shade and protection
(see FIG. 21A, FIG. 21B, FIG. 21C, FIG. 21D, FIG. 21E, and FIG. 21F);
b) Can not slidably hook up to two adjacent slats of a fence
to secure four wedging plates 105 to the fence
(see FIG. 12); and
c) Can not slidably wedge between the two planks of a patio or deck to secure the four wedging plates 105 to the patio or deck
(see FIG. 13 and FIG. 14).

3) No prior art mention or disclose any canopy umbrella, having inner core 110*a*.
Therefore, the prior art of canopy umbrella:
a) Can not allow manufacturers to divide a long post into shorter upper post 109 and shorter lower post 108
to reduce the length and volume of the shipping package of the multi-function double-canopy umbrella in a shipping container to save money from expensive shipping costs
(see FIG. 1B and FIG. 4B);
b) Can not mount upper post 109 on the lower post 108,
to give the multi-function double-canopy umbrella more height
(see FIG. 4B);
c) Can not mount upper post 109 on a fence,
to provide shade and protection when a fence is accessible
(see FIG. 19E);
d) Can not mount upper post 109 on a balcony,
to provide shade and protection when a balcony is accessible
(see FIG. 20E);
e) Can not mount upper post 109 on a bumper,
to provide shade and protection when a bumper is accessible
(see FIG. 19B);
f) Can not mount upper post 109 on a hitch,
to provide shade and protection when a hitch is accessible
(see FIG. 19C);
g) Can not mount upper post 109 on a tailgate,
to provide shade and protection when a tailgate is accessible
(see FIG. 19A);
h) Can not mount upper post 109 on a table,
to provide shade and protection when a table is accessible
(see FIG. 19D);
i) Can not mount upper post 109 on a column,
to provide shade and protection when a column is accessible
(see FIG. 19F); and
j) Can not mount upper post 109 on a wall,
to provide shade and protection when a wall is accessible
(see FIG. 20A).

4) No prior art mention or disclose any canopy umbrella, having
core-securing bolts 111.
Therefore, the prior art of canopy umbrella:
a) Can not secure together lower post 108, upper post 109, and inner core 110*a*,
to provide height and strength to the multi-function double-canopy umbrella
(see FIG. 4A); and
b) Can not secure inner core 110*a* to a fence, a balcony, a bumper, a hitch, a tailgate, a table, a column, and a wall,
to allow for multiple options of shade and protection
(see FIG. 18D, FIG. 20F, FIG. 18A, FIG. 19C, FIG. 19A, FIG. 18C, FIG. 18F, and FIG. 20B).

5) No prior art mention or disclose any canopy umbrella, having
central-canopy-rib-supporting arms 128.
Therefore, the prior art of canopy umbrella:
a) Can not support central-canopy-supporting ribs 127,
to provide central canopy 129 structural support
(see FIG. 9A and FIG. 9B);
b) Can not hingedly connect central-canopy-supporting ribs 127 and first ring-canopy-supporting ribs 132,
to provide structural support
(see FIG. 9A and FIG. 9B); and
c) Can not hingedly connect central-canopy-supporting ribs 127 and first ring-canopy-supporting ribs 132,
to help make folding the multi-function double-canopy umbrella easier
(see FIG. 9A and FIG. 9B).

6) No prior art mention or disclose any canopy umbrella, having
central canopy 129.
Therefore, the prior art of canopy umbrella:
a) Can not function as a water collector
to collect rain water when used upside down in the directions of arrows 142 and 143
(see FIG. 16A);
b) Can not function as a wind blocker
to block wind
(see FIG. 20D);
c) Can not function as a privacy screen
to provide privacy
(see FIG. 19F);
d) Can not function as a awning
to angledly block rain and sun beams
(see FIG. 20B);
e) Can not function as a canopy
to vertically block rain and sun beams
(see FIG. 20F);
f) Can not function as a wind redirector
to redirect wind in and out of canopy
in the directions of arrows 144, 145, 146, 147, and 148
(see FIG. 16B, FIG. 16C, and FIG. 16D); and g) Can not function as a wind resistor
   to protect the canopy from blowing when corners are attached to ground with ropes and stakes
   in the direction of arrow 149
   (see FIG. 16D).
7) No prior art mention or disclose any canopy umbrella, having
   multi-rib-connecting cores 134a.
   Therefore, the prior art of canopy umbrella:
   a) Can not allow manufacturers to divide long ribs into shorter first ring-canopy-supporting ribs 132 and shorter second ring-canopy-supporting ribs 133
      to reduce the length and volume of the shipping package of the multi-function double-canopy umbrella in a shipping container to save money from expensive shipping costs
      (see FIG. 1A (Prior Art) and FIG. 1B); and
   b) Can not connect first ring-canopy-supporting ribs 132 to second ring-canopy-supporting ribs 133,
      to provide strength and structure to the multi-function double-canopy umbrella
      (see FIG. 10).
8) No prior art mention or disclose any canopy umbrella, having
   rib-length-adjusting holes 134b.
   Therefore, the prior art of canopy umbrella:
   Can not adjust first ring-canopy-supporting ribs 132, second ring-canopy-supporting ribs 133, and multi-rib-connecting inner cores 134a
      to adjust first ring-canopy-supporting ribs 132 and second ring-canopy-supporting ribs 133 to different lengths, and
      to adjust ring canopy 137 to multiple different sizes
      (see FIG. 10).
9) No prior art mention or disclose any canopy umbrella, having
   ring canopy 137.
   Therefore, the prior art of canopy umbrella:
   a) Can not function as a water collector
      to collect rain water when used upside down in the directions of arrows 142 and 143
      (see FIG. 16A);
   b) Can not function as a wind blocker
      to block wind
      (see FIG. 20D);
   c) Can not function as a privacy screen
      to provide privacy
      (see FIG. 19F);
   d) Can not function as an awning
      to angledly block rain and sun beams
      (see FIG. 20B);
   e) Can not function as a canopy
      to vertically block rain and sun beams
      (see FIG. 20F);
   f) Can not function as a wind redirector
      to redirect wind in and out of canopy
      in the directions of arrows 144, 145, 146, 147, and 148
      (see FIG. 16B, FIG. 16C, and FIG. 16D); and
   g) Can not function as a wind resistor
      to protect the canopy from blowing when corners are attached to ground with ropes and stakes
      in the direction of arrow 149
      (see FIG. 16D).
10) No prior art mention or disclose any canopy umbrella, having
    canopy-size-adjusting flaps 139.
    Therefore, the prior art of canopy umbrella:
    Can not adjustably be attached to first ring-canopy-supporting ribs 132, respectively
       to adjust ring canopy 137 to multiple different sizes
       (see FIG. 11A and FIG. 11B).
11) No prior art mention or disclose any canopy umbrella, having
    canopy-size-adjusting holes 140.
    Therefore, the prior art of canopy umbrella:
    Can not adjust first ring-canopy-supporting ribs 132 and canopy-size-adjusting flaps 139
       to adjust ring canopy 137 to multiple different sizes
       (see FIG. 11A and FIG. 11B).

OBJECTS AND ADVANTAGES OF THE INVENTION

The present invention substantially departs from the conventional concepts and designs of the prior art. In doing so, the present invention provides a multi-function double-canopy umbrella (having: 1) Multi-function fence-mountable balcony-mountable bumper-mountable hitch-mountable base system, 2) Multi-function fence-mountable balcony-mountable bumper-mountable hitch-mountable post system, 3) Height-adjusting angle-adjusting multi-canopy-deploying system, 4) Adjustable water-collector wind-blocker privacy-screen double-awning central canopy system, and 5) Adjustable water-collector wind-blocker privacy-screen double-awning ring canopy system) having many unique and significant features, functions, and advantages, which overcome all the disadvantages of the prior art, as follows:
1) It is an object of the new invention to provide a multi-function double-canopy umbrella, having
   mounting plate 104.
   Therefore, the multi-function double-canopy umbrella:
   a) Can mount the multi-function double-canopy umbrella to first post-stabilizing foot 102 and second post-stabilizing foot 103,
      to stabilize the multi-function double-canopy umbrella from tipping over
      (see FIG. 2A);
   b) Can mount the multi-function double-canopy umbrella to a fence,
      to provide shade and protection when a fence is accessible
      (see FIG. 18D);
   c) Can mount the multi-function double-canopy umbrella to a balcony,
      to provide shade and protection when a balcony is accessible
      (see FIG. 20F);
   d) Can mount the multi-function double-canopy umbrella to a bumper,
      to provide shade and protection when a bumper is accessible
      (see FIG. 18A);
   e) Can mount the multi-function double-canopy umbrella to a hitch,
      to provide shade and protection when a hitch is accessible
      (see FIG. 19C);

f) Can mount the multi-function double-canopy umbrella to a tailgate,
to provide shade and protection when a tailgate is accessible
(see FIG. 18B); and
g) Can mount the multi-function double-canopy umbrella to a table,
to provide shade and protection when a table is accessible
(see FIG. 18C).

2) It is another object of the new invention to provide a multi-function double-canopy umbrella, having four wedging plates 105.
Therefore, the multi-function double-canopy umbrella:
a) Can slidably hook on multiple wedging plates of other space-saver umbrellas
in the directions of arrows 141a and 141b,
to provide various configuration options and additional shade and protection
(see FIG. 21A, FIG. 21B, FIG. 21C, FIG. 21D, FIG. 21E, and FIG. 21F);
b) Can slidably hook up to the two adjacent slats of a fence
to secure four wedging plates 105 to the fence
(see FIG. 12); and
c) Can slidably wedge between the two planks of a patio or deck
to secure four wedging plates 105 to the patio or deck
(see FIG. 13 and FIG. 14).

3) It is still another object of the new invention to provide a multi-function double-canopy umbrella, having inner core 110a.
Therefore, the multi-function double-canopy umbrella:
a) Can allow manufacturers to divide a long post into shorter upper post 109 and shorter lower post 108
to reduce the length and volume of the shipping package of the multi-function double-canopy umbrella in a shipping container to save money from expensive shipping costs
(see FIG. 1B and FIG. 4B);
b) Can mount upper post 109 on lower post 108,
to give the multi-function double-canopy umbrella more height
(see FIG. 4B);
c) Can mount upper post 109 on a fence,
to provide shade and protection when a fence is accessible
(see FIG. 19E);
d) Can mount upper post 109 on a balcony,
to provide shade and protection when a balcony is accessible
(see FIG. 20E);
e) Can mount upper post 109 on a bumper,
to provide shade and protection when a bumper is accessible
(see FIG. 19B);
f) Can mount upper post 109 on a hitch,
to provide shade and protection when a hitch is accessible
(see FIG. 19C);
g) Can mount upper post 109 on a tailgate,
to provide shade and protection when a tailgate is accessible
(see FIG. 19A);
h) Can mount upper post 109 on a table,
to provide shade and protection when a table is accessible
(see FIG. 19D);
i) Can mount upper post 109 on a column,
to provide shade and protection when a column is accessible
(see FIG. 19F); and
j) Can mount upper post 109 on a wall,
to provide shade and protection when a wall is accessible
(see FIG. 20A).

4) It is a further object of the new invention to provide a multi-function double-canopy umbrella, having core-securing bolts 111.
Therefore, the multi-function double-canopy umbrella:
a) Can secure together lower post 108, upper post 109, and inner core 110a,
to provide to provide height and strength to the multi-function double-canopy umbrella
(see FIG. 4A); and
b) Can secure inner core 110a to a fence, a balcony, a bumper, a hitch, a
tailgate, a table, a column, and a wall,
to allow for multiple options of shade and protection
(see FIG. 18D, FIG. 20F, FIG. 18A, FIG. 19C, FIG. 19A, FIG. 18C, FIG. 18F, and FIG. 20B).

5) It is an even further object of the new invention to provide a multi-function double-canopy umbrella, having central-canopy-rib-supporting arms 128.
Therefore, the multi-function double-canopy umbrella:
a) Can support central-canopy-supporting ribs 127,
to provide central canopy 129 structural support
(see FIG. 9A and FIG. 9B);
b) Can hingedly connect central-canopy-supporting ribs 127 and first ring-canopy-supporting ribs 132,
to provide structural support
(see FIG. 9A and FIG. 9B); and
c) Can hingedly connect central-canopy-supporting ribs 127 and first ring-canopy-supporting ribs 132,
to help make folding the multi-function double-canopy umbrella easier
(see FIG. 9A and FIG. 9B).

6) It is still another object of the new invention to provide a multi-function double-canopy umbrella, having central canopy 129.
Therefore, the multi-function double-canopy umbrella:
a) Can function as a water collector
to collect rain water when used upside down in the directions of arrows 142 and 143
(see FIG. 16A);
b) Can function as a wind blocker
to block wind
(see FIG. 20D);
c) Can function as a privacy screen
to provide privacy
(see FIG. 19F);
d) Can function as a awning
to angledly block rain and sun beams
(see FIG. 20B);
e) Can function as a canopy
to vertically block rain and sun beams
(see FIG. 20F);

f) Can function as a wind redirector
to redirect wind in and out of canopy
in the directions of arrows 144, 145, 146, 147, and 148
(see FIG. 16B, FIG. 16C, and FIG. 16D); and
g) Can function as a wind resistor
to protect the canopy from blowing when corners are attached to ground with ropes and stakes
in the direction of arrow 149
(see FIG. 16D).

7) It is yet another object of the new invention to provide a multi-function double-canopy umbrella, having multi-rib-connecting cores 134a.
Therefore, the multi-function double-canopy umbrella:
a) Can allow manufacturers to divide long ribs into shorter first ring-canopy-supporting ribs 132 and shorter second ring-canopy-supporting ribs 133
to reduce the length and volume of the shipping package of the multi-function double-canopy umbrella in a shipping container to save money from expensive shipping costs
(see FIG. 1A (Prior Art) and FIG. 1B); and
b) Can connect first ring-canopy-supporting ribs 132 to second ring-canopy-supporting ribs 133,
to provide strength and structure to the multi-function double-canopy umbrella
(see FIG. 10).

8) It is even still yet another object of the new invention to provide a multi-function double-canopy umbrella, having rib-length-adjusting holes 134b.
Therefore, the multi-function double-canopy umbrella:
Can adjust first ring-canopy-supporting ribs 132, second ring-canopy-supporting ribs 133, and multi-rib-connecting inner cores 134a
to adjust first ring-canopy-supporting ribs 132 and second ring-canopy-supporting ribs 133 to different lengths, and
to adjust ring canopy 137 to multiple different sizes
(see FIG. 10).

9) It is still further yet another object of the new invention to provide a multi-function double-canopy umbrella, having
ring canopy 137.
Therefore, the multi-function double-canopy umbrella:
a) Can function as a water collector
to collect rain water when used upside down
in the directions of arrows 142 and 143
(see FIG. 16A);
b) Can function as a wind blocker
to block wind
(see FIG. 20D);
c) Can function as a privacy screen
to provide privacy
(see FIG. 19F);
d) Can function as an awning
to angledly block rain and sun beams
(see FIG. 20B);
e) Can function as a canopy
to vertically block rain and sun beams
(see FIG. 20F);
f) Can function as a wind redirector
to redirect wind in and out of canopy
in the directions of arrows 144, 145, 146, 147, and 148
(see FIG. 16B, FIG. 16C, and FIG. 16D); and
g) Can function as a wind resistor
to protect the canopy from blowing when corners are attached to ground with ropes and stakes
in the direction of arrow 149
(see FIG. 16D).

10) It is even still further yet another object of the new invention to provide a multi-function double-canopy umbrella, having canopy-size-adjusting flaps 139.
Therefore, the multi-function double-canopy umbrella:
Can adjustably be attached to first ring-canopy-supporting ribs 132, respectively
to adjust ring canopy 137 to multiple different sizes
(see FIG. 11A and FIG. 11B).

11) It is even further yet still another object of the new invention to provide a multi-function double-canopy umbrella, having canopy-size-adjusting holes 140.
Therefore, the multi-function double-canopy umbrella:
Can adjust first ring-canopy-supporting ribs 132 and canopy-size-adjusting flaps 139
to adjust ring canopy 137 to multiple different sizes
(see FIG. 11A and FIG. 11B).

Other objects and advantages of the present invention will become apparent from a consideration of the accompanying drawings and ensuing description.

SUMMARY OF THE INVENTION

A multi-function double-canopy umbrella comprises: a first post-stabilizing foot, a second post-stabilizing foot, a mountable plate bolted to the first post-stabilizing foot and the second post-stabilizing foot for mounting the multi-function umbrella on a fence and a balcony and a bumper and a hitch and a tailgate and a table, a lower post attached to the mounting plate, an upper post, a inner core inserted into the lower post and the upper post for dividing the upper post into shorter ones to reduce the length and volume of shipping package and for mounting the multi-function umbrella on a fence and a balcony and a bumper and a hitch and a tailgate and a table and a column and a wall, a multi-canopy-hanging central tube, a multi-canopy-deploying spool, a multi-canopy-deploying crank rotatably attached to the multi-canopy-deploying spool, a multi-canopy-deploying rope threaded through the multi-canopy-hanging central tube, a plurality of central-canopy-supporting ribs a plurality of central-canopy-rib-raising arms respectively pivotably attached to the central-canopy-supporting ribs, a central canopy attached to the central-canopy-supporting ribs for functioning as a water collector and a wind blocker and a privacy screen and an awning and a canopy and a wind redirector and a wind resistor, a plurality of first ring-canopy-supporting ribs respectively pivotably connected to the ring-canopy-rib intersector, and pivotably attached to the central-canopy-rib-raising arms, a plurality of second ring-canopy-supporting ribs, a plurality of multi-rib-connecting cores respectively inserted into the first ring-canopy-supporting ribs and the second ring-canopy-supporting ribs for dividing the first ring-canopy-supporting ribs and the second ring-canopy-supporting ribs into shorter ones to reduce the length and volume of shipping package, a plurality of ring-canopy-rib-raising arms respectively foldably attached to the ring-canopy-arm intersector, a ring canopy attached to the first ring-canopy-supporting ribs and the second ring-canopy-supporting ribs for functioning as a water collector and a wind blocker and a privacy screen and an awning and a canopy and a wind redirector and a wind resistor, a plurality of canopy-size-adjusting flaps respectively sewn to the inner edges of the ring canopy for adjustably being attached to the first ring-canopy-supporting ribs, respectively to adjust the ring canopy to multiple different sizes.

BRIEF DESCRIPTION OF THE DRAWINGS

FIG. 2A and FIG. 2B illustrate perspective views of first post-stabilizing foot, second post-stabilizing foot, mountable plate, and four wedging plates.

FIG. 4A and FIG. 4B illustrate cross-sectional view and perspective views of the inner core and how it connects the lower post and upper post together.

FIG. 5 illustrates a perspective view of how the upper post, slidable multi-position handle, foldable multi-canopy-supporting arm, and foldable multi-canopy-lifting arm are connected.

FIG. 6 illustrates a side view of the slidable multi-position handle with the height-adjusting spring-loaded rocker, handle-locking rocker pin, multi-canopy-deploying spool, multi-canopy-deploying crank, and multi-canopy-deploying rope.

FIGS. 7 and 8 illustrate perspective views of the adjustable water-collector wind-blocker privacy-screen double-awning central canopy system and the adjustable water-collector wind-blocker privacy-screen double-awning ring canopy system.

FIG. 9A and FIG. 9B illustrate perspective views of how first ring-canopy-supporting ribs and second ring-canopy-supporting ribs are connected.

FIG. 11A and FIG. 11B illustrate how to use the canopy-size-adjusting flaps and canopy-size-adjusting holes to adjust the size of the multi-function double-canopy umbrella.

FIG. 12 illustrates how the first post-stabilizing foot and second post-stabilizing foot can be wedged between and underneath the slats of a fence to lock it in place.

FIG. 16B and FIG. 16C illustrate front views of how the central canopy and ring canopy can be used for redirecting the wind.

FIG. 16D illustrates a perspective view of how the multi-function double-canopy umbrella can have ties at the corners for attaching to the ground.

FIG. 17A, FIG. 17B, and FIG. 17C illustrate side views of how the adjustable water-collector wind-blocker privacy-screen double-awning central canopy system and adjustable water-collector wind-blocker privacy-screen double-awning ring canopy system are lifted up when the slidable multi-position handle is slid down the upper post.

FIG. 18A, FIG. 18B, FIG. 18C, FIG. 18D, FIG. 18E, and FIG. 18F illustrate side views of how the multi-function double-canopy umbrella can be mounted to various structures using the mountable plate.

FIG. 19A, FIG. 19B, FIG. 19C, FIG. 19D, FIG. 19E, FIG. 19F, and FIG. 19G illustrate side views of how the multi-function double-canopy umbrella can be mounted to various structures using the mountable inner core.

DETAILED DESCRIPTION OF THE INVENTION

Figure 1A:
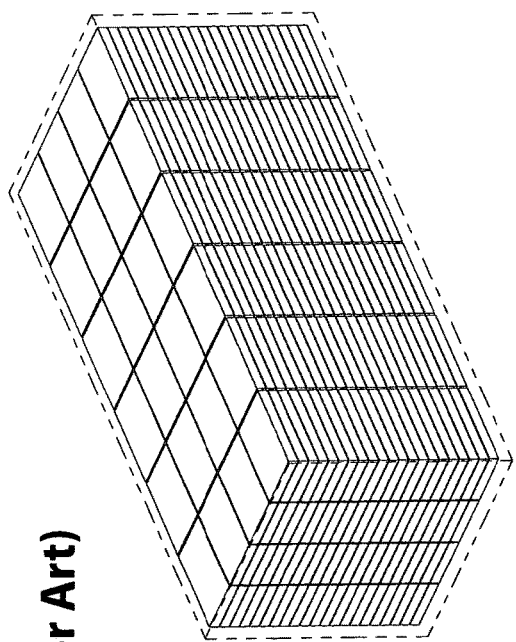
FIG. 1A (Prior Art) and FIG. 1B illustrate perspective views of the full amount of space inside a shipping container the prior art takes to ship, as opposed to a lot of less space taken by the multi-function double-canopy umbrella.

The multi-function double-canopy umbrella comprises:
1) Multi-function fence-mountable balcony-mountable bumper-mountable hitch-mountable base system,
2) Multi-function fence-mountable balcony-mountable bumper-mountable hitch-mountable post system,
3) Height-adjusting angle-adjusting multi-canopy-deploying system, 4) Adjustable water-collector wind-blocker privacy-screen double-awning central canopy system, and
5) Adjustable water-collector wind-blocker privacy-screen double-awning ring canopy system.

Component

Referring to FIG. 2A, FIG. 2B, FIG. 3, FIG. 4A, FIG. 4B, FIG. 5, FIG. 6, FIG. 7, FIG. 8, FIG. 9A, FIG. 9B, FIG. 10, FIG. 11A, and FIG. 11B, the multi-function double-canopy umbrella comprises:

1) Multi-function fence-mountable balcony-mountable bumper-mountable hitch-mountable base system 101 comprising:
2) First post-stabilizing foot 102,
3) Second post-stabilizing foot 103,
4) Mounting plate 104,
5) Four wedging plates 105,
6) Four base-stabilizing weights 106;
7) Multi-function fence-mountable balcony-mountable bumper-mountable hitch-mountable post system 107 comprising:
8) Lower post 108,
9) Upper post 109,
10) Inner core 110*a*,
  Post-height-adjusting holes 110*b*,
11) Core-securing bolts 111;
12) Height-adjusting angle-adjusting multi-canopy-deploying system 112 comprising:

13) Multi-canopy-lifting-arm intersector 113,
14) Multi-canopy-supporting-arm intersector 114,
15) Slidable multi-position handle 115,
16) Height-adjusting spring-loaded rocker 116,
17) Handle-locking rocker pin 117,
18) Handle-locking post holes 118,
19) Foldable multi-canopy-supporting arm 119,
20) Foldable multi-canopy-lifting arm 120,
21) Multi-canopy-hanging central tube 121,
22) Multi-canopy-deploying spool 122,
23) Multi-canopy-deploying crank 123,
24) Multi-canopy-deploying rope 124;
25) Adjustable water-collector wind-blocker privacy-screen double-awning central canopy system 125 comprising:
26) Central-canopy intersector 126,
27) Central-canopy-supporting ribs 127,
28) Central-canopy-rib-raising arms 128,
29) Central canopy 129;
30) Adjustable water-collector wind-blocker privacy-screen double-awning ring canopy system 130 comprising:
31) Ring-canopy-rib intersector 131,
32) First ring-canopy-supporting ribs 132,
33) Second ring-canopy-supporting ribs 133,
34) Multi-rib-connecting cores 134*a*,
   Rib-length-adjusting holes 134*b*,
35) Ring-canopy-arm intersector 135,
36) Ring-canopy-rib-raising arms 136,
37) Ring canopy 137,
38) Four zipper pockets 138,
39) Canopy-size-adjusting flaps 139,
40) Canopy-size-adjusting holes 140.

Material

Referring to FIG. 2A, FIG. 2B, FIG. 3, FIG. 4A, FIG. 4B, FIG. 5, FIG. 6, FIG. 7, FIG. 8, FIG. 9A, FIG. 9B, FIG. 10, FIG. 11A, and FIG. 11B:

1) Multi-function fence-mountable balcony-mountable bumper-mountable hitch-mountable base system 101 is made of the combined materials of its components.
2) First post-stabilizing foot 102 is made of metallic material.
3) Second post-stabilizing foot 103 is made of metallic material.
4) Mounting plate 104 is made of metallic material.
5) Four wedging plates 105 each are made of metallic material.
6) Four base-stabilizing weights 106 each are made of plastic and/or metallic material.
7) Multi-function fence-mountable balcony-mountable bumper-mountable hitch-mountable post system 107 is made of the combined materials of its components.
8) Lower post 108 is made of metallic material.
9) Upper post 109 is made of metallic material.
10) Inner core 110*a* is made of metallic material.
   Post-height-adjusting holes 110*b* each are made of empty space.
11) Core-securing bolts 111 each are made of metallic material.
12) Height-adjusting angle-adjusting multi-canopy-deploying system 112 is made of the combined materials of its components.
13) Multi-canopy-lifting-arm intersector 113 is made of plastic material.
14) Multi-canopy-supporting-arm intersector 114 is made of plastic material.
15) Slidable multi-position handle 115 is made of plastic material.
16) Height-adjusting spring-loaded rocker 116 is made of plastic and/or metallic material.
17) Handle-locking rocker pin 117 is made of plastic and/or metallic material.
18) Handle-locking post holes 118 each are made of empty space.
19) Foldable multi-canopy-supporting arm 119 is made of metallic material.
20) Foldable multi-canopy-lifting arm 120 is made of metallic material.
21) Multi-canopy-hanging central tube 121 is made of metallic material.
22) Multi-canopy-deploying spool 122 is made of plastic and/or metallic material.
23) Multi-canopy-deploying crank 123 is made of plastic and/or metallic material.
24) Multi-canopy-deploying rope 124 is made of nylon and/or fabric material.
25) Adjustable water-collector wind-blocker privacy-screen double-awning central canopy system 125 is made of the combined materials of its components.
26) Central-canopy intersector 126 is made of plastic material.
27) Central-canopy-supporting ribs 127 each are made of metallic material.
28) Central-canopy-rib-raising arms 128 each are made of metallic material.
29) Central canopy 129 is made of nylon and/or fabric material.
30) Adjustable water-collector wind-blocker privacy-screen double-awning ring canopy system 130 is made of the combined materials of its components.
31) Ring-canopy-rib intersector 131 is made of plastic material.
32) First ring-canopy-supporting ribs 132 each are made of metallic material.
33) Second ring-canopy-supporting ribs 133 each are made of metallic material.
34) Multi-rib-connecting cores 134*a* each are made of metallic material.
   Rib-length-adjusting holes 134*b* each are made of empty space.
35) Ring-canopy-arm intersector 135 is made of plastic material.
36) Ring-canopy-rib-raising arms 136 each are made of metallic material,
37) Ring canopy 137 is made of nylon and/or fabric material.
38) Four zipper pockets 138 each are made of plastic, nylon, and/or fabric material.
39) Canopy-size-adjusting flaps 139 each are made of leather, rubber, plastic, nylon, and/or fabric material.
40) Canopy-size-adjusting holes 140 each are made of empty space.

Shape

Referring to FIG. 2A, FIG. 2B, FIG. 3, FIG. 4A, FIG. 4B, FIG. 5, FIG. 6, FIG. 7, FIG. 8, FIG. 9A, FIG. 9B, FIG. 10, FIG. 11A, and FIG. 11B:

1) Multi-function fence-mountable balcony-mountable bumper-mountable hitch-mountable base system 101 is formed into the combined shapes of its components.

2) First post-stabilizing foot 102 is
   formed into an I shape. A groove is formed into
   the undersurface of first post-stabilizing foot 102.
3) Second post-stabilizing foot 103 is
   formed into an I shape. A groove is formed into
   the undersurface of second post-stabilizing foot 103.
4) Mounting plate 104 is
   formed into a square shape.
5) Four wedging plates 105 each are
   formed into a semi-oval shape with a recess. The lower portion below
   the recess of each of wedging plates 105 is bent to
   slidably fit behind the lower portion of an adjacent
   plate 105 of another multi-function umbrella.
6) Four base-stabilizing weights 106 each are
   formed into a triangular shape.
7) Multi-function fence-mountable balcony-mountable bumper-mountable hitch-mountable post system 107 is
   formed into the combined shapes of its components.
8) Lower post 108 is
   formed into a tubular shape with an oval cross-section.
9) Upper post 109 is
   formed into a tubular shape with an oval cross-section.
10) Inner core 110*a* is
    formed into an I shape.
    Post-height-adjusting holes 110*b* each are
    formed into a round shape.
11) Core-securing bolts 111 each are
    formed into a bolt shape.
12) Height-adjusting angle-adjusting multi-canopy-deploying system 112 is
    formed into the combined shapes of its components.
13) Multi-canopy-lifting-arm intersector 113 is
    formed into an oval shape.
14) Multi-canopy-supporting-arm intersector 114 is
    formed into an oval-donut shape.
15) Slidable multi-position handle 115 is
    formed into a D shape.
16) Height-adjusting spring-loaded rocker 116 is
    formed into an L shape.
17) Handle-locking rocker pin 117 is
    formed into a nipple shape.
18) Handle-locking post holes 118 each are
    formed into a round shape.
19) Foldable multi-canopy-supporting arm 119 is
    formed into a tubular shape with an oval cross-section.
20) Foldable multi-canopy-lifting arm 120 is
    formed into a tubular shape with an oval cross-section.
21) Multi-canopy-hanging central tube 121 is
    formed into a tubular shape with a round cross-section.
22) Multi-canopy-deploying spool 122 is
    formed into a cylindrical shape.
23) Multi-canopy-deploying crank 123 is
    formed into an S shape.
24) Multi-canopy-deploying rope 124 is
    formed into a rope shape.
25) Adjustable water-collector wind-blocker privacy-screen double-awning central canopy system 125 is
    formed into the combined shapes of its components.
26) Central-canopy intersector 126 is
    formed into a round shape with a notched perimeter.
27) Central-canopy-supporting ribs 127 each are
    formed into a tubular shape with an oval cross-section.
28) Central-canopy-rib-raising arms 128 each are
    formed into a flat rectangular shape.
29) Central canopy 129 is
    formed into a square shape.
30) Adjustable water-collector wind-blocker privacy-screen double-awning ring canopy system 130 is
    formed into the combined shapes of its components.
31) Ring-canopy-rib intersector 131 is
    formed into a donut shape with a notched perimeter.
32) First ring-canopy-supporting ribs 132 each are
    formed into a tubular shape with an oval cross-section.
33) Second ring-canopy-supporting ribs 133 each are
    formed into a tubular shape with an oval cross-section.
34) Multi-rib-connecting cores 134*a* each are
    formed into a tubular shape with an oval cross-section.
    Rib-length-adjusting holes 134*b* each are
    formed into a round shape.
35) Ring-canopy-arm intersector 135 is
    formed into a donut shape with a notched perimeter.
36) Ring-canopy-rib-raising arms 136 each are
    formed into a tubular shape with an oval cross-section.
37) Ring canopy 137 is
    formed into a square ring shape.
38) Four zipper pockets 138 each are
    formed into a triangular shape.
39) Canopy-size-adjusting flaps 139 each are
    formed into a rectangular shape.
40) Canopy-size-adjusting holes 140 each are
    formed into a round shape.

Connection

Referring to FIG. 2A, FIG. 2B, FIG. 3, FIG. 4A, FIG. 4B, FIG. 5, FIG. 6, FIG. 7, FIG. 8, FIG. 9A, FIG. 9B, FIG. 10, FIG. 11A, and FIG. 11B:

1) Multi-function fence-mountable balcony-mountable bumper-mountable hitch-mountable base system 101 is
   connected by the combined connections of its components.
2) First post-stabilizing foot 102 is
   bolted to mounting plate 104.
3) Second post-stabilizing foot 103 is
   bolted to mounting plate 104.
4) Mounting plate 104 is
   attached to lower post 108.
5) Four wedging plates 105 respectively are
   welded to first post-stabilizing foot 102 and
   second post-stabilizing foot 103.
6) Four base-stabilizing weights 106 respectively are
   attached to first post-stabilizing foot 102 and
   second post-stabilizing foot 103.
7) Multi-function fence-mountable balcony-mountable bumper-mountable hitch-mountable post system 107 is
   connected by the combined connections of its components.
8) Lower post 108 is
   bolted to inner core 110*a*.
9) Upper post 109 is
   bolted to inner core 110*a*.
10) Inner core 110*a* is
    attached to mounting plate 104 and inserted into and bolted to lower post 108 and upper post 109.
    Post-height-adjusting holes 110*b* respectively are
    drilled into lower post 108, upper post 109, and inner core 110*a*.
11) Core-securing bolts 111 respectively are
    bolted through lower post 108, upper post 109, and inner core 110*a*.
12) Height-adjusting angle-adjusting multi-canopy-deploying system 112 is
    connected by the combined connections of its components.

13) Multi-canopy-lifting-arm intersector 113 is
attached to upper post 109.
14) Multi-canopy-supporting-arm intersector 114 is
slidably attached to upper post 109.
15) Slidable multi-position handle 115 is
molded to multi-canopy-supporting-arm intersector 114.
16) Height-adjusting spring-loaded rocker 116 is
sandwiched within slidable multi-position handle 115.
17) Handle-locking rocker pin 117 is
attached to height-adjusting spring-loaded rocker 116.
18) Handle-locking post holes 118 respectively are
drilled into upper post 109.
19) Foldable multi-canopy-supporting arm 119 is
pivotably bolted to multi-canopy-supporting-arm intersector 114.
20) Foldable multi-canopy-lifting arm 120 is
pivotably bolted to multi-canopy-lifting-arm intersector 113 and
foldable multi-canopy-supporting arm 119.
21) Multi-canopy-hanging central tube 121 is
attached to central-canopy intersector 126.
22) Multi-canopy-deploying spool 122 is
sandwiched within multi-canopy-supporting-arm intersector 114.
23) Multi-canopy-deploying crank 123 is
rotatably attached to multi-canopy-deploying spool 122.
24) Multi-canopy-deploying rope 124 is
wound around multi-canopy-deploying spool 122,
threaded through multi-canopy-supporting-arm intersector 114,
threaded through multi-canopy-hanging central tube 121, and
attached to ring-canopy-arm intersector 135.
25) Adjustable water-collector wind-blocker privacy-screen double-awning central canopy system 125 is
connected by the combined connections of its components.
26) Central-canopy intersector 126 is
attached to multi-canopy-hanging central tube 121.
27) Central-canopy-supporting ribs 127 respectively are
attached to central-canopy intersector 126.
28) Central-canopy-rib-raising arms 128 respectively are
pivotably attached to central-canopy-supporting ribs 127 and
first ring-canopy-supporting ribs 132.
29) Central canopy 129 is
attached to central-canopy-supporting ribs 127.
30) Adjustable water-collector wind-blocker privacy-screen double-awning ring canopy system 130 is
connected by the combined connections of its components.
31) Ring-canopy-rib intersector 131 is
connected to multi-canopy-hanging central tube 121.
32) First ring-canopy-supporting ribs 132 respectively are
pivotably connected to ring-canopy-rib intersector 131.
33) Second ring-canopy-supporting ribs 133 respectively are
connected to multi-rib-connecting cores 134*a*.
34) Multi-rib-connecting cores 134*a* respectively are
inserted into and screwed to first ring-canopy-supporting ribs 132 and
second ring-canopy-supporting ribs 133.
Rib-length-adjusting holes 134*b* respectively are
drilled into first ring-canopy-supporting ribs 132,
second ring-canopy-supporting ribs 133, and
multi-rib-connecting cores 134*a*.

35) Ring-canopy-arm intersector 135 is
slidably attached to multi-canopy-hanging central tube 121, and
foldably attached to ring-canopy-rib-raising arms 136.
36) Ring-canopy-rib-raising arms 136 respectively are
foldably attached to ring-canopy-arm intersector 135.
37) Ring canopy 137 is
attached to first ring-canopy-supporting ribs 132 and
second ring-canopy-supporting ribs 133.
38) Four zipper pockets 138 respectively are
sewn to the corners of ring canopy 137.
39) Canopy-size-adjusting flaps 139 respectively are
sewn to the inner edges of ring canopy 137.
40) Canopy-size-adjusting holes 140 respectively are
drilled into first ring-canopy-supporting ribs 132.

Function

Referring to FIG. 12, FIG. 13, FIG. 14, FIG. 15, FIG. 16A, FIG. 16B, FIG. 16C, FIG. 16D, FIG. 17A, FIG. 17B, FIG. 17C, FIG. 18A, FIG. 18B, FIG. 18C, FIG. 18D, FIG. 18E, FIG. 18F, FIG. 19A, FIG. 19B, FIG. 19C, FIG. 19D, FIG. 19E, FIG. 19F, FIG. 19G, FIG. 20A, FIG. 20B, FIG. 20C, FIG. 20D, FIG. 20E, FIG. 20F, FIG. 21A, FIG. 21B, FIG. 21C, FIG. 21D, FIG. 21E, and FIG. 21F:

1) Multi-function fence-mountable balcony-mountable bumper-mountable hitch-mountable base system 101 is for:
Performing the combined functions of its components.
2) First post-stabilizing foot 102 is for:
Standing the multi-function double-canopy umbrella on a surface.
3) Second post-stabilizing foot 103 is for:
Standing the multi-function double-canopy umbrella on a surface.
4) Mounting plate 104 is for:
a) Mounting the multi-function double-canopy umbrella on first post-stabilizing foot 102 and second post-stabilizing foot 103
to stabilize the multi-function double-canopy umbrella from tipping over
(see FIG. 2A);
b) Mounting the multi-function double-canopy umbrella on a fence
to provide shade and protection when a fence is accessible
(see FIG. 18D);
c) Mounting the multi-function double-canopy umbrella on a balcony
to provide shade and protection when a balcony is accessible
(see FIG. 20F);
d) Mounting the multi-function double-canopy umbrella on a bumper
to provide shade and protection when a bumper is accessible
(see FIG. 18A);
e) Mounting the multi-function double-canopy umbrella on a hitch
to provide shade and protection when a hitch is accessible
(see FIG. 19C);
f) Mounting the multi-function double-canopy umbrella on a tailgate
to provide shade and protection when a tailgate is accessible
(see FIG. 18B);

g) Mounting the multi-function double-canopy umbrella on a table
    to provide shade and protection when a table is accessible
    (see FIG. 18C).
5) Four wedging plates 105 is for:
    a) Slidably hooking on multiple wedging plates of other umbrellas
        to secure four wedging plates 105 to the other space-saver umbrellas
        in the directions of arrows 141*a* and 141*b*
        to provide various configuration options and additional shade and protection
        (see FIG. 21A, FIG. 21B, FIG. 21C, FIG. 21D, FIG. 21E, and FIG. 21F);
    b) Slidably hooking up to the two adjacent slats of a fence
        to secure four wedging plates 105 to the fence
        to prevent the multi-function double-canopy umbrella from moving or falling over
        (see FIG. 12);
    c) Slidably wedging between the two planks of a patio or deck
        to secure four wedging plates 105 to the patio or deck
        to prevent the multi-function double-canopy umbrella from moving
        or falling over
        (see FIG. 13 and FIG. 14).
6) Four base-stabilizing weights 106 is for:
    Holding down first post-stabilizing foot 102 and second post-stabilizing foot 103.
7) Multi-function fence-mountable balcony-mountable bumper-mountable hitch-mountable post system 107 is for:
    Performing the combined functions of its components.
8) Lower post 108 is for:
    Supporting upper post 109.
9) Upper post 109 is for:
    Supporting foldable multi-canopy-supporting arm 119 and foldable multi-canopy-lifting arm 120.
10) Inner core 110*a* is for:
    a) Allowing manufacturers to divide a long post into shorter upper post 109 and shorter lower post 108
        to reduce the length and volume of the shipping package of the multi-function double-canopy umbrella in a shipping container to save money from expensive shipping costs
        (see FIG. 4B);
    b) Mounting upper post 109 on lower post 108
        to give the multi-function double-canopy umbrella more height
        (see FIG. 4B);
    c) Mounting upper post 109 on a fence
        to provide shade and protection when a fence is accessible
        (see FIG. 19E);
    d) Mounting upper post 109 on a balcony
        to provide shade and protection when a balcony is accessible
        (see FIG. 20E);
    e) Mounting upper post 109 on a bumper
        to provide shade and protection when a bumper is accessible
        (see FIG. 19B);
    f) Mounting upper post 109 on a hitch
        to provide shade and protection when a hitch is accessible
        (see FIG. 19C);
    g) Mounting upper post 109 on a tailgate
        to provide shade and protection when a tailgate is accessible
        (see FIG. 19A);
    h) Mounting upper post 109 on a table
        to provide shade and protection when a table is accessible
        (see FIG. 19D);
    i) Mounting upper post 109 on a column
        to provide shade and protection when a column is accessible
        (see FIG. 19F);
    j) Mounting upper post 109 on a wall
        to provide shade and protection when a wall is accessible
        (see FIG. 20A).
    Post-height-adjusting holes 110*b* is for:
    Inserting handle-locking rocker pin 117 therein
        to adjust upper post 109 to multiple different heights.
11) Core-securing bolts 111 is for:
    a) Securing together lower post 108, upper post 109, and inner core 110*a*
        to provide to provide height and strength to the multi-function double-canopy umbrella
        (see FIG. 4A); and
    b) Securing inner core 110*a* to a fence, a balcony, a bumper, a hitch, a tailgate, a table, a column, and a wall
        to allow for multiple options of shade and protection
        (see FIG. 18D, FIG. 20F, FIG. 18A, FIG. 19C, FIG. 19A, FIG. 18C, FIG. 18F, and FIG. 20B).
12) Height-adjusting angle-adjusting multi-canopy-deploying system 112 is for:
    Performing the combined functions of its components.
13) Multi-canopy-lifting-arm intersector 113 is for:
    Connecting upper post 109 to foldable multi-canopy-lifting arm 120.
14) Multi-canopy-supporting-arm intersector 114 is for:
    Slidably connecting upper post 109 to foldable multi-canopy-supporting arm 119.
15) Multi-position handle 115 is for:
    Slidably moving foldable multi-canopy-supporting arm 119 and foldable multi-canopy-lifting arm 120.
16) Height-adjusting spring-loaded rocker 116 is for:
    Pushing handle-locking rocker pin 117 into handle-locking post holes 118.
17) Handle-locking rocker pin 117 is for:
    Locking multi-canopy-supporting-arm intersector 114 at different elevations.
18) Handle-locking post holes 118 is for:
    Locking handle-locking rocker pin 117 therein
        to adjust multi-position handle 115, foldable multi-canopy-supporting arm 119, and foldable multi-canopy-lifting arm 120 to multiple different elevations and angles,
        to adjust central canopy 129 to multiple different elevations and angles
        (see FIG. 16A), and
        to adjust ring canopy 137 to multiple different elevations and angles
        (see FIG. 17A, FIG. 17B and FIG. 17C).
19) Foldable multi-canopy-supporting arm 119 is for:
    Supporting adjustable water-collector wind-blocker privacy-screen double-awning central canopy system 125 and adjustable water-collector wind-blocker privacy-screen double-awning ring canopy system 130.
20) Foldable multi-canopy-lifting arm 120 is for:
   Lifting adjustable water-collector wind-blocker privacy-screen double-awning central canopy system 125 and adjustable water-collector wind-blocker privacy-screen double-awning ring canopy system 130.
21) Multi-canopy-hanging central tube 121 is for:
   a) Connecting central-canopy intersector 126 thereto
      (see FIG. 9A);
   b) Connecting ring-canopy-rib intersector 131 thereto
      (see FIG. 9B); and
   c) Slidably connecting ring-canopy-arm intersector 135 thereto
      (see FIG. 9B).
22) Multi-canopy-deploying spool 122 is for:
   Winding multi-canopy-deploying rope 124 thereon.
23) Multi-canopy-deploying crank 123 is for:
   Winding and unwinding multi-canopy-deploying rope 124 on and off multi-canopy-deploying spool 122, respectively.
24) Multi-canopy-deploying rope 124 is for:
   Lifting central-canopy-rib-raising arms 128, central canopy 129, ring-canopy-rib-raising arms 136, and ring canopy 137.
25) Adjustable water-collector wind-blocker privacy-screen double-awning central canopy system 125 is for:
   Performing the combined functions of its components.
26) Central-canopy-rib intersector 126 is for:
   Connecting multi-canopy-hanging central tube 121 to central-canopy-supporting ribs 127.
27) Central-canopy-supporting ribs 127 is for:
   Folding and unfolding central canopy 129.
28) Central-canopy-rib-raising arms 128 is for:
   a) Supporting central-canopy-supporting ribs 127 to provide central canopy 129 structural support;
   b) Hingedly connecting central-canopy-supporting ribs 127 and first ring-canopy-supporting ribs 132 to provide structural support;
   c) Hingedly connecting central-canopy-supporting ribs 127 and first ring-canopy-supporting ribs 132 to help make folding the multi-function double-canopy umbrella easier.
29) Central canopy 129 is for:
   a) Functioning as a water collector
      to collect rain water when used upside down
      in the directions of arrows 142 and 143
      (see FIG. 16A);
   b) Functioning as a wind blocker
      to block wind
      (see FIG. 20D);
   c) Functioning as a privacy screen
      to provide privacy
      (see FIG. 19F);
   d) Functioning as an awning
      to angledly block rain and sun beams
      (see FIG. 20B);
   e) Functioning as a canopy
      to vertically block rain and sun beams
      (see FIG. 20F);
   f) Functioning as a wind redirector
      to redirect wind in and out of canopy
      in the directions of arrows 144, 145, 146, 147 and 148
      (see FIG. 16B, FIG. 16C, and FIG. 16D);
   g) Functioning as a wind resistor
      to protect the canopy from blowing when corners are attached to ground with ropes and stakes
      in the direction of arrow 149
      (see FIG. 16D).
30) Adjustable water-collector wind-blocker privacy-screen double-awning ring canopy system 130 is for:
   Performing the combined functions of its components.
31) Ring-canopy-rib intersector 131 is for:
   Connecting multi-canopy-hanging central tube 121 to first ring-canopy-supporting ribs 132.
32) First ring-canopy-supporting ribs 132 is for:
   Folding and unfolding ring canopy 137.
33) Second ring-canopy-supporting ribs 133 is for:
   Folding and unfolding ring canopy 137.
34) Multi-rib-connecting cores 134a is for:
   a) Allowing manufacturers to divide long ribs into shorter first ring-canopy-supporting ribs 132 and shorter second ring-canopy-supporting ribs 133
      to reduce the length and volume of the shipping package of the multi-function double-canopy umbrella in a shipping container to save money from expensive shipping costs
      (see FIG. 1A (Prior Art) and FIG. 1B);
   b) Connecting first ring-canopy-supporting ribs 132 to second ring-canopy-supporting ribs 133
      to provide strength and structure to the multi-function double-canopy umbrella
      (see FIG. 10).
   Rib-length-adjusting holes 134b is for:
   Adjusting first ring-canopy-supporting ribs 132, second ring-canopy-supporting ribs 133, and multi-rib-connecting cores 134a
      to adjust first ring-canopy-supporting ribs 132 and second ring-canopy-supporting ribs 133 to different lengths, and
      to adjust ring canopy 137 to multiple different sizes
      (see FIG. 10).
35) Ring-canopy-arm intersector 135 is for:
   Slidably connecting multi-canopy-hanging central tube 121 to ring-canopy-rib-supporting arms 136.
36) Ring-canopy-rib-supporting arms 136 is for:
   Supporting first ring-canopy-supporting ribs 132 and second ring-canopy-supporting ribs 133.
37) Ring canopy 137 is for:
   a) Functioning as a water collector
      to collect rain water when used upside down
      in the directions of arrows 142 and 143
      (see FIG. 16A);
   b) Functioning as a wind blocker
      to block wind
      (see FIG. 20D);
   c) Functioning as a privacy screen
      to provide privacy
      (see FIG. 19F);
   d) Functioning as an awning
      to angledly block rain and sun beams
      (see FIG. 20B);
   e) Functioning as a canopy
      to vertically block rain and sun beams
      (see FIG. 20F);
   f) Functioning as a wind redirector
      to redirect wind in and out of canopy
      in the directions of arrows 144, 145, 146, 147, and 148
      (see FIG. 16B, FIG. 16C, and FIG. 16D);

g) Functioning as a wind resistor
   to protect the canopy from blowing when corners are attached to ground with ropes and stakes in the direction of arrow 149
   (see FIG. 16D).
38) Four zipper pockets 138 is for:
   Connecting the four corners of ring canopy 137 to the four tips of second ring-canopy-supporting ribs 133, respectively.
39) Canopy-size-adjusting flaps 139 is for:
   Adjustably being attached to first ring-canopy-supporting ribs 132, respectively
   to adjust ring canopy 137 to multiple different sizes
   (see FIG. 11A and FIG. 11B).
40) Canopy-size-adjusting holes 140 is for:
   Adjusting first ring-canopy-supporting ribs 132 and canopy-size-adjusting flaps 139
   to adjust ring canopy 137 to multiple different sizes
   (see FIG. 11A and FIG. 11B).
Variation Any component of the multi-function double-canopy umbrella can have any shape and size.

Any component of the multi-function double-canopy umbrella can be made of any material or any combination of any materials.

Any component of the multi-function double-canopy umbrella can be made of any flexible, semi-flexible, bendable, semi-bendable, rigid, or semi-rigid material(s).

The multi-function double-canopy umbrella can have at least one post, each equivalent to lower post 108 or upper post 109.

The multi-function double-canopy umbrella can have at least one inner core, each equivalent to inner core 110a.

The multi-function double-canopy umbrella can have at least one rib, each equivalent to one of central-canopy-supporting ribs 127.

The multi-function double-canopy umbrella can have at least one rib, each equivalent to one of ring-canopy-supporting ribs 132 or ring-canopy-supporting ribs 133.

Figure 22B:
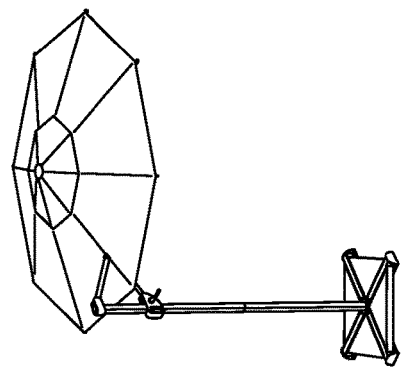
FIG. 22B illustrates a perspective view of an equivalent of the central canopy and an equivalent of the ring canopy.
Figure 22D:
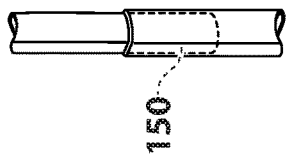
FIG. 22C and FIG. 22D illustrate perspective views of equivalent variations of the lower post and the upper post, and an equivalent of the inner core of the multi-function double-canopy umbrella.
Figure 22A:
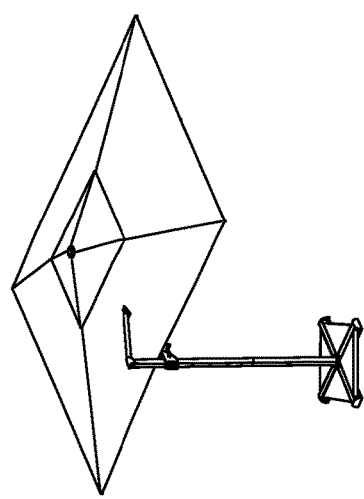
FIG. 22A illustrates a perspective view of an equivalent of one of the four wedging plates of the multi-function double-canopy umbrella.

For example, FIG. 22A illustrates a perspective view of an equivalent of one of four wedging plates 105 of the multi-function double-canopy umbrella.

For example, FIG. 22B illustrates a perspective view of an equivalent of central canopy 129 and an equivalent of ring canopy 137.

Figure 22C:
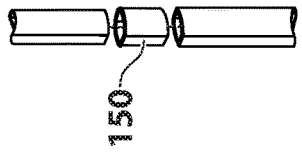

For example, FIG. 22C and FIG. 22D illustrate perspective views of equivalent variations of lower post 108 and upper post 109, and an equivalent 150 of inner core 110a of the multi-function double-canopy umbrella.

MAJOR ADVANTAGES OF THE INVENTION

The present invention substantially departs from the conventional concepts and designs of the prior art. In doing so, the present invention provides a multi-function double-canopy umbrella (having: 1) Multi-function fence-mountable balcony-mountable bumper-mountable hitch-mountable base system, 2) Multi-function fence-mountable balcony-mountable bumper-mountable hitch-mountable post system, 3) Height-adjusting angle-adjusting multi-canopy-deploying system, 4) Adjustable water-collector wind-blocker privacy-screen double-awning central canopy system, and 5) Adjustable water-collector wind-blocker privacy-screen double-awning ring canopy system) having many unique and significant features, functions, and advantages, which overcome all the disadvantages of the prior art, as follows:

1) It is an object of the new invention to provide a multi-function double-canopy umbrella,
   having
   mounting plate 104.
   Therefore, the multi-function double-canopy umbrella:
   a) Can mount the multi-function double-canopy umbrella to first post-stabilizing foot 102 and second post-stabilizing foot 103,
      to stabilize the multi-function double-canopy umbrella from tipping over
      (see FIG. 2A);
   b) Can mount the multi-function double-canopy umbrella to a fence,
      to provide shade and protection when a fence is accessible
      (see FIG. 18D);
   c) Can mount the multi-function double-canopy umbrella to a balcony,
      to provide shade and protection when a balcony is accessible
      (see FIG. 20F);
   d) Can mount the multi-function double-canopy umbrella to a bumper,
      to provide shade and protection when a bumper is accessible
      (see FIG. 18A);
   e) Can mount the multi-function double-canopy umbrella to a hitch,
      to provide shade and protection when a hitch is accessible
      (see FIG. 19C);
   f) Can mount the multi-function double-canopy umbrella to a tailgate,
      to provide shade and protection when a tailgate is accessible
      (see FIG. 18B); and
   g) Can mount the multi-function double-canopy umbrella to a table,
      to provide shade and protection when a table is accessible
      (see FIG. 18C).
2) It is another object of the new invention to provide a multi-function double-canopy umbrella,
   having
   four wedging plates 105.
   Therefore, the multi-function double-canopy umbrella:
   a) Can slidably hook on multiple wedging plates to the other umbrellas in the directions of arrows 141a and 141b,
      to provide various configuration options and additional shade and protection
      (see FIG. 21A, FIG. 21B, FIG. 21C, FIG. 21D, FIG. 21E, and FIG. 21F);
   b) Can slidably hook up to the two adjacent slats of a fence
      to secure four wedging plates 105 to the fence
      to prevent the multi-function double-canopy umbrella from moving or falling over
      (see FIG. 12); and
   c) Can slidably wedge between the two planks of a patio or deck
      to secure four wedging plates 105 to the patio or deck
      to prevent the multi-function double-canopy umbrella from moving or falling over
      (see FIG. 13 and FIG. 14).

3) It is still another object of the new invention to provide a multi-function double-canopy umbrella, having inner core 110*a*.

Figure 20A:
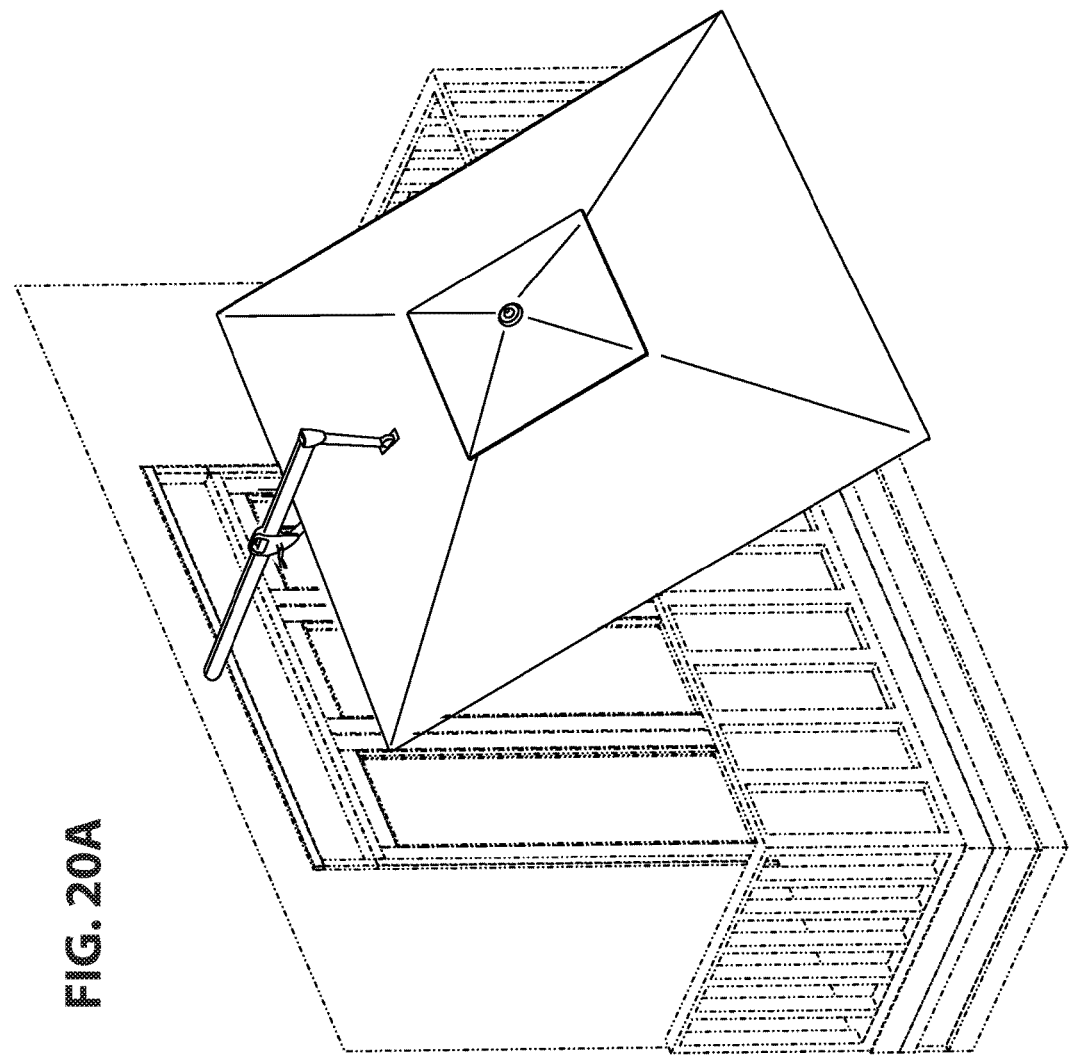
FIG. 20A, FIG. 20B, FIG. 20C, FIG. 20D, FIG. 20E, and FIG. 20F illustrate perspective views of how the multi-function double-canopy umbrella can be attached to a balcony using the mountable plate or the inner core.
Figure 20B:
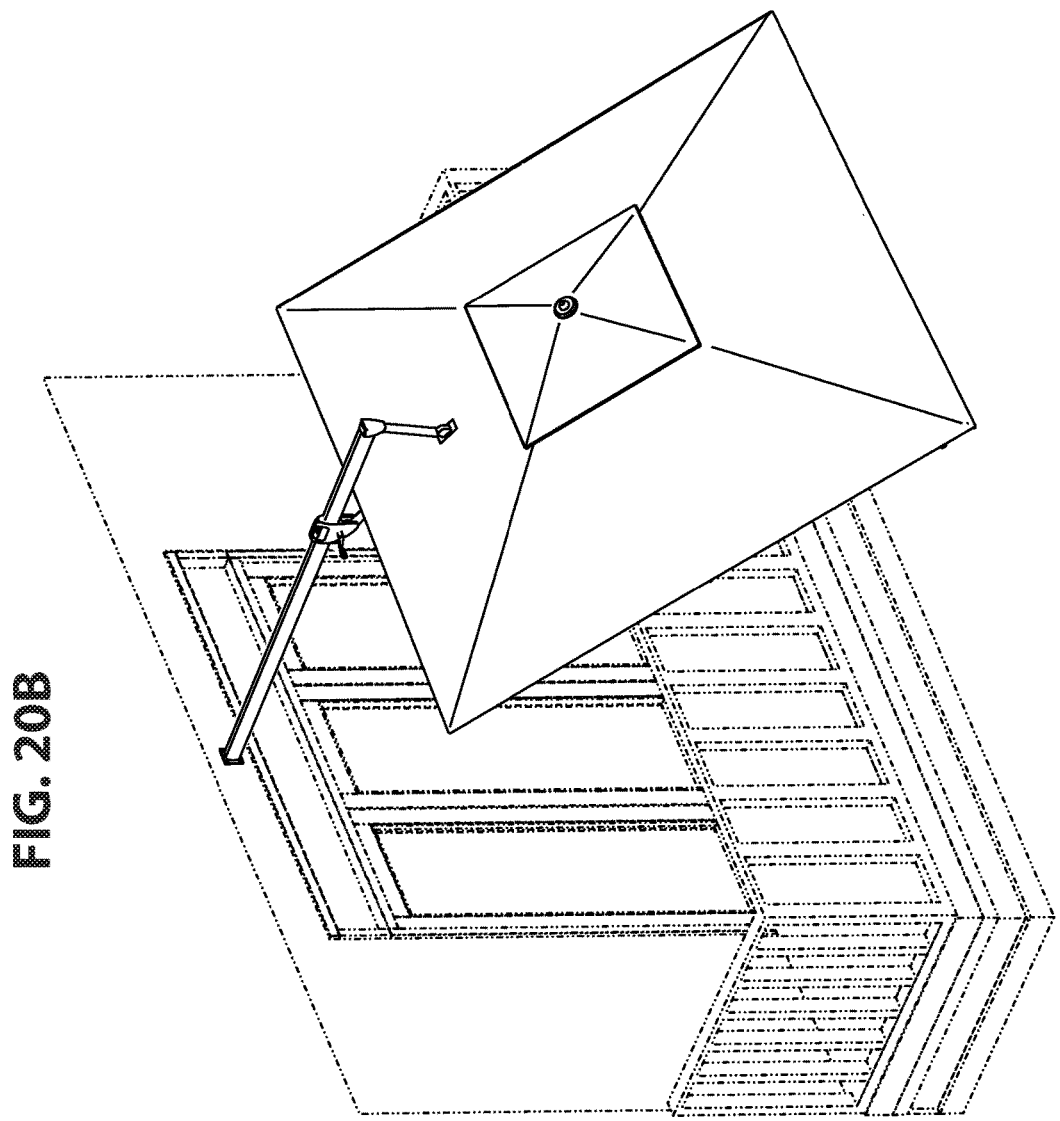
Figure 20C:
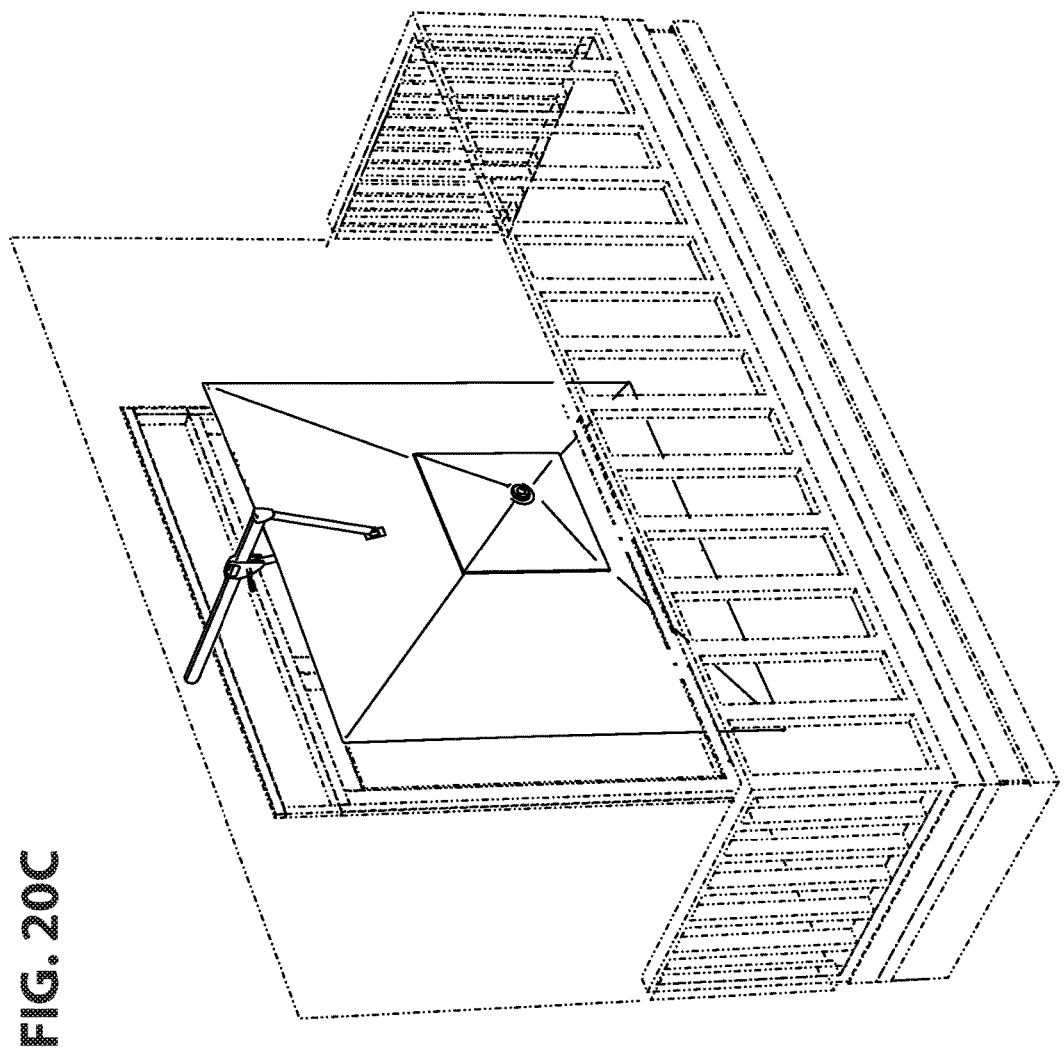
Figure 20D:
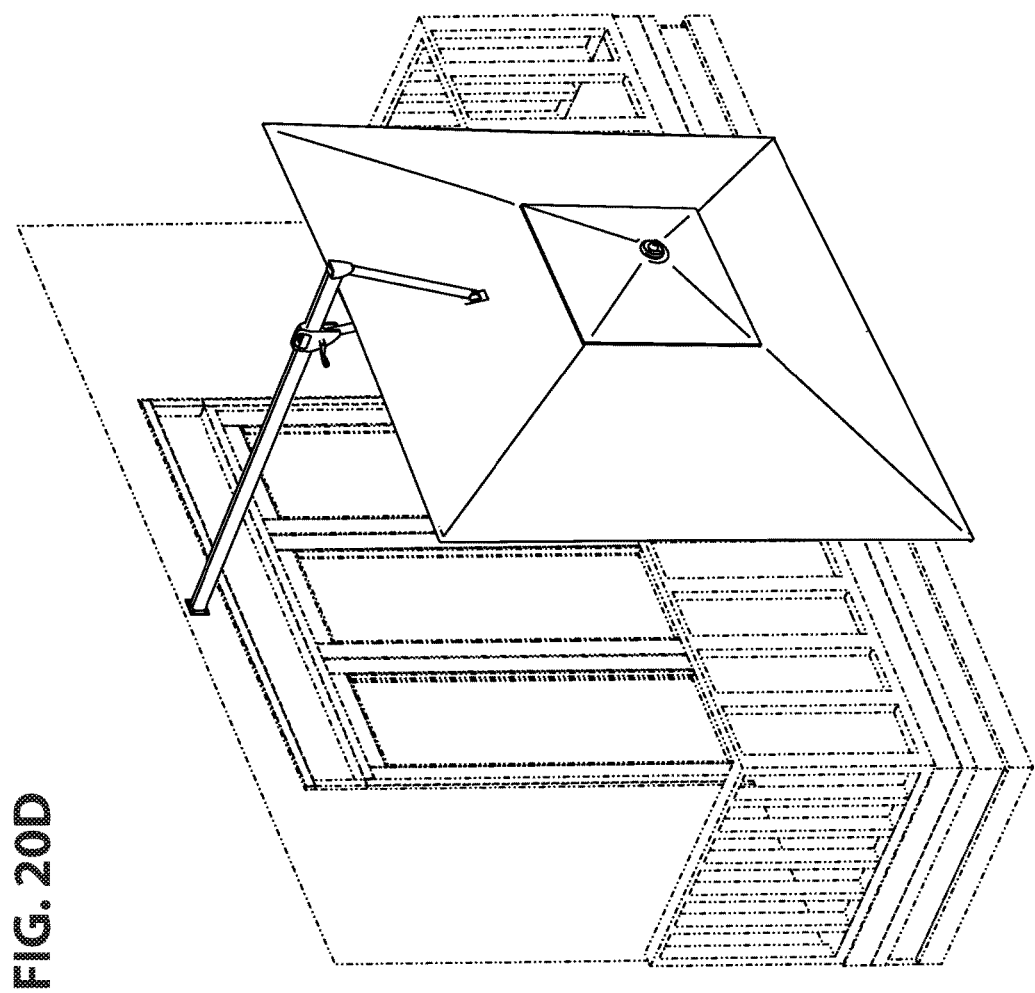
Figure 20E:
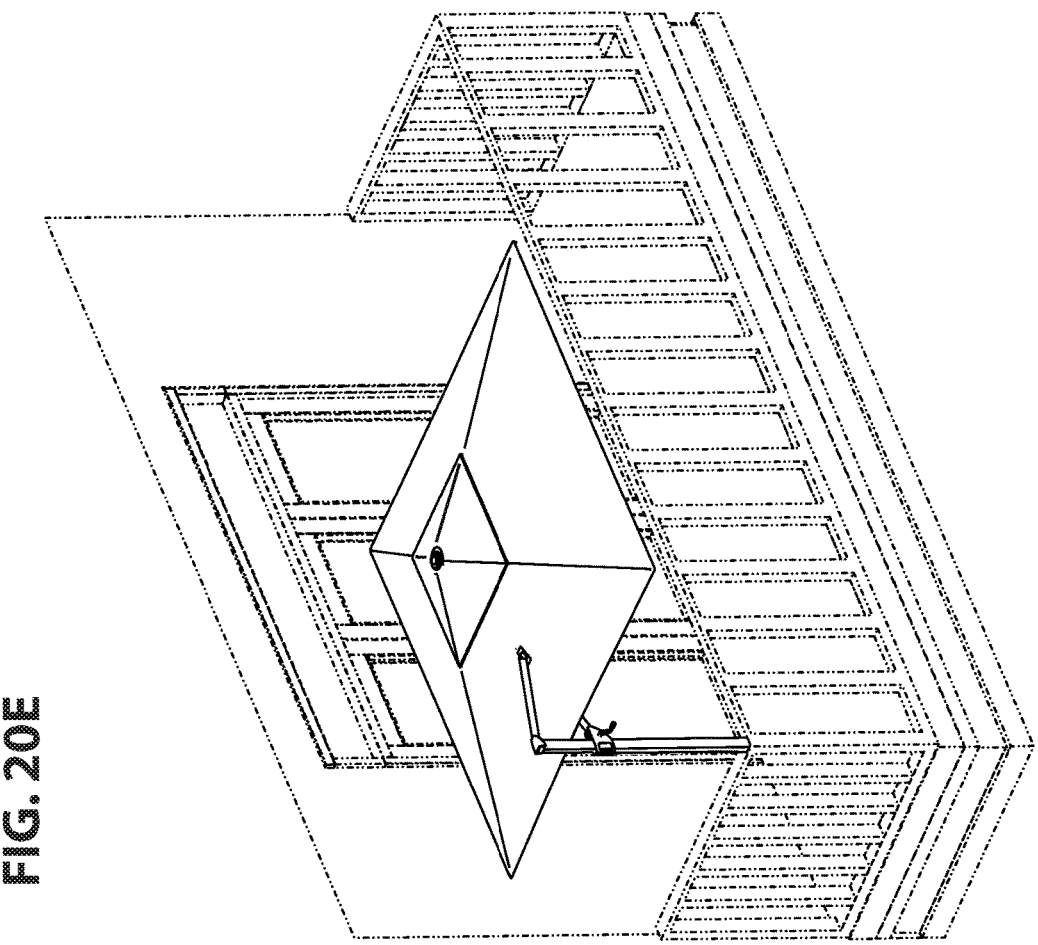
Figure 20F:
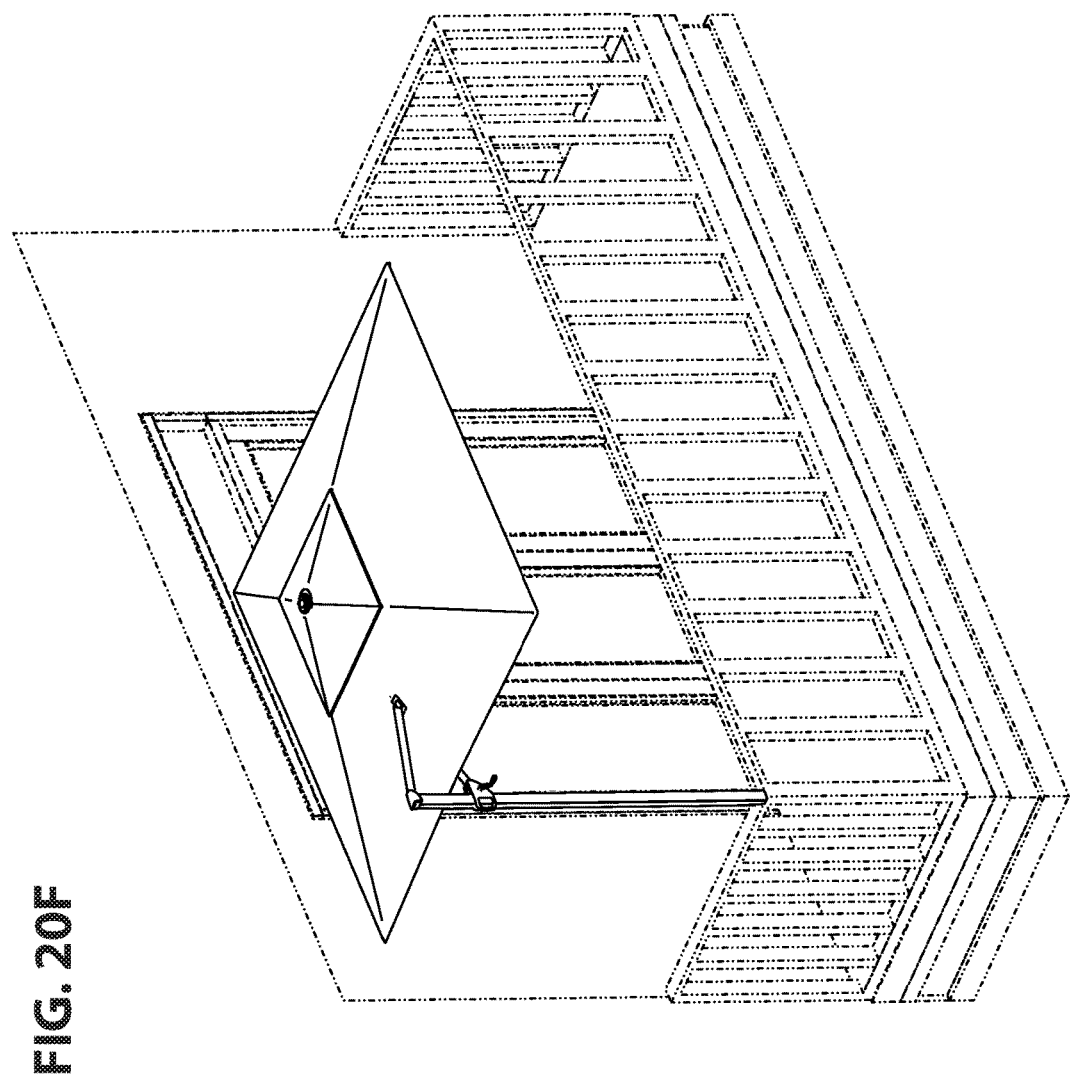
Figure 21A:
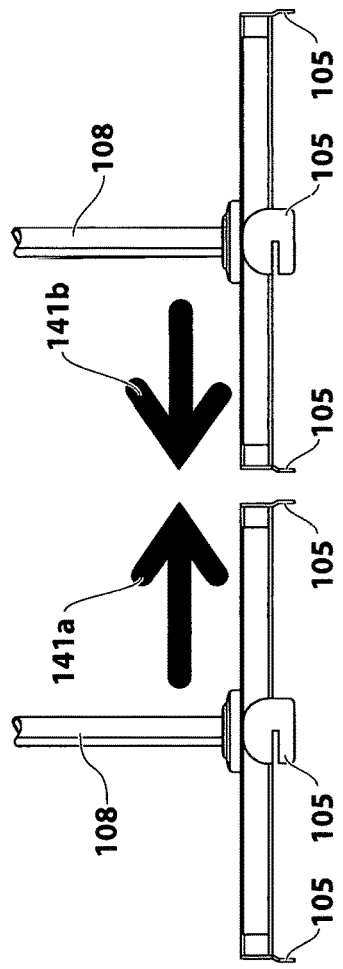
FIG. 21A, FIG. 21B, FIG. 21C, FIG. 21D, FIG. 21E, and FIG. 21F illustrate side and top down views of how to lock the four wedging plates of multiple multi-function double-canopy umbrellas together to create multiple different configurations for different purposes and events.
Figure 21B:
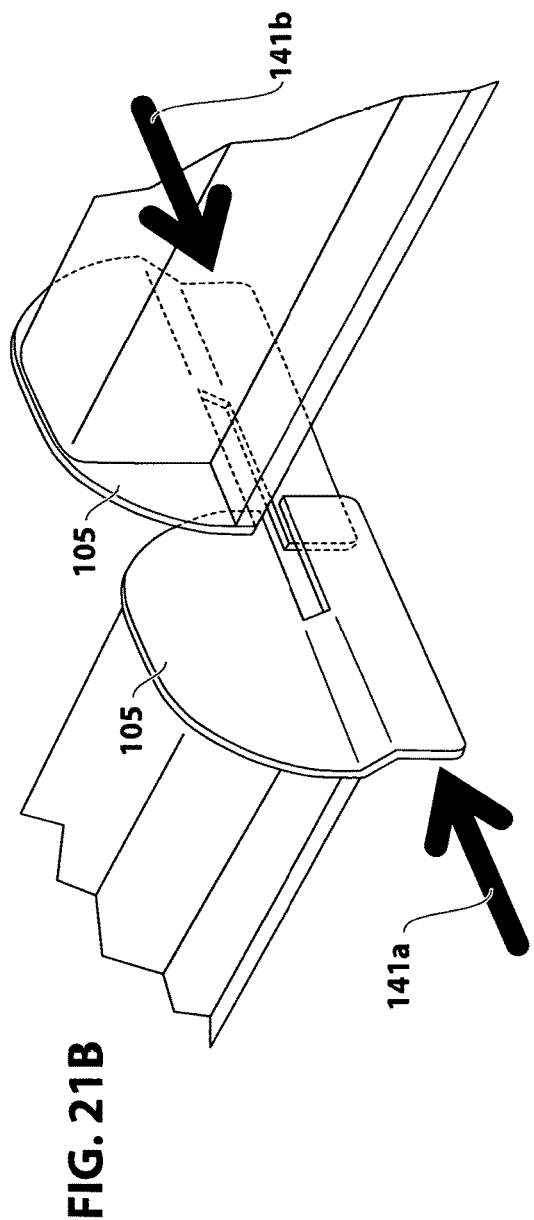
Figure 21C:
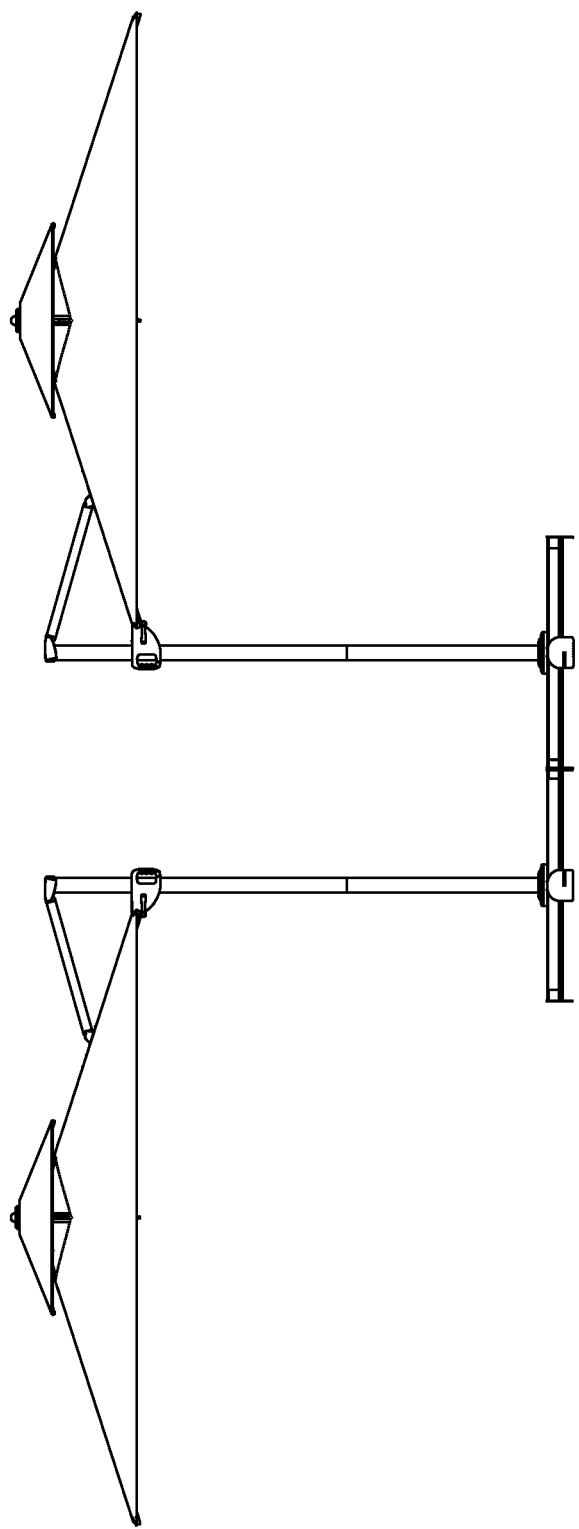
Figure 21D:
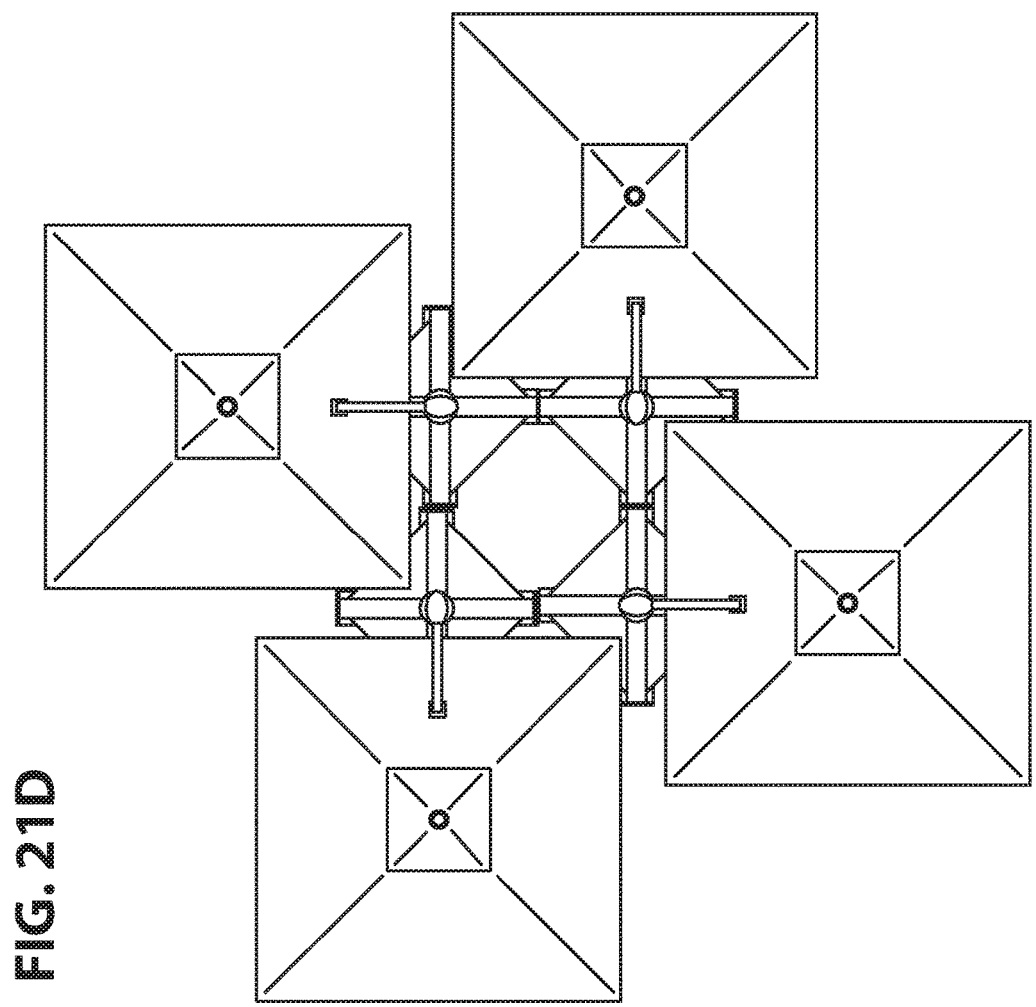
Figure 21E:
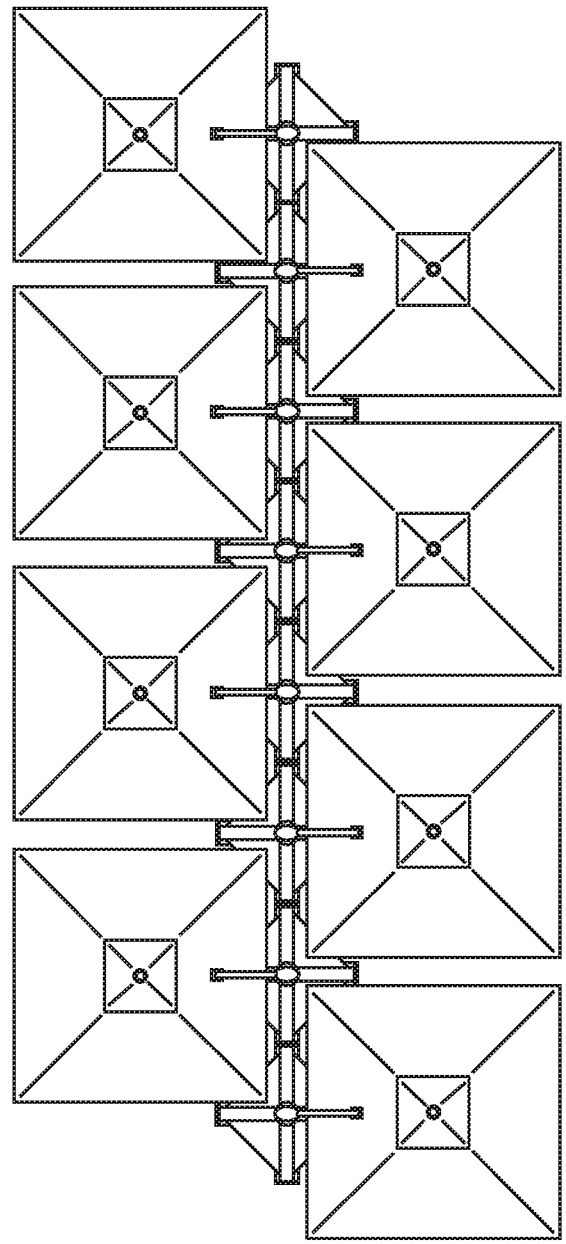
Figure 21F:
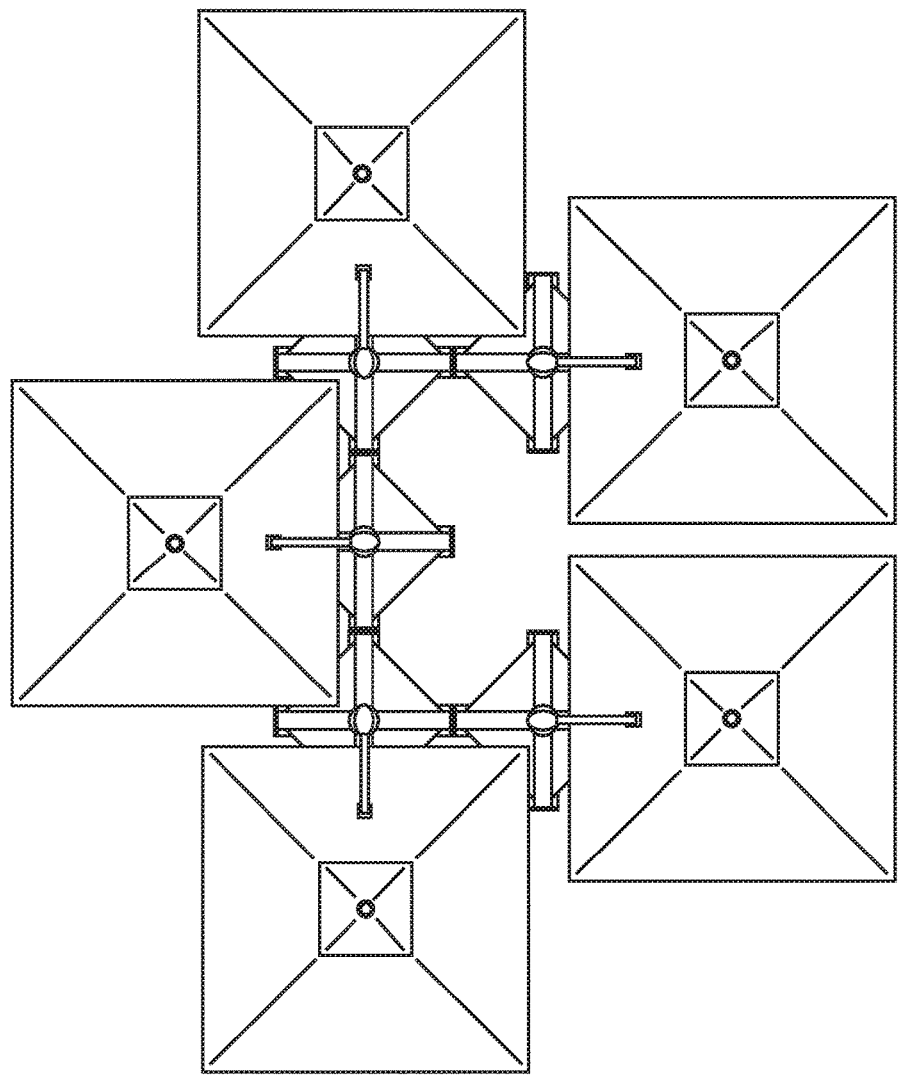

Therefore, the multi-function double-canopy umbrella:
  a) Can allow manufacturers to divide a long post into shorter upper post 109 and shorter lower post 108
      to reduce the length and volume of the shipping package of the multi-function double-canopy umbrella in a shipping container to save money from expensive shipping costs
      (see FIG. 1B and FIG. 4B);
  b) Can mount upper post 109 on lower post 108,
      to give the multi-function double-canopy umbrella more height
      (see FIG. 4B);
  c) Can mount upper post 109 on a fence,
      to provide shade and protection when a fence is accessible
      (see FIG. 19E);
  d) Can mount upper post 109 on a balcony,
      to provide shade and protection when a balcony is accessible
      (see FIG. 20E);
  e) Can mount upper post 109 on a bumper,
      to provide shade and protection when a bumper is accessible
      (see FIG. 19B);
  f) Can mount upper post 109 on a hitch,
      to provide shade and protection when a hitch is accessible
      (see FIG. 19C);
  g) Can mount upper post 109 on a tailgate,
      to provide shade and protection when a tailgate is accessible
      (see FIG. 19A);
  h) Can mount upper post 109 on a table,
      to provide shade and protection when a table is accessible
      (see FIG. 19D);
  i) Can mount upper post 109 on a column,
      to provide shade and protection when a column is accessible
      (see FIG. 19F); and
  j) Can mount upper post 109 on a wall,
      to provide shade and protection when a wall is accessible
      (see FIG. 20A).

4) It is a further object of the new invention to provide a multi-function double-canopy umbrella, having core-securing bolts 111.

Therefore, the multi-function double-canopy umbrella:
  a) Can secure together lower post 108, upper post 109, and inner core 110*a*,
      to provide to provide height and strength to the multi-function double-canopy umbrella
      (see FIG. 4A); and
  b) Can secure inner core 110*a* to a fence, a balcony, a bumper, a hitch, a tailgate, a table, a column, and a wall,
      to allow for multiple options of shade and protection
      (see FIG. 18D, FIG. 20F, FIG. 18A, FIG. 19C, FIG. 19A, FIG. 18C, FIG. 18F, and FIG. 20B).

5) It is an even further object of the new invention to provide a multi-function double-canopy umbrella, having central-canopy-rib-supporting arms 128.

Therefore, the multi-function double-canopy umbrella:
  a) Can support central-canopy-supporting ribs 127,
      to provide central canopy 129 structural support
      (see FIG. 9A and FIG. 9B);
  b) Can hingedly connect central-canopy-supporting ribs 127 and first ring-canopy-supporting ribs 132,
      to provide structural support
      (see FIG. 9A and FIG. 9B); and
  c) Can hingedly connect central-canopy-supporting ribs 127 and first ring-canopy-supporting ribs 132,
      to help make folding the multi-function double-canopy umbrella easier
      (see FIG. 9A and FIG. 9B).

6) It is still another object of the new invention to provide a multi-function double-canopy umbrella, having central canopy 129.

Figure 16A:
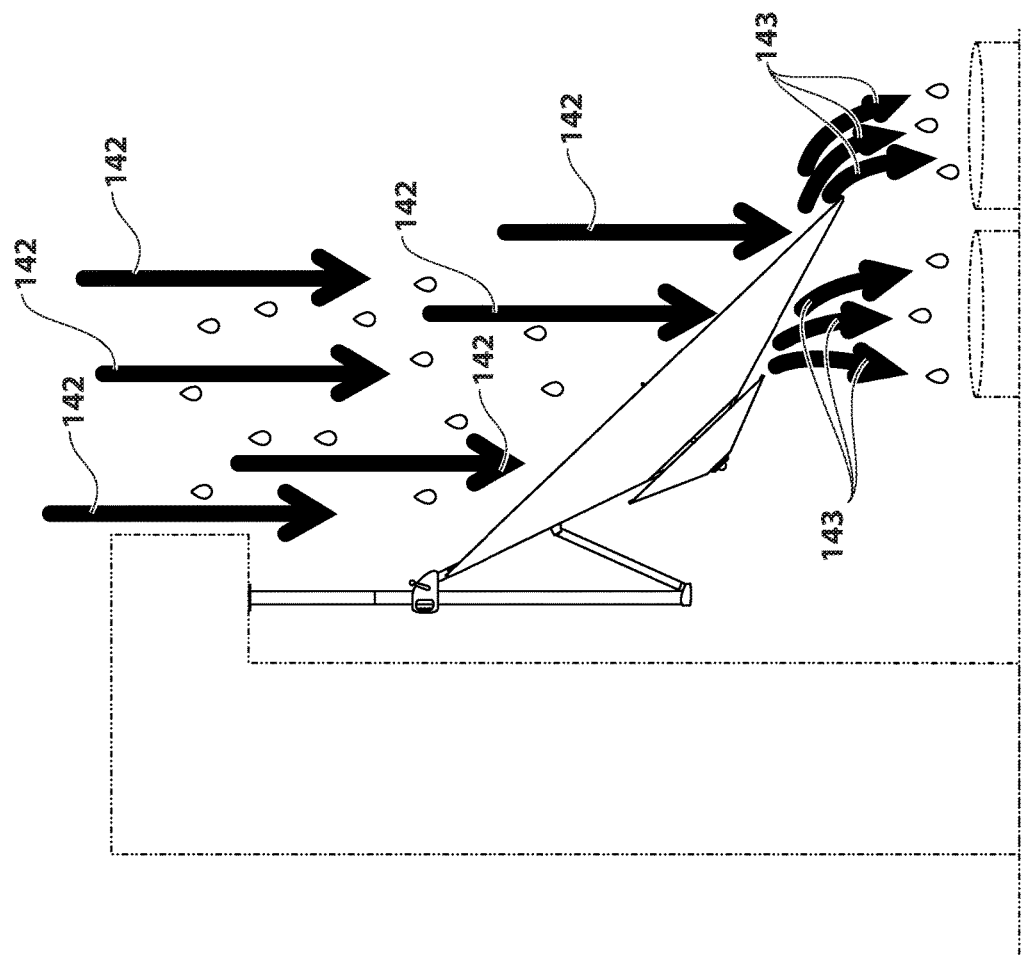
FIG. 16A illustrates a side view of how the central canopy and ring canopy can be used for collecting rain water.
Figure 17C:
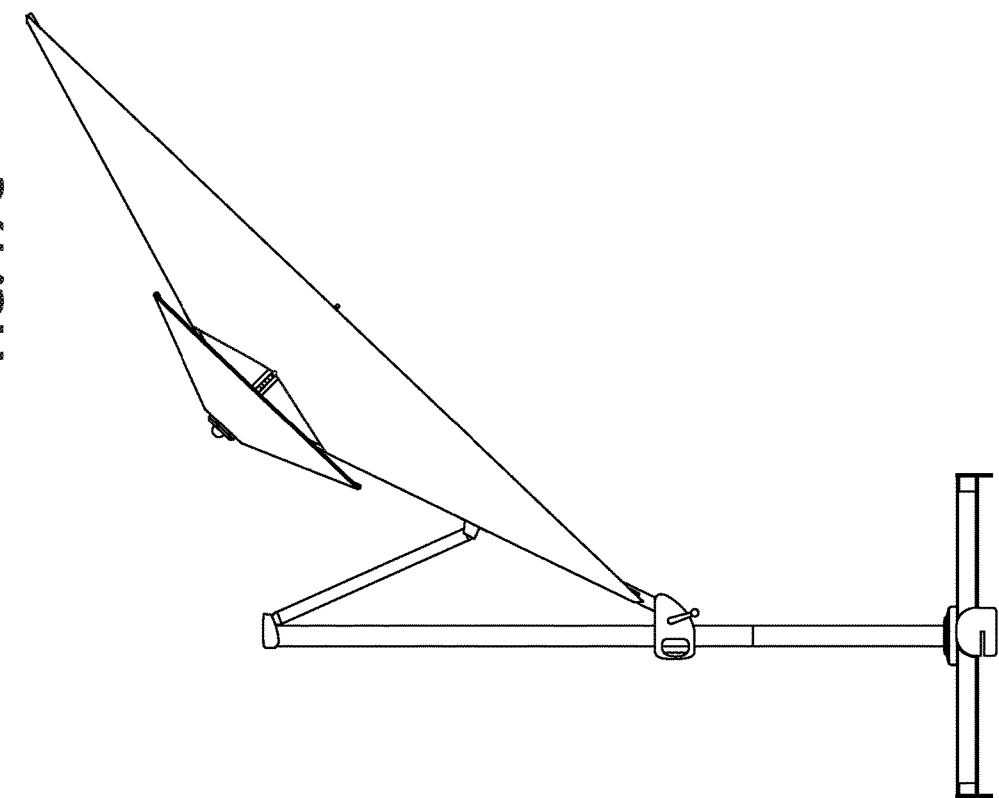
Figure 18B:
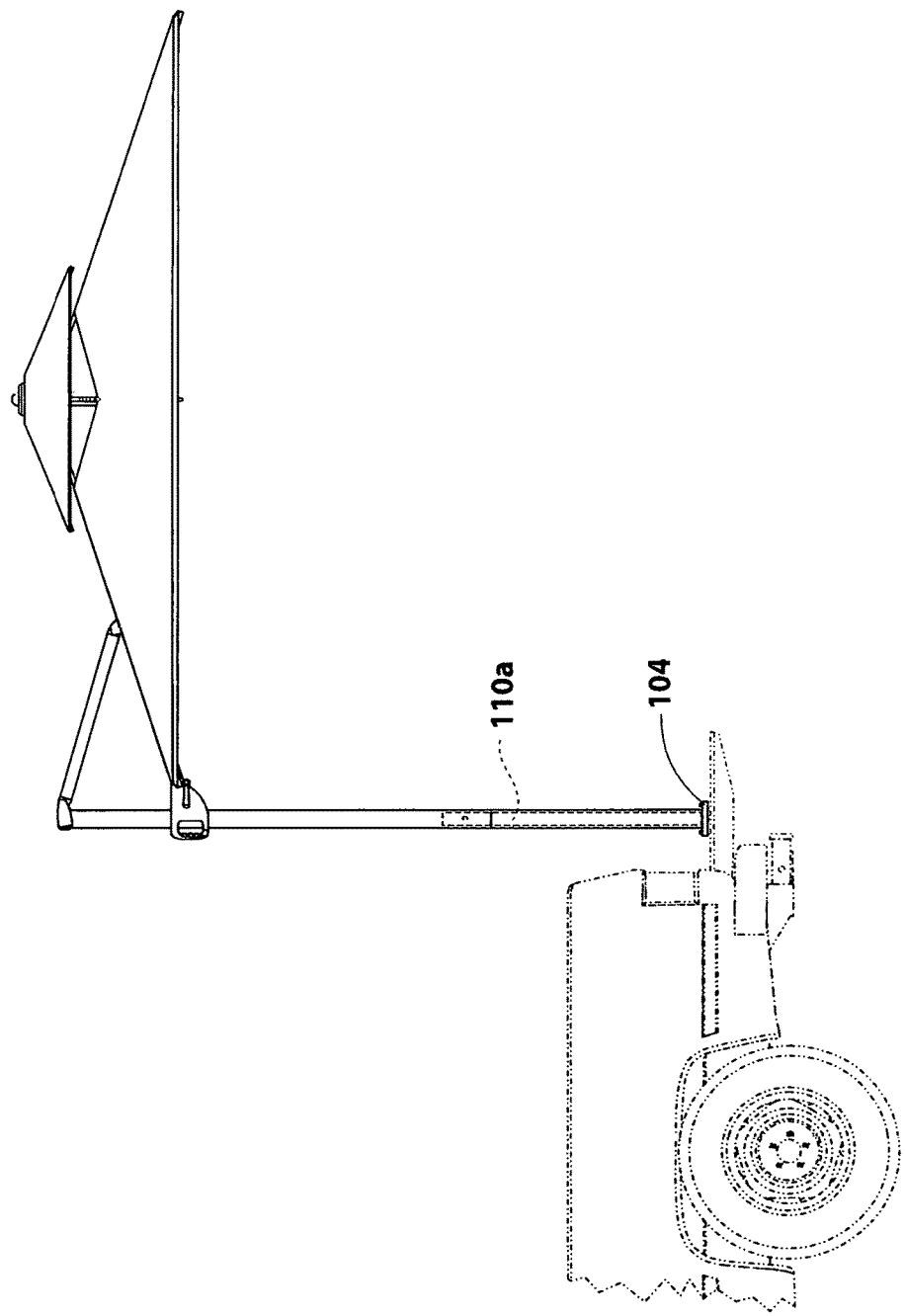
Figure 18E:
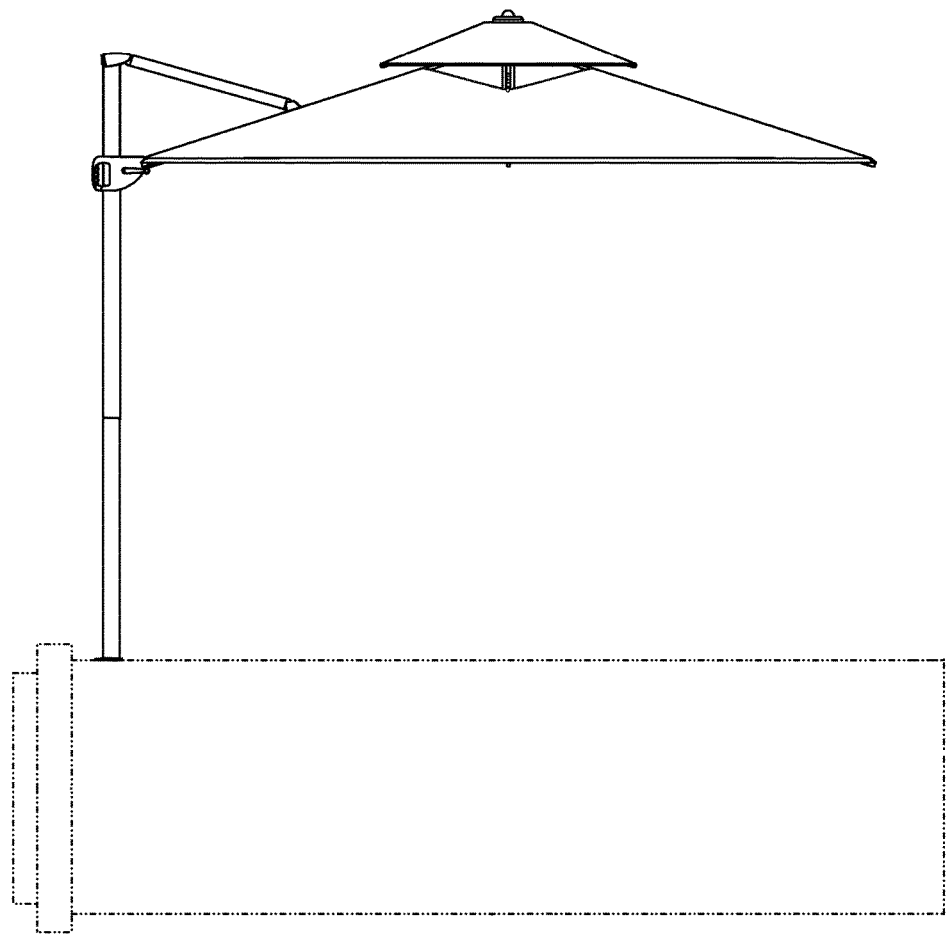
Figure 18F:
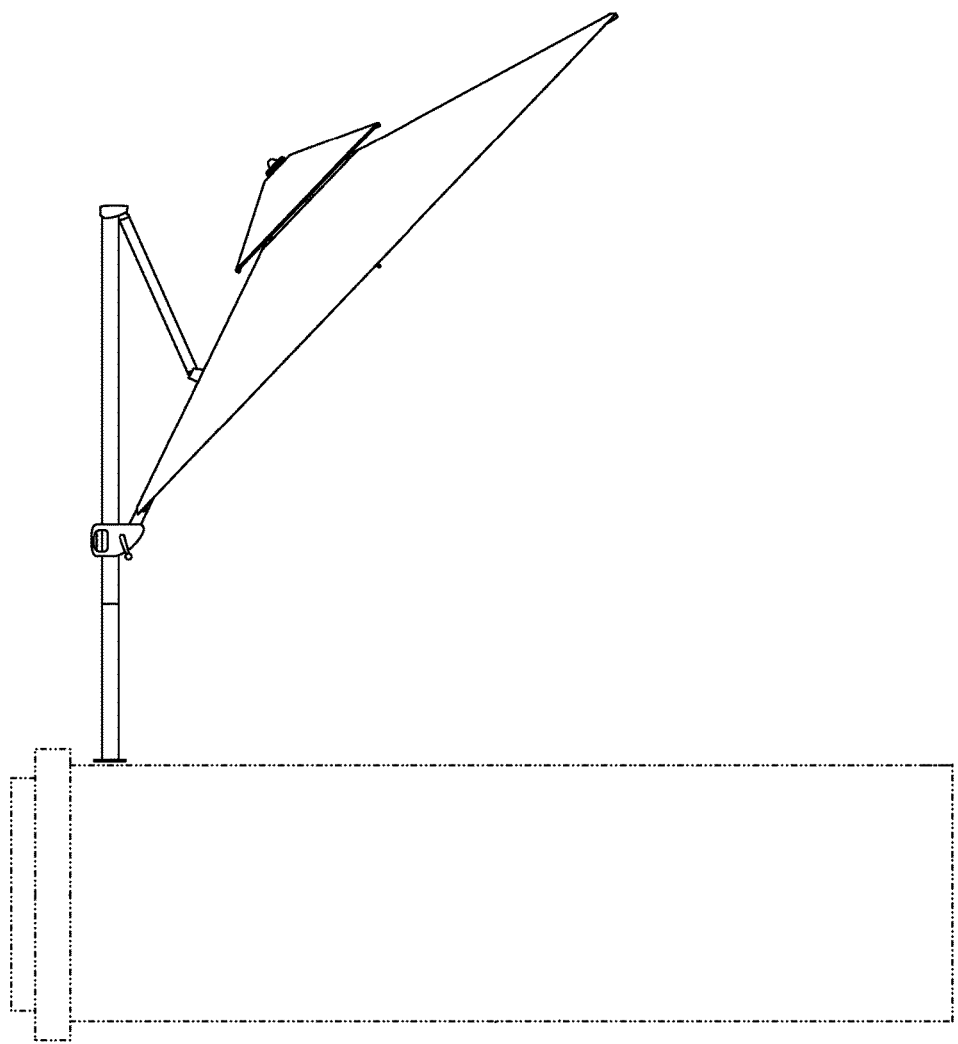
Figure 19B:
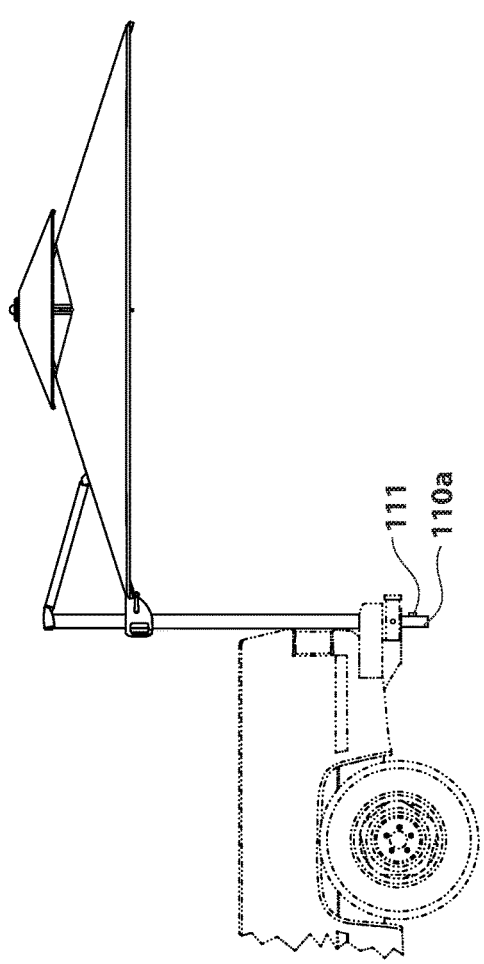
Figure 19C:
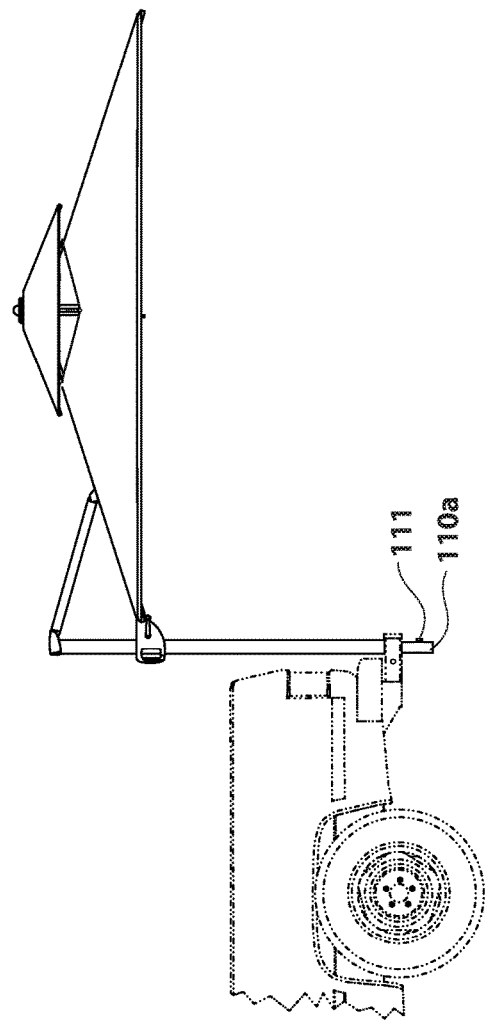
Figure 19D:
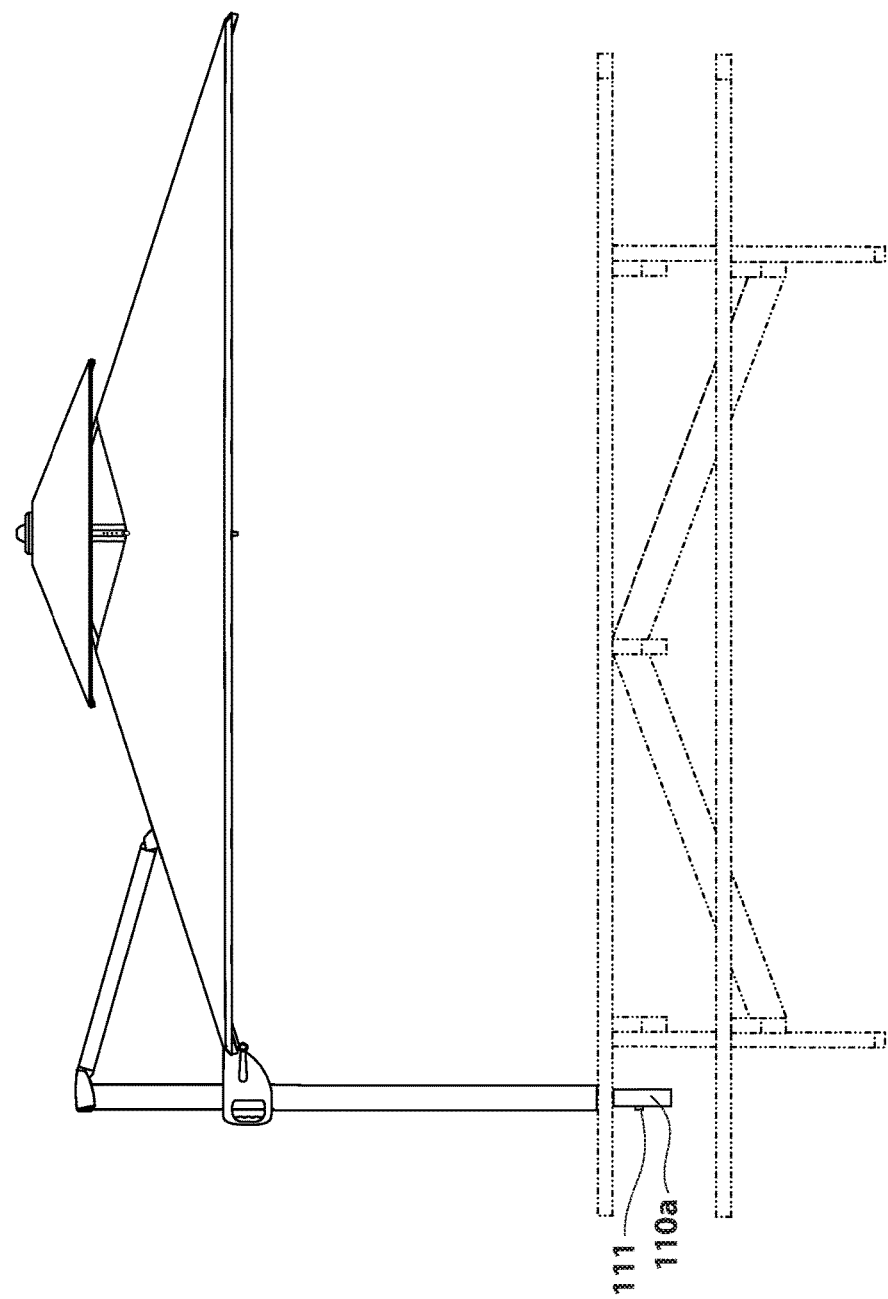
Figure 19F:
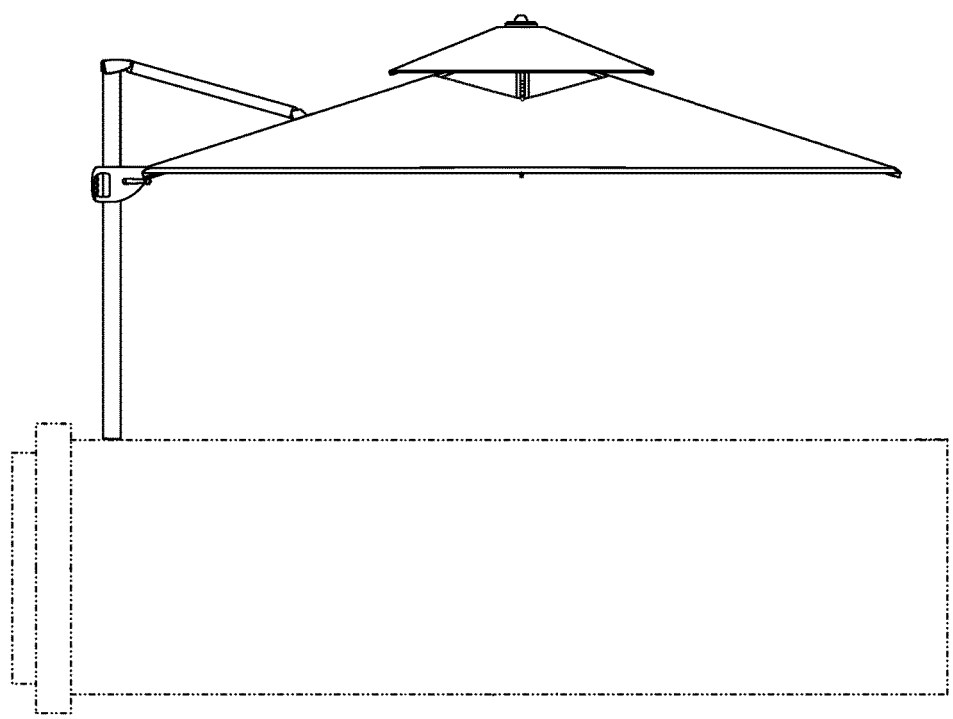

Therefore, the multi-function double-canopy umbrella:
  a) Can function as a water collector
      to collect rain water when used upside down in the directions of arrows 142 and 143
      (see FIG. 16A);
  b) Can function as a wind blocker
      to block wind
      (see FIG. 20D);
  c) Can function as a privacy screen
      to provide privacy
      (see FIG. 19F);
  d) Can function as a awning
      to angledly block rain and sun beams
      (see FIG. 20B);
  e) Can function as a canopy
      to vertically block rain and sun beams
      (see FIG. 20F);
  f) Can function as a wind redirector
      to redirect wind in and out of canopy in the directions of arrows 144, 145, 146, 147, and 148
      (see FIG. 16B, FIG. 16C, and FIG. 16D); and
  g) Can function as a wind resistor
      to protect the canopy from blowing when corners are attached to ground with ropes and stakes in the direction of arrow 149
      (see FIG. 16D).

7) It is yet another object of the new invention to provide a multi-function double-canopy umbrella, having multi-rib-connecting cores 134*a*.

Figure 1B:
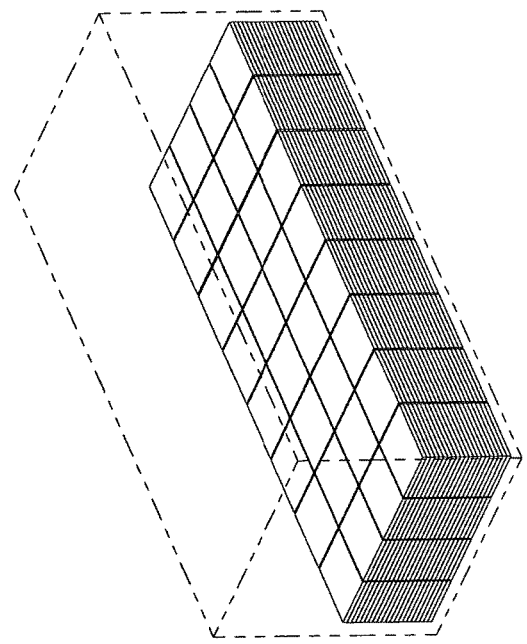
Figure 2A:
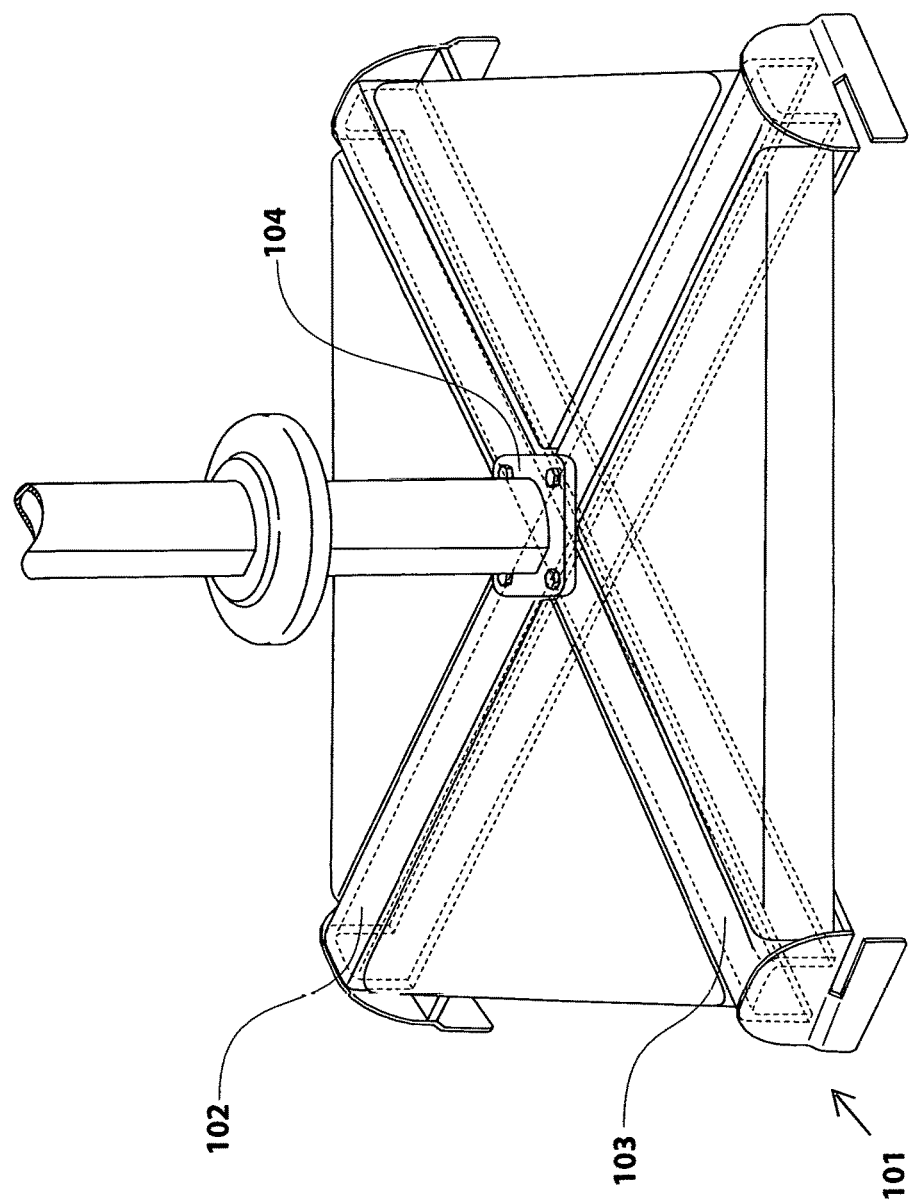
Figure 3:
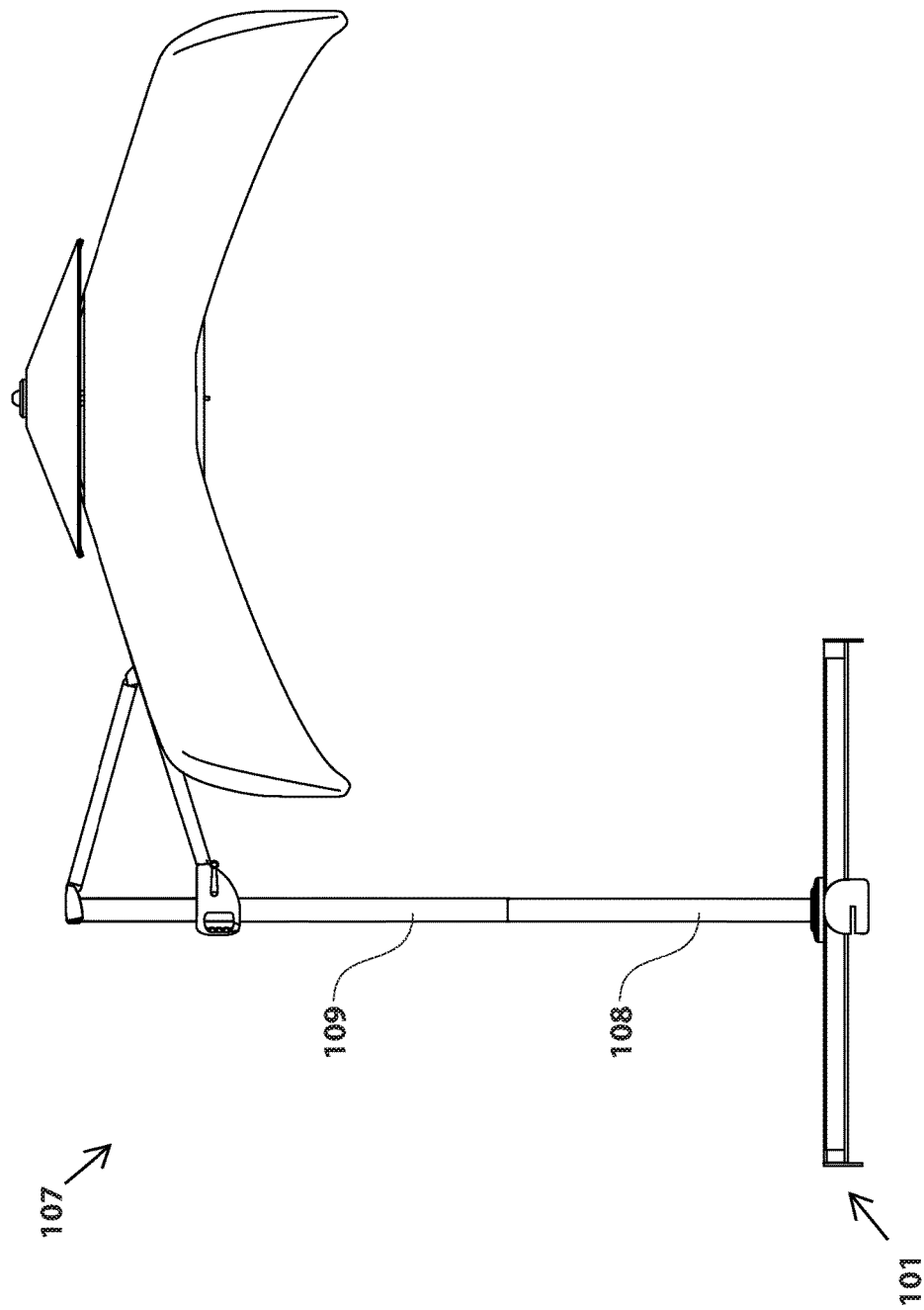
FIG. 3 illustrates a side view of the multi-function double-canopy umbrella without second ring-canopy-supporting ribs.
Figure 8:
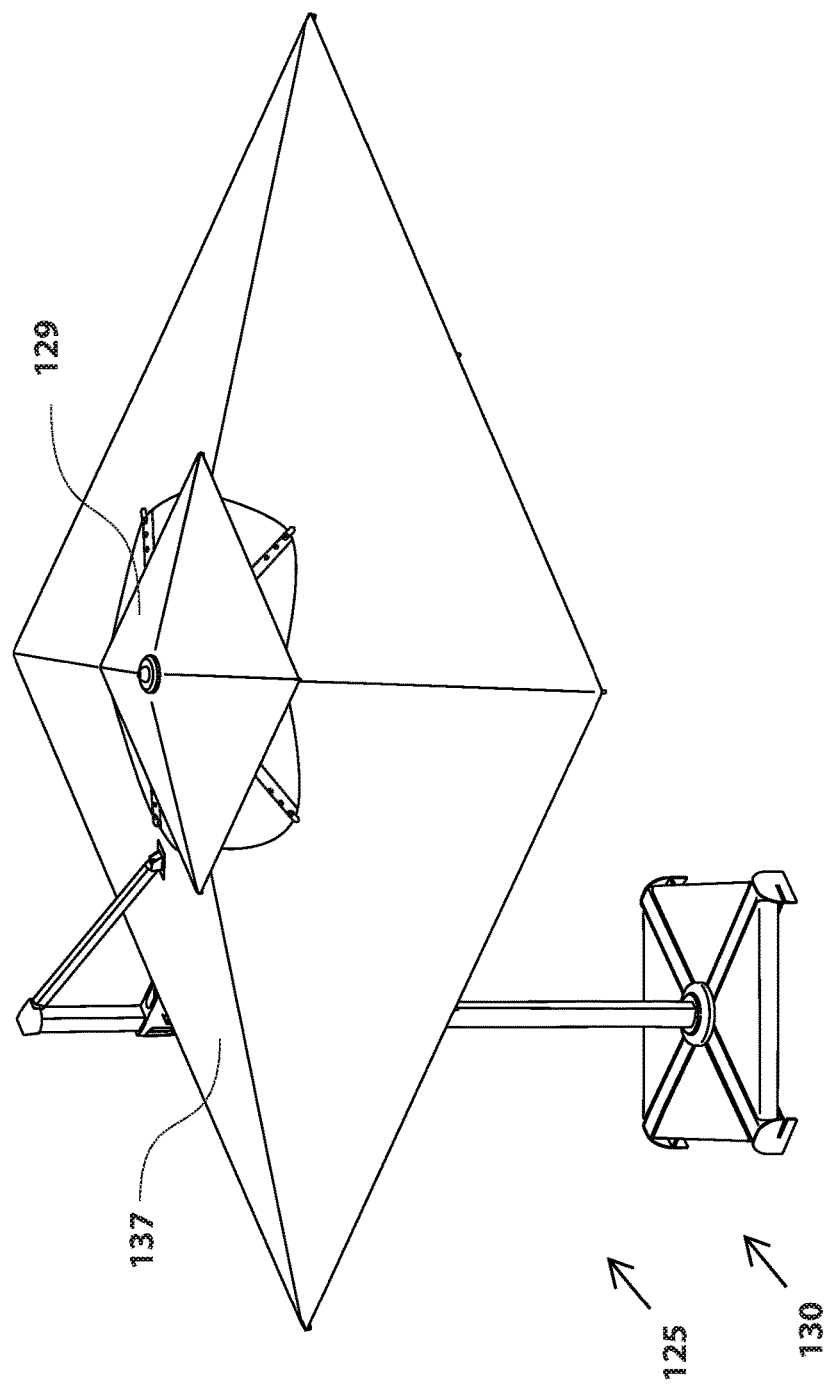
Figure 10:
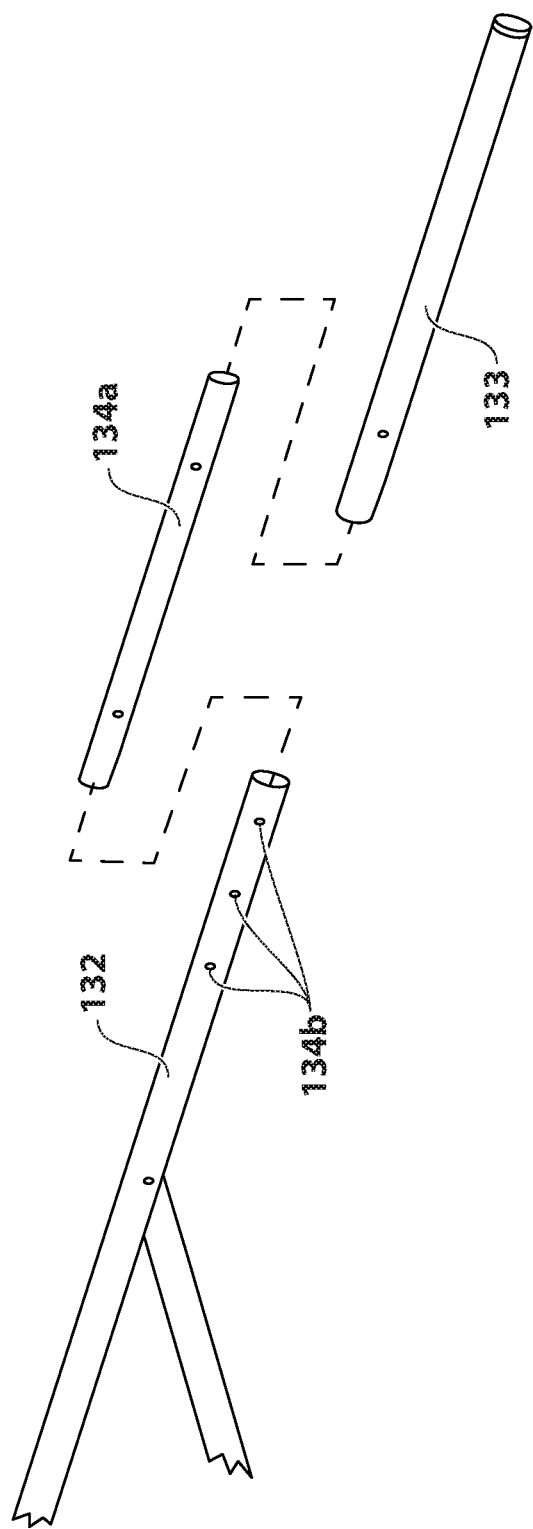
FIG. 10 illustrates how first ring-canopy-supporting ribs and second ring-canopy-supporting ribs are connected using multi-rib-connecting cores.
Figure 11A:
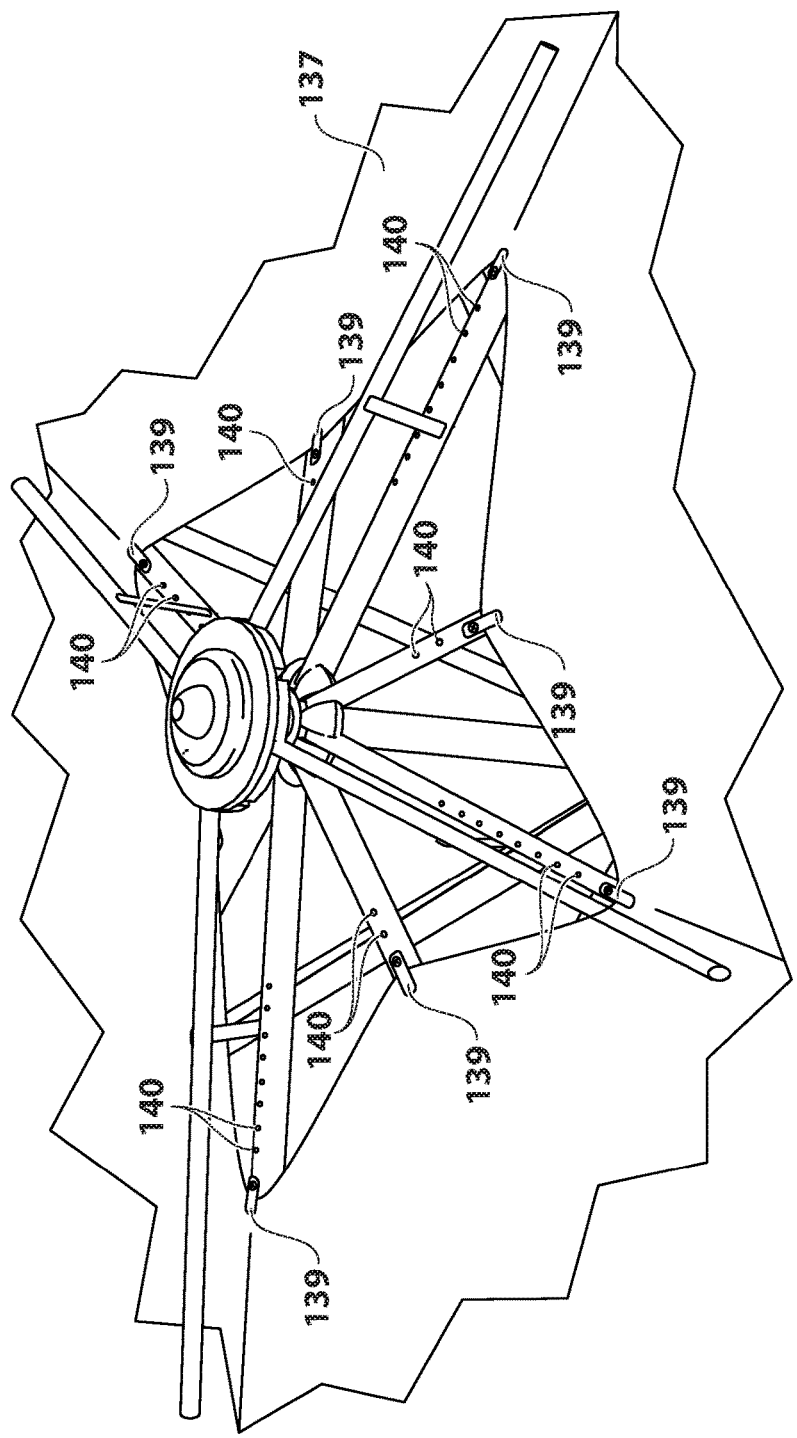
Figure 13:
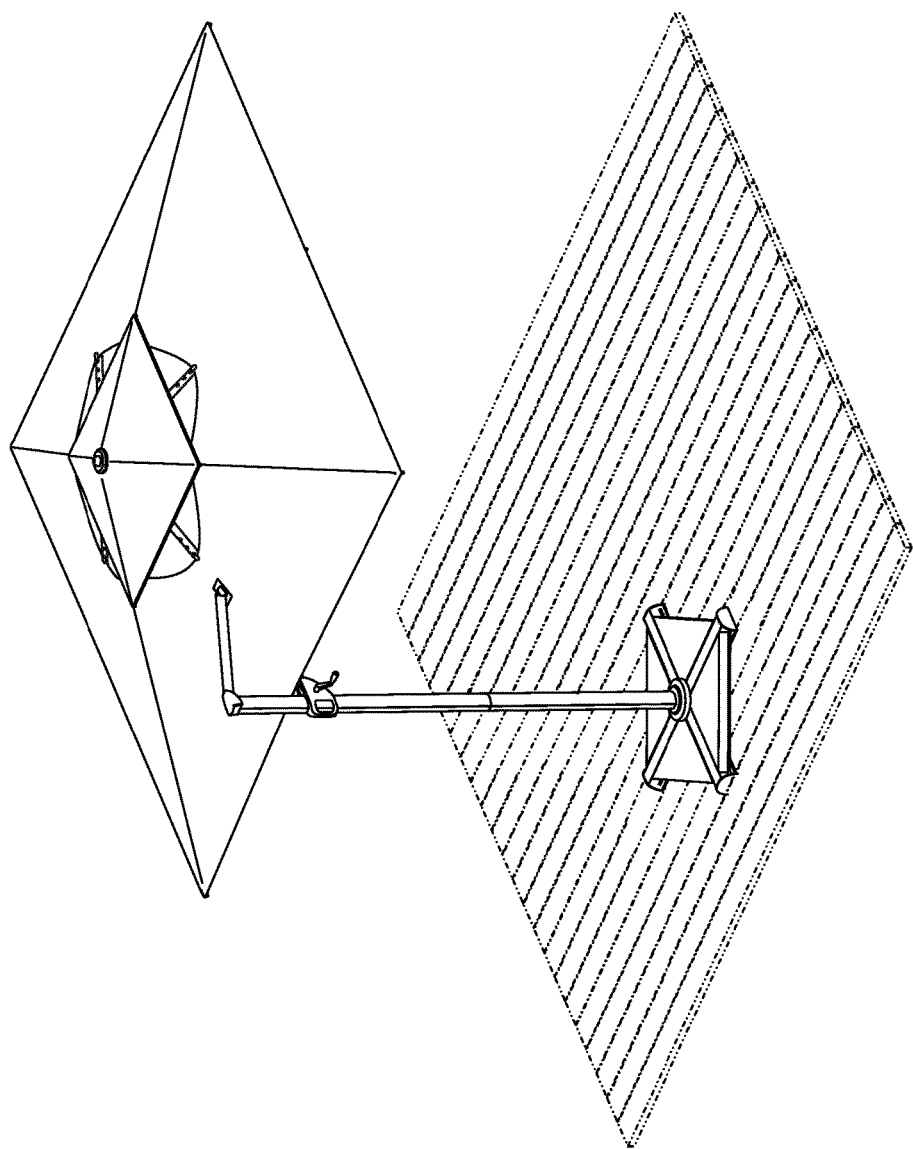
FIG. 13 and FIG. 14 illustrate how four wedging plates can be wedged between the planks of a patio or deck to lock the multi-function double-canopy umbrella to the patio or deck.
Figure 14:
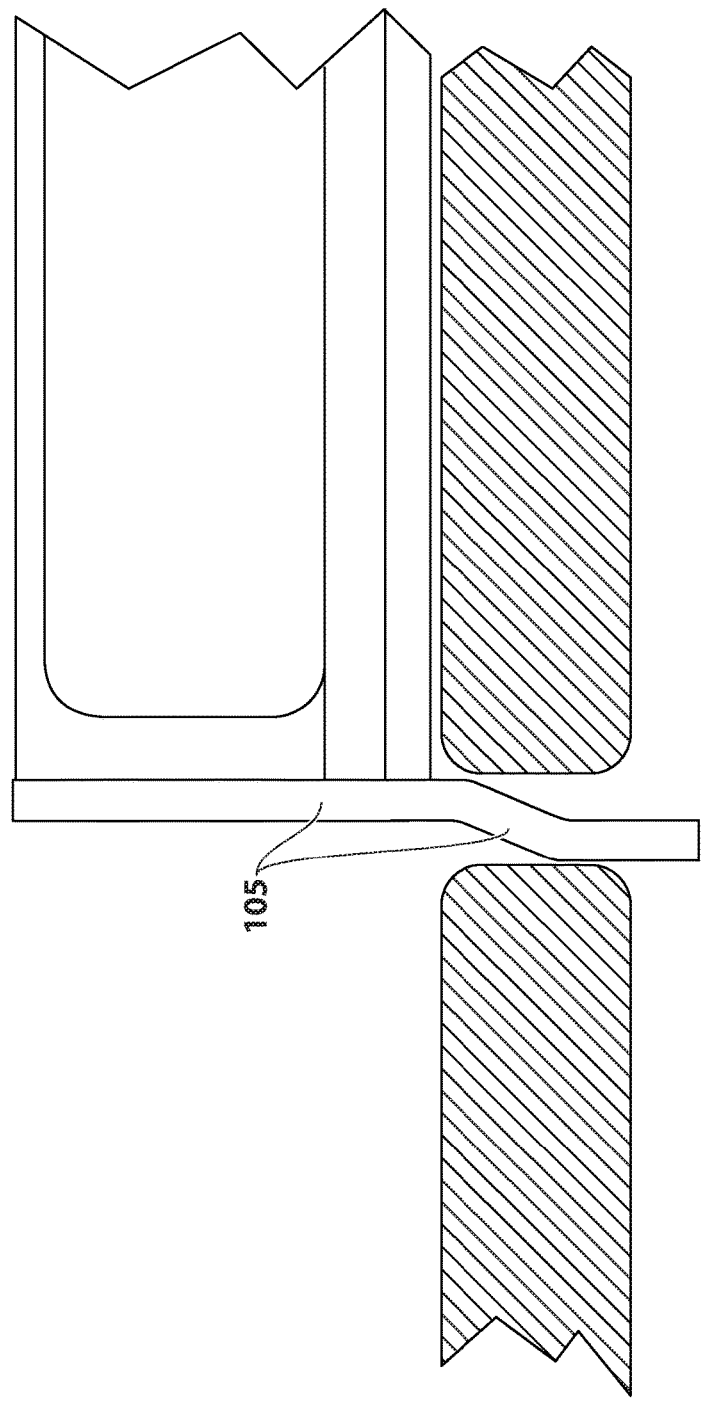
Figure 15:
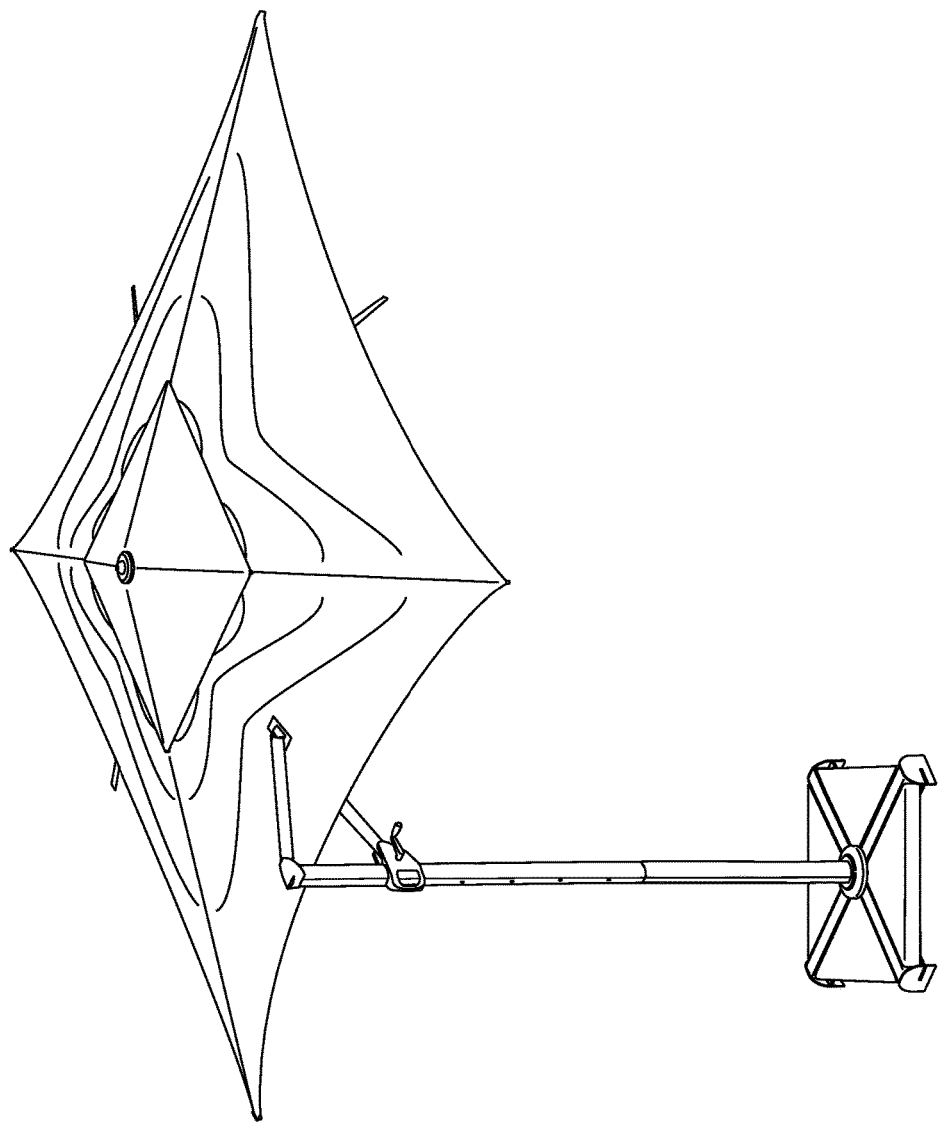
FIG. 15 illustrates a perspective view of how, by adjusting the multi-rib-connecting cores, rib-length-adjusting holes, canopy-size-adjusting flaps, and canopy-size-adjusting holes to get various sizes and configurations of the ring canopy.

Therefore, the multi-function double-canopy umbrella:
  a) Can allow manufacturers to divide long ribs into shorter first ring-canopy-supporting ribs 132 and shorter second ring-canopy-supporting ribs 133
      to reduce the length and volume of the shipping package of the multi-function double-canopy umbrella in a shipping container to save money from expensive shipping costs
      (see FIG. 1A (Prior Art) and FIG. 1B); and
  b) Can connect first ring-canopy-supporting ribs 132 to second ring-canopy-supporting ribs 133,
      to provide strength and structure to the multi-function double-canopy umbrella
      (see FIG. 10).

8) It is even still yet another object of the new invention to provide a multi-function double-canopy umbrella, having rib-length-adjusting holes 134*b*.

Therefore, the multi-function double-canopy umbrella:
  Can adjust first ring-canopy-supporting ribs 132, second ring-canopy-supporting ribs 133, and multi-rib-connecting inner cores 134*a* to adjust first ring-canopy-supporting ribs 132 and
second ring-canopy-supporting ribs 133 to different lengths, and
to adjust ring canopy 137 to multiple different sizes
(see FIG. 10).
9) It is still further yet another object of the new invention
to provide a multi-function double-canopy umbrella,
having
ring canopy 137.
Therefore, the multi-function double-canopy umbrella:
a) Can function as a water collector
to collect rain water when used upside down in the
directions of arrows 142 and 143
(see FIG. 16A);
b) Can function as a wind blocker
to block wind
(see FIG. 20D);
c) Can function as a privacy screen
to provide privacy
(see FIG. 19F);
d) Can function as an awning
to angledly block rain and sun beams
(see FIG. 20B);
e) Can function as a canopy
to vertically block rain and sun beams
(see FIG. 20F);
f) Can function as a wind redirector
to redirect wind in and out of canopy
in the directions of arrows 144, 145, 146, 147, and 148
(see FIG. 16B, FIG. 16C, and FIG. 16D); and
g) Can function as a wind resistor
to protect the canopy from blowing when corners are
attached to ground with ropes and stakes
in the direction of arrow 149
(see FIG. 16D).
10) It is even still further yet another object of the new
invention to provide a multi-function double-canopy
umbrella, having
canopy-size-adjusting flaps 139.
Therefore, the multi-function double-canopy umbrella:
Can adjustably be attached to first ring-canopy-supporting ribs 132, respectively
to adjust ring canopy 137 to multiple different sizes
(see FIG. 11A and FIG. 11B).
11) It is even further yet still another object of the new
invention to provide a multi-function double-canopy
umbrella, having
canopy-size-adjusting holes 140.
Therefore, the multi-function double-canopy umbrella:
Can adjust first ring-canopy-supporting ribs 132 and
canopy-size-adjusting flaps 139
to adjust ring canopy 137 to multiple different sizes
(see FIG. 11A and FIG. 11B).

What is claimed is:
1. A multi-function double-canopy umbrella comprising:
a first post-stabilizing foot;
a second post-stabilizing foot;
a mounting plate,
for mounting on said first post-stabilizing foot and said
second post-stabilizing foot
by being bolted on said first and said second post-stabilizing feet, or
for mounting on a fence
by being bolted on said fence, or
for mounting on a balcony
by being bolted on said balcony, or
for mounting on a bumper
by being bolted on said bumper, or
for mounting on a hitch
by being bolted on said hitch, or
for mounting on a tailgate
by being bolted on said tailgate, or
for mounting on a table
by being bolted on said table;
four base-stabilizing weights
respectively attached to said first post-stabilizing foot
and said second post-stabilizing foot;
a lower post;
an upper post;
an inner core
for being attached to said mounting plate and inserted
into and bolted to said lower post and said upper
post, or
for allowing said upper post to be disassembled from
said lower post to reduce the length and volume of
shipping package of said umbrella in a shipping
container to save money from expensive shipping
costs, or
for mounting said upper post on said lower post
to give said umbrella more height, or
for mounting said upper post on a fence
by being bolted to said upper post and being wedged
into said fence, or
for mounting said upper post on a balcony
by being bolted to said upper post and being wedged
into said balcony, or
for mounting said upper post on a bumper
by being bolted to said upper post and being wedged
into said bumper, or
for mounting said upper post on a hitch
by being bolted to said upper post and being wedged
into said hitch, or
for mounting said upper post on a tailgate
by being bolted to said upper post and being wedged
into said tailgate, or
for mounting said upper post on a table
by being bolted to said upper post and being wedged
into said table
a plurality of post-height-adjusting holes
respectively drilled into said lower post, said upper
post, and said inner core;
a plurality of core-securing bolts
for respectively bolting through said lower post, said
upper post, and said inner core, or
for securing together said lower post, said upper post,
and said inner core, or
for bolting said inner core to a fence, a balcony, a
bumper, a hitch, a tailgate, a table, a column, or a
wall;
a multi-canopy-lifting-arm intersector
attached to said upper post;
a multi-canopy-supporting-arm intersector
slidably attached to said upper post;
a slidable multi-position handle
molded to said multi-canopy-supporting-arm intersector;
a height-adjusting spring-loaded rocker
sandwiched within said slidable multi-position handle;
a handle-locking rocker pin
attached to said height-adjusting spring-loaded rocker;

a plurality of handle-locking post holes
respectively drilled into said upper post;
a foldable multi-canopy-supporting arm
pivotably bolted to said multi-canopy-supporting-arm intersector;
a foldable multi-canopy-lifting arm
pivotably bolted to said multi-canopy-lifting-arm intersector and said foldable multi-canopy-supporting arm;
a multi-canopy-hanging central tube;
a multi-canopy-deploying spool
sandwiched within said multi-canopy-supporting-arm intersector;
a multi-canopy-deploying crank
rotatably attached to said multi-canopy-deploying spool;
a multi-canopy-deploying rope
wound around said multi-canopy-deploying spool, threaded through said multi-canopy-supporting-arm intersector, and threaded through said multi-canopy-hanging central tube;
a central-canopy intersector
attached to said multi-canopy-hanging central tube;
a plurality of central-canopy-supporting ribs
respectively attached to said central-canopy intersector;
a plurality of central-canopy-rib-raising arms
respectively pivotably attached to said central-canopy-supporting ribs for supporting said central-canopy-supporting ribs;
a central canopy
attached to said central-canopy-supporting ribs
for functioning as a water collector to collect rain water when used upside down,
for functioning as a wind blocker to block wind,
for functioning as a privacy screen to provide privacy,
for functioning as an awning to angledly block rain and sun beams,
for functioning as a canopy to vertically block rain and sun beams,
for functioning as a wind redirector to redirect wind, and
for functioning as a wind resistor;
a ring-canopy-rib intersector
connected to said multi-canopy-hanging central tube;
a plurality of first ring-canopy-supporting ribs
respectively pivotably connected to said ring-canopy-rib intersector, and
pivotably attached to said central-canopy-rib-raising arms;
a plurality of second ring-canopy-supporting ribs;
a plurality of multi-rib-connecting cores
respectively inserted into and screwed to said first ring-canopy-supporting ribs and said second ring-canopy-supporting ribs
for allowing said first ring-canopy-supporting ribs and said second ring-canopy-supporting ribs to be disassembled from each other to reduce the length and volume of shipping package of said umbrella in a shipping container to save money from expensive shipping costs, and
for connecting said first ring-canopy-supporting ribs to said second ring-canopy-supporting ribs to provide strength and structure to said umbrella;
a plurality of rib-length-adjusting holes
respectively drilled into said first ring-canopy-supporting ribs, said second ring-canopy-supporting ribs, and said multi-rib-connecting cores
for adjusting said first ring-canopy-supporting ribs, said second ring-canopy-supporting ribs, and said multi-rib-connecting cores to adjust said first ring-canopy-supporting ribs and said second ring-canopy-supporting ribs to different lengths, and to adjust said ring canopy to multiple different sizes;
a ring-canopy-arm intersector
slidably attached to said multi-canopy-hanging central tube,
said multi-canopy-deploying rope attached to said ring-canopy-arm intersector;
a plurality of ring-canopy-rib-raising arms
respectively foldably attached to said ring-canopy-arm intersector;
a ring canopy
attached to said first ring-canopy-supporting ribs and said second ring-canopy-supporting ribs
for functioning as a water collector to collect rain water when used upside down,
for functioning as a wind blocker to block wind,
for functioning as a privacy screen to provide privacy,
for functioning as an awning to angledly block rain and sun beams,
for functioning as a canopy to vertically block rain and sun beams,
for functioning as a wind redirector to redirect wind, and
for functioning as a wind resistor,
said ring canopy having a plurality of corners and a plurality of inner edges;
four zipper pockets
respectively sewn to said corners of said ring canopy;
a plurality of canopy-size-adjusting flaps respectively
sewn to said inner edges of said ring canopy
for adjustably being attached to said first ring-canopy-supporting ribs,
respectively to adjust said ring canopy to multiple different sizes;
a plurality of canopy-size-adjusting holes
respectively drilled into said first ring-canopy-supporting ribs
for adjusting said first ring-canopy-supporting ribs and said canopy-size-adjusting flaps to adjust said ring canopy to multiple different sizes.

2. The multi-function double-canopy umbrella of claim 1, wherein
said post-height
said inner core being wedged into said fence, said balcony, said bumper, said hitch, said tailgate, said table, said column, or said wall.

3. The multi-function double-canopy umbrella of claim 1, wherein
said inner core is made of metallic material.

4. The multi-function double-canopy umbrella of claim 1, wherein
said mounting plate
is formed into a square shape.

5. The multi-function double-canopy umbrella of claim 1, wherein
said multi-rib-connecting cores
each are made of metallic material.

6. The multi-function double-canopy umbrella of claim 1, wherein
said ring canopy is made of nylon material, fabric material, or nylon and fabric materials.

7. The multi-function double-canopy umbrella of claim 1, wherein
said multi-function double-canopy umbrella
is made of plastic material, metallic material, or plastic and metallic materials.

8. A double-canopy umbrella comprising:
a first post-stabilizing foot;
a second post-stabilizing foot;
a mounting plate,
bolted on said first post-stabilizing foot
and said second post-stabilizing foot;
four base-stabilizing weights respectively
attached to said first post-stabilizing foot and
said second post-stabilizing foot;
a lower post,
an upper post;
an inner core
for being attached to said mounting plate and inserted into and bolted to said lower post and said upper post, or
for mounting said upper post on a fence, a balcony, a bumper, a hitch, a tailgate, a table, a column, or a wall
by being bolted to said upper post and being wedged into said fence said balcony, said bumper, said hitch, said tailgate, said table, said column, or said wall;
a plurality of post-height-adjusting holes respectively drilled into said lower post,
said upper post, and
said inner core;
a plurality of core-securing bolts respectively
bolted through said lower post, said upper post, and said inner core;
a multi-canopy-lifting-arm intersector
attached to said upper post;
a multi-canopy-supporting-arm intersector
slidably attached to said upper post;
a slidable multi-position handle
molded to said multi-canopy-supporting-arm intersector;
a height-adjusting spring-loaded rocker
sandwiched within said slidable multi-position handle;
a handle-locking rocker pin
attached to said height-adjusting spring-loaded rocker;
a plurality of handle-locking post holes respectively
drilled into said upper post;
a foldable multi-canopy-supporting arm
pivotably bolted to said multi-canopy-supporting-arm intersector;
a foldable multi-canopy-lifting arm
pivotably bolted to said multi-canopy-lifting-arm intersector and
said foldable multi-canopy-supporting arm;
a multi-canopy-hanging central tube;
a multi-canopy-deploying rope
threaded through said multi-canopy-supporting-arm intersector, and
threaded through said multi-canopy-hanging central tube;
a central-canopy intersector
attached to said multi-canopy-hanging central tube;
a plurality of central-canopy-supporting ribs respectively attached to said central-canopy intersector;
a plurality of central-canopy-rib-raising arms respectively pivotably attached to said central-canopy-supporting ribs;
a central canopy
attached to said central-canopy-supporting ribs;
a ring-canopy-rib intersector
connected to said multi-canopy-hanging central tube;
a plurality of first ring-canopy-supporting ribs respectively
pivotably connected to said ring-canopy-rib intersector, and
pivotably attached to said central-canopy-rib-raising arms;
a plurality of second ring-canopy-supporting ribs;
a plurality of multi-rib-connecting cores respectively
inserted into and screwed to said first ring-canopy-supporting ribs and said second ring-canopy-supporting ribs,
a plurality of rib-length-adjusting holes respectively
drilled into said first ring-canopy-supporting ribs,
said second ring-canopy-supporting ribs, and
said multi-rib-connecting cores;
a ring-canopy-arm intersector
slidably attached to said multi-canopy-hanging central tube,
said multi-canopy-deploying rope
attached to said ring-canopy-arm intersector;
a plurality of ring-canopy-rib-raising arms respectively
foldably attached to said ring-canopy-arm intersector;
a ring canopy
attached to said first ring-canopy-supporting ribs and said second ring-canopy-supporting ribs,
said ring canopy having a plurality of corners and a plurality of inner edges;
four pockets respectively
sewn to said corners of said ring canopy;
a plurality of canopy-size-adjusting flaps respectively
sewn to the inner edges of said ring canopy;
a plurality of canopy-size-adjusting holes respectively
drilled into said first ring-canopy-supporting ribs.

9. The double-canopy umbrella of claim 8,
wherein
said inner core being wedged into said fence, said balcony, said bumper, said hitch, said tailgate, said table, said column, or said wall.

10. The double-canopy umbrella of claim 8,
wherein
said inner core
is made of metallic material.

11. The double-canopy umbrella of claim 8,
wherein
said mounting plate
is formed into a square shape.

12. The double-canopy umbrella of claim 8,
wherein
said multi-rib-connecting cores
each are made of metallic material.

13. The double-canopy umbrella of claim 8,
wherein
said ring canopy is made of nylon material, fabric material, or nylon and fabric materials.

14. The double-canopy umbrella of claim 8,
wherein
said double-canopy umbrella
is made of plastic material, metallic material, or plastic and metallic materials.

15. A space-saver umbrella comprising:
a first post-stabilizing foot;
a second post-stabilizing foot;
a mounting plate, bolted on said first post-stabilizing foot
and said second post-stabilizing foot
a lower post,
an upper post;
an inner core
- for being attached to said mounting plate and inserted into and bolted to said lower post and said upper post, or
- for mounting said upper post on a fence, a balcony, a bumper, a hitch, a tailgate, a table, a column, or a wall
  - by being bolted to said upper post and being wedged into said fence, said balcony, said bumper, said hitch, said tailgate, said table, said column, or said wall;

a multi-canopy-lifting-arm intersector
attached to said upper post;
a multi-canopy-supporting-arm intersector
slidably attached to said upper post;
a slidable multi-position handle
molded to said multi-canopy-supporting-arm intersector;
a height-adjusting spring-loaded rocker
sandwiched within said slidable multi-position handle;
a handle-locking rocker pin
attached to said height-adjusting spring-loaded rocker;
a plurality of handle-locking post holes respectively
drilled into said upper post;
a foldable multi-canopy-supporting arm
pivotably bolted to said multi-canopy-supporting-arm intersector;
a foldable multi-canopy-lifting arm
pivotably bolted to said multi-canopy-lifting-arm intersector and
said foldable multi-canopy-supporting arm;
a multi-canopy-hanging central tube;
a multi-canopy-deploying rope
- threaded through said multi-canopy-supporting-arm intersector, and
- threaded through said multi-canopy-hanging central tube;

a central-canopy intersector
attached to said multi-canopy-hanging central tube;
a plurality of central-canopy-supporting ribs respectively
attached to said central-canopy intersector;
a plurality of central-canopy-rib-raising arms respectively
pivotably attached to said central-canopy-supporting ribs;
a central canopy
attached to said central-canopy-supporting ribs;
a ring-canopy-rib intersector
connected to said multi-canopy-hanging central tube;
a plurality of first ring-canopy-supporting ribs respectively
- pivotably connected to said ring-canopy-rib intersector, and
- pivotably attached to said central-canopy-rib-raising arms;

a plurality of second ring-canopy-supporting ribs;
a plurality of multi-rib-connecting cores respectively
inserted into and screwed to said first ring-canopy-supporting ribs and
said second ring-canopy-supporting ribs,
a plurality of rib-length-adjusting holes respectively
drilled into said first ring-canopy-supporting ribs,
said second ring-canopy-supporting ribs, and
said multi-rib-connecting inner cores;
a ring-canopy-arm intersector
slidably attached to said multi-canopy-hanging central tube,
said multi-canopy-deploying rope
attached to said ring-canopy-arm intersector;
a plurality of ring-canopy-rib-raising arms respectively
foldably attached to said ring-canopy-arm intersector;
a ring canopy
attached to said first ring-canopy-supporting ribs and said second ring-canopy-supporting ribs,
said ring canopy having a plurality of corners and a plurality of inner edges;
four pockets respectively
sewn to said corners of said ring canopy;
a plurality of canopy-size-adjusting flaps respectively
sewn to said inner edges of said ring canopy;
a plurality of canopy-size-adjusting holes respectively
drilled into said first ring-canopy-supporting ribs.

* * * * *